United States Patent
Pigliucci et al.

(10) Patent No.: US 9,897,246 B2
(45) Date of Patent: Feb. 20, 2018

(54) ENVELOPE FOR A LAMINAR STRUCTURE PROVIDING ADAPTIVE THERMAL INSULATION

(75) Inventors: Anatolio Pigliucci, Munich (DE); Stefan Hauer, Bad Wiessee (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 477 days.

(21) Appl. No.: 14/415,305

(22) PCT Filed: Jul. 31, 2012

(86) PCT No.: PCT/EP2012/064952
§ 371 (c)(1),
(2), (4) Date: Feb. 27, 2015

(87) PCT Pub. No.: WO2014/019613
PCT Pub. Date: Feb. 6, 2014

(65) Prior Publication Data
US 2015/0226366 A1 Aug. 13, 2015

(51) Int. Cl.
*F16L 59/02* (2006.01)
*B32B 27/40* (2006.01)
(Continued)

(52) U.S. Cl.
CPC ............ *F16L 59/029* (2013.01); *B32B 5/022* (2013.01); *B32B 5/024* (2013.01); *B32B 5/26* (2013.01);
(Continued)

(58) Field of Classification Search
CPC .. F16L 59/029; Y10T 428/1334; B32B 27/40; B32B 15/20; B32B 2307/304;
(Continued)

(56) References Cited

U.S. PATENT DOCUMENTS

| | | |
|---|---|---|
| 3,953,566 A | 4/1976 | Gore |
| 4,187,390 A | 2/1980 | Gore |

(Continued)

FOREIGN PATENT DOCUMENTS

| | | |
|---|---|---|
| CN | 101462530 | 6/2009 |
| CN | 101687396 | 3/2010 |

(Continued)

OTHER PUBLICATIONS

Esser-Kahn et al., "Triggered Release from Polymer Capsules", Macromolecules, 2011, pp. 5539-5553.

(Continued)

*Primary Examiner* — Michael C Miggins
(74) *Attorney, Agent, or Firm* — Kilpatrick Townsend & Stockton, LLP

(57) ABSTRACT

The present invention relates to an envelope (20) for a laminar structure providing adaptive thermal insulation, the envelope (20) enclosing at least one cavity (16) having included therein a gas generating agent (18) having an unactivated configuration and an activated configuration, the gas generating agent (18) being adapted to change from the unactivated configuration to the activated configuration, such as to increase a gas pressure inside the cavity (16), in response to an increase in temperature in the cavity (16), the envelope (20) being configured such that a volume of the envelope (20) increases in response to the increase in gas pressure inside the cavity (16), wherein the envelope (20) is made of a polymer composite material (8), the polymer composite material (8) including a fluid tight layer which is covered by a reinforcing layer comprising a polymer material, the rein-forcing layer being configured to limit formation of wrinkles in the fluid tight layer (8b) when subjecting the envelope (20) to one, or a plurality of activation/deactivation cycles.

16 Claims, 27 Drawing Sheets

(51) Int. Cl.

| | | |
|---|---|---|
| *B32B 15/20* | (2006.01) | |
| *B32B 5/02* | (2006.01) | |
| *B32B 5/26* | (2006.01) | |
| *B32B 7/12* | (2006.01) | |
| *B32B 15/08* | (2006.01) | |
| *B32B 27/12* | (2006.01) | |
| *B32B 27/32* | (2006.01) | |

(52) U.S. Cl.
CPC ............... *B32B 7/12* (2013.01); *B32B 15/08* (2013.01); *B32B 15/20* (2013.01); *B32B 27/12* (2013.01); *B32B 27/322* (2013.01); *B32B 27/40* (2013.01); *B32B 2307/304* (2013.01); *B32B 2307/7265* (2013.01); *B32B 2571/00* (2013.01); *Y10T 428/1334* (2015.01)

(58) Field of Classification Search
CPC B32B 5/022; B32B 5/024; B32B 5/26; B32B 7/12; B32B 15/08; B32B 27/12; B32B 27/322; B32B 2307/7265; B32B 2571/00
See application file for complete search history.

(56) References Cited

U.S. PATENT DOCUMENTS

| | | | |
|---|---|---|---|
| 4,194,041 | A | 3/1980 | Gore et al. |
| 4,493,870 | A | 1/1985 | Vrouenraets et al. |
| 4,945,015 | A | 7/1990 | Milner et al. |
| 5,236,769 | A | 8/1993 | Paire |
| 5,468,537 | A | 11/1995 | Brown et al. |
| 6,261,678 | B1 | 7/2001 | von Fragstein et al. |
| 7,396,784 | B2 | 7/2008 | Thiriot |
| 8,753,461 | B2 | 6/2014 | Panse |
| 9,662,516 | B2 | 5/2017 | Kiederle et al. |
| 2003/0004247 | A1 | 1/2003 | Destandau et al. |
| 2005/0009429 | A1 | 1/2005 | Park et al. |
| 2005/0050619 | A1 | 3/2005 | Dunn |
| 2007/0023740 | A1 | 2/2007 | Michael |
| 2008/0282455 | A1 | 11/2008 | Jones |
| 2009/0025892 | A1 | 1/2009 | Tanner et al. |
| 2009/0111345 | A1 | 4/2009 | Panse et al. |
| 2009/0181254 | A1 | 7/2009 | White et al. |
| 2010/0151759 | A1 | 6/2010 | Capwell et al. |
| 2011/0076494 | A1 | 3/2011 | Gunzel et al. |
| 2011/0183561 | A1 | 7/2011 | Panse et al. |
| 2011/0293958 | A1 | 12/2011 | Benkoski et al. |
| 2014/0004295 | A1 | 1/2014 | Kiederle |
| 2014/0087104 | A1 | 3/2014 | Kierderle et al. |
| 2015/0181963 | A1 | 7/2015 | Kiederle et al. |
| 2015/0238782 | A1 | 8/2015 | Pigliucci et al. |

FOREIGN PATENT DOCUMENTS

| | | |
|---|---|---|
| CN | 101802131 | 8/2010 |
| CN | 101902929 | 12/2010 |
| CN | 101903173 | 12/2010 |
| DE | 3625080 | 1/1988 |
| EP | 0689500 | 4/1993 |
| EP | 1 579 830 A1 | 9/2005 |
| EP | 1894482 | 3/2008 |
| JP | S58-131915 U | 9/1983 |
| JP | 05004291 | 1/1993 |
| JP | 06114979 | 4/1994 |
| JP | 2000-212810 A | 8/2000 |
| JP | 2000-328323 A | 11/2000 |
| JP | 2001-214318 A | 8/2001 |
| JP | 2003205562 | 7/2003 |
| JP | 2005507468 | 3/2005 |
| JP | 2005-537152 A | 12/2005 |
| JP | 3768359 | 4/2006 |
| JP | 2007530799 | 11/2007 |
| JP | 2008-524467 A | 7/2008 |
| JP | 2009280942 | 12/2009 |
| JP | 2010255129 | 11/2010 |
| RU | 2067402 | 10/1996 |
| RU | 2156100 | 9/2000 |
| WO | 9421453 | 9/1994 |
| WO | WO99/05926 | 2/1999 |
| WO | 2004030903 | 4/2004 |
| WO | WO2008/097637 | 8/2008 |
| WO | 2009002384 | 12/2008 |
| WO | WO20091025892 | 2/2009 |

OTHER PUBLICATIONS

International Search Report for PCT/EP2012/064952 dated Mar. 7, 2013.
Chinese Office Action dated Sep. 28, 2015 for CN Patent Application No. 201280075037.X, with English translation, 13 pages.

ENVELOPE FOR A LAMINAR STRUCTURE PROVIDING ADAPTIVE THERMAL INSULATION

The present invention relates to structures providing adaptive thermal insulation, and in particular relates to an envelope for a laminar structure providing adaptive thermal insulation. Such envelope may be used in the design of fabrics or textiles, in particular in applications for personal protective equipment, e.g. garment, like protective garment or other functional garment like gloves.

Protective garment or functional garment is typically used in applications, like fire fighting, law enforcement, military or industrial working, where protection of the wearer against environmental influence is required, or where it is required to provide desired functional characteristics under given environmental conditions. The garment may be required to protect a wearer against heat, flame, or impact by liquids. It is typically desired that the garment provides sufficient comfort for the wearer that he is able to do the work he is supposed to do.

To mention fire fighter's garment, as one application where protective garment or functional garment is used, such garment is required to provide, on the one hand, a significant degree of thermal insulation against flame and heat. This requires the garment to efficiently suppress heat transfer through the garment from the outside to the inside. On the other hand, fire fighter's garment is required to provide sufficient flexibility and breathability to allow the fire fighter to do his work efficiently while wearing the garment. This requires the garment to allow to some degree water vapor transfer (breathability) through the garment from the inside to the outside.

Thermal insulation to be provided by fire fighter's garment is required to be effective under a wide range of environmental temperatures: To mention an extreme case, fire fighter's garment is required to provide sufficient thermal insulation to protect a fire fighter when exposed to a "flashover" of flames in a fire where environmental temperatures may be about 1000° C. and higher. In such case the garment will, at least temporarily, be exposed to a temperature at the outer shell of the garment of about 800-900° C. In case of severe fires, still the outer shell of the garment is expected to be at temperatures up to about 350° C. when the fire fighter has to approach flames closely. The temperatures at the skin of the fire fighter should be reduced to an increase in no more than about 24° C.

In technical non fire related tasks the traditional fire fighter garment offers a level of thermal performance which is usually not needed and leads to low comfort (like low breathability of the garment) due to thick and heavy garment layers. In applications like the fire fighter's garment mentioned above, where the garment is required to provide for a wide range of thermal insulation, it is typically difficult to meet all requirements by static structures, i.e. by structures providing thermal insulation, as required in a worst case scenario, for all time.

A number of dynamic concepts have been suggested. The idea behind such dynamic concepts is to create a structure that provides different degrees of thermal insulation according to given environmental conditions. The thermal insulation provided may adapt to environmental temperatures as experienced by the structure, on its outer side and/or on its inner side.

In the field of fire protection the concept of intumescent systems has been developed and is used in a variety of applications, e.g. in intumescent gaskets for fire doors, or in the form of intumescent coatings for pipes. Such intumescent systems typically involve an intumescent substance having a solid body that is subject to a foaming process under exposure to heat, thus increasing the volume and therefore the insulative property. Usually such foaming process starts when the intumescent substance is subject to a predetermined activation temperature. As a result of the foaming process, the intumescent substance becomes porous, i.e. reduces its density and increases its volume, but still remains to have a solid structure. Typical intumescent substances are sodium silicate, expandable graphite or materials containing carbon and significant amounts of hydrates.

It has been suggested to use intumescent materials for producing fire fighter's garment or other functional garment. US 2009/0111345 A1 discloses a structure providing adaptive insulation for waterproof water vapor permeable fabrics/garments to protect the wearer from heat or flame while maintaining breathability. An intumescent substance based on a polymer resin-expandable graphite mixture is positioned in between a flame barrier and a liquid-proof barrier. US 2009/0111345 A1 specifies an activation temperature of about 200° C. and a volume increase of the intumescent substance of at least 200% after exposure to 300° C. for 90 s. Tests have shown that this approach when applied to fabrics of fire fighter's garment has limitations.

A further approach for manufacturing a flame retardant flexible material that provides thermal protection through an intumescent mechanism is shown in WO 2009/025892 A2. In this material a plurality of discrete guard plates are affixed to an outer surface of a flexible substrate fabric in a spaced relationship to each other. The guard plates include an intumescent material which significantly expands upon exposure to sufficient heat. Thereby a continuous thermally insulating and flame retardant outer shell film is formed upon activation. In an embodiment, the guard plates include heat expandable microcapsules that include water or a water based solution which evaporates upon exposure to heat, thereby absorbing heat from the flame source and expanding the microcapsules until they rupture and release their content to drive oxygen away and quench the flame. Activation temperatures of the water-encapsulating microcapsules are reported to be about 100° C.-400° C.

As alternative to intumescent systems, it has been suggested to provide adaptive thermal insulation for fire fighter's garments using shape memory alloy material or bi-metallic material, see WO 99/05926 A1. According to this approach a dynamic, thermally adaptive, insulation system is based on a spacer material arranged in between an outer shell fabric and an inner liner fabric. The spacer material may be a shape memory alloy trained in helical shape, trough shape, or coil shape, or may be bi-metallic strips or snap disks. Activation temperatures of about 65° C.-75° C. (shape memory alloy), and 50° C. (bi-metallic strips) are reported. In contrast to the suggestions based on intumescent systems discussed above, WO 99/05926 A1 in principle provides for a reversible system that can run through a plurality of activation/deactivation cycles.

WO 2008/097637 A1 discloses a composite fabric system having a thermal barrier comprising an outer shell fabric, a moisture barrier and a thermal liner. The thermal liner comprises at least one thermally expanding flame resistant fabric made from crimped, heat resistant fibers held in a state of compression by a thermoplastic binder in an unactivated condition. When the thermal liner is exposed to heat or flame, the liner is reported to increase its thickness by at least three times.

The applicant of the present application has made a suggestion for a completely different type of a laminar structure providing adaptive thermal insulation, as described in unpublished international patent application PCT/EP2011/051265. The description of the laminar structure providing adaptive thermal insulation of such document is incorporated herein by reference.

The invention aims in providing an improved envelope for a laminar structure allowing adaptive thermal insulation with respect to high temperatures. In a particular application, the invention aims in providing a fabric for use in protective and/or functional garment, particularly for use in fire fighter's garment, said fabric including such improved laminar structure.

The invention provides for an envelope for a laminar structure providing adaptive thermal insulation. The envelope encloses at least one cavity having included therein a gas generating agent having an unactivated configuration and an activated configuration. The gas generating agent is adapted to change from the unactivated configuration to the activated configuration, such as to increase a gas pressure inside the cavity, in response to an increase in temperature in the cavity. The envelope is configured such that a volume of the envelope increases in response to the increase in gas pressure inside the cavity. The envelope is made of a polymer composite material, in particular of a metal/polymer composite material. Such polymer material typically will include a fluid tight layer of metallic material, e.g. of any of the metallic materials described above with respect to the fluid tight layer. It is suggested that the fluid tight layer be covered by a reinforcing layer.

In embodiments, the envelope has, in a condition with the gas generating agent the unactivated configuration thereof, a flat shape with a thickness of the envelope being smaller than a lateral extension of the envelop. Then the envelope is configured such that the thickness of the envelope increases in response to the increase in gas pressure inside the cavity.

Using envelopes according to the invention provides an adaptive thermal insulation structure that increases its thermal insulation capability in response to increase in temperature. It has been demonstrated recently that such structure may show a distinct increase in thermal insulation capability when temperature increases from a range of normal or operation temperatures to a range of elevated temperatures. In some embodiments a distinct increase from a first (usually lower) thermal insulation capability at lower temperatures to a second (usually larger) thermal insulation capability at higher temperatures can be obtained. In preferred embodiments the distinct increase in thermal insulation capability may be associated with an activation temperature, i.e. the structure is activated when temperature increases to the activation temperature or above.

In embodiments, the envelope may be described to define, in a condition of the envelope with the gas generating agent in the unactivated configuration thereof, two lateral dimensions measured along two lateral directions spanning a lateral plane of the envelope, and one thickness dimension measured substantially perpendicular to the lateral plane, the thickness dimension, in a condition of the envelope with the gas generating agent in the unactivated configuration thereof, being smaller than any of the two lateral dimensions. In other words: The envelope may be flat or thin, at least in an unactivated condition thereof in which the gas generating agent is present in the unactivated configuration and has not yet undergone significant transformation into the activated configuration of the gas generating agent. The direction in which the envelope has smallest dimension is considered to be the thickness direction.

When being subject to increasing temperature, the gas generating agent will start to produce gas in the cavity, and hence gas pressure in the cavity will increase. Increasing gas pressure inside the cavity leads to an "inflation" of the cavity. As a result of the inflation, the cavity increases its thickness, and thereby increases the distance between the first layer and the second layer. The result is a "gas layer" or "air layer" which provides for efficient thermal insulation because of the low thermal conduction of gas/air, and because of the increased thickness of the envelope.

The gas generating agent is the "driver" for increasing the thickness of the envelope and increasing an insulating volume. Depending on temperature, the gas generating agent may have an unactivated configuration and an activated configuration. In the unactivated configuration of the gas generating agent the adaptive thermal insulation structure is in its unactivated condition. The activated condition of the adaptive thermal insulation laminar structure is obtained by the change of the configuration of the gas generating agent. The gas generating agent, in the unactivated configuration, may be included in the cavity. The gas generating agent may be any of a liquid, a solid, or a gel, or combinations thereof. The gas generation may occur via a physical transformation (i.e. a phase transition from liquid to gas and/or from solid to gas and/or release of adsorbed gases), or via a chemical transformation (i.e. a chemical reaction releasing at least one gaseous product), or by combinations thereof. It has been found that a desired activation threshold of the gas generating agent, e.g. an activation temperature, can be adjusted suitably well by providing the gas generating agent in the form of a mixture of at least two compounds. As an example a liquid gas generating agent having a desired boiling temperature can be provided by mixing two or more "pure" liquids.

According to the invention, the envelopes enclosing the cavity and the gas generating agent form a thermally activated, inflatable composite structure that, when subject to increased temperature, increases its thickness and in a lot of embodiments also its volume. Using a plurality of envelopes of this type, the invention thus provides for an effect resembling the behavior of intumescent substances when subject to increased temperature, but uses a process entirely different from intumescence. With the envelopes, in particular when used in a laminar structure, described herein the cavity and the gas generating agent are configured in such a way that the increase in geometry and particularly also in volume of the cavity leads to a pronounced increase in thickness of the envelope. Thereby a relatively thick insulating volume filled essentially by air and/or gas is created. Different from known intumescent substances which change configuration from a compact solid structure into a porous solid structure with increasing temperature, the "quasi-intumescent" composite structure according to the envelopes of the invention changes its configuration from an uninflated condition at lower temperatures to an inflated condition at higher temperatures. In contrast to known intumescent substances where a foaming process is started after activation and with the result that a vast plurality of individual cavities are formed, the invention provides for a cavity of predetermined geometry already present in the unactivated condition. After activation this cavity changes its shape such as to increase its thickness and particularly its volume.

The inventors have found that such a "quasi-intumescent" structure can be much better adjusted and controlled in terms of its activation temperature and the rate of activation (i.e. rate of increase in thermal insulation capability with increase in temperature when temperature has reached the activation temperature) than any known intumescent substances. Moreover, it has been shown that even reversible "quasi-intumescent" composite laminar structures can be produced, which allow to reset the system from an activated condition into an unactivated condition, even in a plurality of cycles if desired.

The gas generating agent, which in the unactivated configuration may be included in the cavity, may be adapted to generate gas in the cavity in response to the temperature in the cavity exceeding a predetermined activation temperature.

Activation temperature is meant to be a temperature at which the gas generating agent starts to produce a significant amount of gas in the cavity, the gas pressure in the cavity starts to increase and such increasing gas pressure inside the cavity leads to a volumetric increase ("inflation") of the cavity.

The envelope is configured such as to enclose the cavity in a fluid tight manner. The envelope may be fluid-tight in such a way as to prevent at least in the unactivated configuration of the gas generating agent a leakage of gas generating agent in the form of a fluid out of the cavity. A fluid is a substance that flows under an applied shear stress. Fluids are a subset of the phases of matter and may include liquid phases, gaseous phases, plasmas and plastic solid phases, including mixtures thereof. A fluid may also include subcritical or supercritical phases. Thus, the envelope is considered to be essentially impermeable to the gas generating agent, at least with respect to the unactivated configuration of the gas generating agent.

Fluid tightness of the envelope according to a first aspect is relevant with respect to considerably long timescales of months or even years. An example how to test fluid tightness according to the first aspect is described below.

In a second aspect, the envelope may be even fluid-tight with respect to gas generated from the gas generating agent when being activated. Such fluid tightness, being provided at least temporarily for the time the gas generating agent is in the activated configuration, allows for activation of the envelope without significant loss of gas generating agent. The better the fluid tightness of the envelope according to the second aspect is the larger will be the number of activation/deactivation cycles that can be obtained for the envelope when used with a reversible gas generating agent.

It is not absolutely necessary that the envelope comprises, at least in part, a stretchable or elastic material. Surprisingly, a sufficiently large increase in the thickness, and even in the volume, of the envelope can even be obtained in case the envelope is made of a non-stretchable material with respect to being subject to gas pressure produced in the cavity in the activated configuration of the gas generating agent. The advantage of using a non-stretchable material for the envelope is that much more robust materials are available that allow to maintain fluid tight properties even after a number of activation/deactivation cycles. Furthermore it turned out that the size of the envelope in the activated configuration is better controllable with a non-stretchable material.

The term "non-stretchable" is to be understood in the sense that the material from which the envelope is made does not significantly elongate in any direction when being subject to increased gas pressure inside the envelope after activation. An increase in thickness of the envelope and/or an increase in volume of the envelope may result in changing the shape of the envelope from a "flat shape" towards a "convex shape". Such change in shape is due to the tendency of the cavity to increase its volume for given surface area of the envelope under the gas pressure created as more and more gas generating agent changes from the unactivated configuration to the activated configuration. This process leads to an increase in mean thickness or height of the envelope.

In a particular embodiment, the envelope may be made of a temperature resistant material with respect to a range of temperatures in the cavity in the activated configuration of the gas generating agent.

The term "temperature resistant" is understood to specify that the material is able to withstand a loading temperature, which is higher than the activation temperature by a predetermined temperature increase, e.g. by an increase of 10° C., for a predetermined time. Typically the temperature is 10° C. above the activation temperature, and the time is 1 minute or longer. The required temperature resistant properties depend on the application of the laminar structure, e.g. on the position of the laminar structure in a garment with respect to other layers in the garment. The more the laminar structure will be located towards the source of a heat, the higher will be the requirements for the temperature resistance. In one embodiment the temperature is at least 10° C. above activation temperature for 1 minute. In another embodiment the temperature is 50° C. above activation temperature for 2 minutes. In a preferred embodiment for fire fighter applications the temperature is around 150° C., or more, above activation temperature for 2 minutes.

The envelope may be made up of a single piece, or may be made up of several pieces that are bonded together.

The envelope has a composite structure of a plurality of envelope layers attached to each other. In one embodiment the envelope layers may be bonded together by lamination, either bonded in discrete areas or bonded over the entire areas thereof. Two or more layers may be laminated onto each other. In an envelope having such layered structure, it will be sufficient if at least one layer of said layered structure provides for fluid tightness and therefore forms a fluid tight layer.

In another embodiment the envelope layers may be made of a fluid tight single layer (monolayer). Said layer might be formed to the envelope by welding or gluing.

In some embodiments the envelope may be made of at least two envelope pieces. The at least two envelope pieces may be bonded together such as to enclose the cavity in between. In such configuration, preferably each of the envelope pieces provides for fluid tightness, as desired, and each two adjacent envelope pieces are bonded together in a fluid tight manner. Fluid tightness should be provided with respect to the unactivated configuration of the gas generating agent (see first aspect of fluid tightness above), but preferably fluid tightness is also maintained, at least for a predetermined time, with respect to the activated configuration of the gas generating agent (see second aspect of fluid tightness above). Preferably the fluid tightness of the envelope is maintained even after a plurality of activation/deactivation cycles.

A number of materials may be used to form a fluid tight layer, materials that include but are not limited to, like metals or alloys (aluminium; gold; iron; mild steel; stainless steel; iron based alloys; aluminium based alloys; brass), polymers (polyolefins like polyethylene (PE), polypropylene (PP); polyvinylchloride (PVC); polystyrole (PS); polyester (e.g. polyethylene terephtalate PET); poly-carbonate; polyimide; polyether ether ketone (PEEK); polytetrafluoroethylene (PTFE); polychlorotrifluoroethylene (PCTFE); ethylene chlorotrifluoroethylene (ECTFE); polyvinylidene fluoride (PVDF)), glass, ceramics, nanomaterials (organically modified ceramics, e.g. Ormocers®), inorganic organic nanocomposites), metalized materials. The fluid tight layer may be formed of a plurality of single monolayers of any of the materials mentioned before, or any combination of these materials, in order to obtain a desired fluid tightness. In general the fluid tight layer will be thin with a thickness of 2 mm or below, in order to have sufficient flexibility. In a preferred embodiment the fluid tight layer has a thickness of less than 1 mm.

The envelope is made of a polymer composite material, in particular of a metal/polymer composite material. Such polymer material typically will include a fluid tight layer of metallic material, e.g. of any of the metallic materials described above with respect to the fluid tight layer. It is suggested that the fluid tight layer be covered by a reinforcing layer. Such reinforcing layer turned out to be particularly useful in order to reinforce the fluid tight layer, in particular any metallic material included therein, with respect to enhancing service life of the fluid tight layer by limiting formation of wrinkles in the fluid tight layer. The fluid tight layer, in particular in case it is made of metallic material, it is particularly subject to irreversible formation of wrinkles when subjecting the envelope to one, or a plurality of, activation/deactivation cycles. Once such irreversible wrinkles are formed in the fluid tight layer, the envelope material will preferably deform along these wrinkles in following activation/deactivation cycles. This leads to formation of cracks in the fluid tight layer which will loose its fluid tiahtness after a relatively small number of activation/deactivation cycles.

The inventors have found out that formation of wrinkles in a fluid tight layer, in particular a fluid tight layer of metallic material, can be suppressed efficiently by closely laminating a polymer layer onto the fluid tight layer. Lamination should be done in such a way that an intimate laminar bond results between the fluid tight layer and the polymer layer laminated thereon. It has turned out to be particularly useful to form the reinforcing layer from a composite structure of at least two polymer materials.

Particularly useful materials for forming the reinforcing layer have turned out to be porous polymer materials, e.g. expanded polymer materials like polymer materials comprising an expanded fluoropolymer material. A sheet or foil of such material, which is often applied as a functional sheet material in fabric applications because of its porous structure making the material water vapor permeable, but proof with respect to liquid water, has turned out be a highly efficient reinforcing material, in particular for a sheet of metallic material. Particularly good results were obtained when using a layer of such porous material together with an additional, essentially homogeneous polymer material. Sheets or foils of such material may efficiently limit formation of irreversible wrinkles in the sheet forming the fluid tight layer, in particular in a sheet of metallic material. To achieve such effect, it is required to intimately laminate the polymer material of the reinforcing layer and the material of the fluid tight layer together. If lamination is done properly, a material is obtained that can be deformed a lot of times, e.g. in activation/deactivation cycles of the envelopes, without leaving any irreversible marks on the surface of the reinforcing layer.

A number of fluoropolymer materials are relatively resistant with respect to exposure to high temperatures, and thus are particularly useful materials for providing a adaptive thermal insulation structures. Such fluoropolymer materials are not significantly subject to degradation even after having been exposed to a number of activation cycles, e.g. in fire related activities.

A particularly well suited expanded fluoropolymer material has turned out to be expanded polytetrafluoroethylene (ePTFE). Hence, in a number of embodiments the reinforcing layer may include ePTFE, or even may be made up of ePTFE.

The reinforcing layer may have a thickness between 30 and 400 µm, in particular between 70 and 250 µm. Such thickness has turned out to be particularly useful in case the reinforcing layer includes a substantial fraction of ePTFE, or even is made of ePTFE. Tests have shown that no, or almost no, irreversible wrinkles remain after an activation/deactivation cycle of an envelope has been completed.

Experiments have revealed that material particularly useful for limiting formation of wrinkles often has a porous structure. Particularly well suited porous materials for such purpose seem to have a density of 0.2 to 1 g/cm$^3$. Particularly, such porous material may form a layer with a thickness of between 70 and 250 µm.

An example for suitable porous material is porous expanded polytetrafluoroethylene (PTFE) material, as shown in U.S. Pat. No. 3,953,566. The expanded porous PTFE has a micro-structure characterized by nodes interconnected by fibrils. Generally, a porous material has an inner structure comprising relatively small, or even microscopic, pores which are connected with each other. The pore structure provides for paths from one side of a sheet of porous material to the other side. For small pore sizes, a thin sheet of such porous material may be impermeable with respect to liquid water, although water in form of vapor, as well as gases, may penetrate such sheet via the pore structure. The pore size may be measured using a Coulter porometer, as manufactured by Coulter Electronics, Inc., Hialeah, Fla., carrying out an automated measurement proceJure for determining the pore size distribution, as described in ASTM E1298-89. In cases where the pore size distribution cannot be determined using the Coulter porometer, determination thereof may be done using microscopic techniques.

In case of a microporous membrane, average pore size may be between 0.1 and 100 µm, particularly between 0.2 and 10 µm.

In particular embodiments, the reinforcing layer may include at least one additional polymer material, e.g. polypropylene (PP), polyethylene (PE), polyurethane (PU) or polyethyleneketone (PEK). Such additional polymer material has an essentially homogenous configuration and penetrates the porous material to some extent. The additional polymer material may also form a homogeneous polymer layer on at least one side of the porous material. Penetration of the porous material by the additional polymer material provides for a smooth transition from the porous structure, which provides good stretchability, towards the homogenous structure of the additional polymer material, which provides good resistance with respect to compressive loads. Moreover, when being laminated with a fluid tight layer, e.g. a metallic layer based on Al or Cu, on the side of the additional polymer material, rigidity of such composite structure increases steadily towards the fluid tight layer. The result is that formation of sharp wrinkles, which tend to cause break of the fluid tight material, is inhibited by the reinforcing structure.

Moreover, the additional polymer material may be an adhesive layer for providing stable lamination of the porous material to the fluid tight layer, as the additional polymer material penetrates the pores of the porous material and bonds intimately to the metallic material of the fluid tight layer.

A sufficiently tight lamination may be achieved if the reinforcing layer is bonded to the fluid tight layer using a PU resin or using other thermoplastic material, e.g. FEP or PFA.

The fluid tight layer may be made of metallic material in order to provide for good fluid tightness. A particularly well suited metallic material is Al or an Al based alloy. Alternatively, Cu or a Cu based alloy may be used to provide good fluid tightness.

In some embodiments, the reinforcing layer even may be configured to provide for additional thermal protection. Such reinforcing layer in some aspects has similar characteristics as the heat protection shield to be discussed in more detail below.

Applicant reserves the right to claim protection for a polymer composite laminar material, in particular, for a polymer/metal composite laminar material, having a reinforcing layer to limit formation of wrinkles, as described above, in general, i.e. for use with other structures than the envelopes described herein.

An additional sealing layer may be applied to the fluid tight layer at least on one side thereof, e.g. by calendering. The sealing layer may include a thermoplastic polymer (e.g. polyurethane (PU); PP; PE; polyester). The sealing layer may improve the fluid tightness of the fluid tight layer and may allow welding of two envelope pieces together to generate the fluid tight envelope. To enhance the adhesive characteristics of the fluid tight layer, a pretreatment of the layer surfaces, e.g. by corona discharge, plasma discharge, primers, can be used. Possible welding methods include heat sealing, ultrasonic welding and microwave welding.

In a further possible embodiment, one or a plurality of glue beads e.g. made from a thermoplastic glue, silicones, contact adhesives, reactive glue systems is applied to at least one of the surfaces of the fluid tight layer to be bonded, and then the other surface is attached to the glue bead.

As an example, the envelope may be made of a metal/polymer composite material.

In one embodiment an aluminum/polymer composite material is used for forming the envelope. Such a composite may comprise a polyethylene terephtalate (PET)-layer, an aluminium (Al)-layer and a polyethylen (PE)-layer. A reasonable thickness range for the Al-layer is between 4 μm and 25 μm. Such a composite has shown in one embodiment to be sufficiently fluid tight if the Al-layer has a thickness of at least 12 μm. In a further embodiment of the invention the Al-layer can comprise one or more than one Al sheets. In the case of more than one Al-sheet, the sheets are attached to each other to form one single Al-layer. The attachment of the several Al-sheets might be done in using continuous adhesive polymer sheets to bond the Al sheets together. In another embodiment the Al sheets can be formed using a vapor deposition process. The PE-layer may be used as sealing layer by which adjacent envelope layers can be bonded fluid tightly together in specific areas in order to create the envelope. The thickness of the PE-layer can be between 20 μm and 60 μm. A preferable thickness is about 40 μm. The PET-layer may be used as a cover layer to provide for desired characteristics of the outer surface of the envelope. In one example a 12 μm thick PET-layer may be used. The composite layer structure as described before may be obtained by the company Kobusch-Sengewald GmbH, Germany.

Other possible composite layers for forming the envelope include, but are not limited to:

- a layered composite structure formed with: PET/aluminium/polypropylene (sealing layer) (available under the tradename: Flexalcon® by the company Alcan Packaging GmbH, Germany)
- a layered structure formed with: PET/adhesive/aluminium/adhesive/copolymer/polyethylene (available under the tradename: Tubalflex® by the company Alcan Packaging GmbH, Germany)

In some embodiments, the cavity may include at least a first sub-cavity and a second sub-cavity at least partially stacked above each other in the thickness direction of the envelope, the first sub-cavity and the second sub-cavity being in communication with each other to allow transfer of gas generating agent, at least in the activated configuration thereof, between the first and second sub-cavities.

When included in a laminar structure or fabric extending basically along a lateral plane, the envelope will typically be configured such that the first and second sub-cavities are at least partially stacked above each other in direction towards a heat source. Thus, the lateral directions of the envelope will be parallel to the extension of the layers or fabric from which the laminar structure/fabric is made of. The first and second sub-cavities generally also extend along such lateral extensions and are at least partially be stacked above each other in direction perpendicular to such lateral plane.

Fluid communication between the first and second sub-cavities allows fast exchange of gas generating agent, once activated, between the first and second sub-cavities. Such fast exchange of gas generating agent has turned out to be a key process with respect to achieving a fast response time of the envelope, and any adaptive insulation laminar structure made up using such envelope, with respect to increase in temperature. Particularly, the configuration of the envelope allows for fluid communication of activated gas generating agent between the first and second sub-cavities at any time and in any condition of the envelope. Therefore, inflation of both the first and second sub-cavities will commence nearly simultaneously, irrespective of whether any sub-cavity is more exposed to heat than the other. Also, efficient exchange of activated gas generating agent provides for fast transfer of heat between the first and second sub-cavities, thus gas generating agent activated in one sub-cavity will trigger activation of gas generating agent in the other sub-cavity.

In embodiments, the envelope may include at least one fluid passage or fluid channel connecting the first and second cub-cavities with each other. A fluid passage or fluid channel is considered to provide a passageway of defined cross section available for transfer of fluid. Such fluid passage or fluid channel may be adapted to allow transfer of a desired quantity of gas generating agent in between the first and second sub-cavities, at least for the gas generating agent being in the activated configuration thereof. In a number of embodiments, the fluid passage of fluid channel will not be closed at any time, i.e. will be permeable with respect to the gas generating agent in the activated configuration thereof in any condition of the envelope. In some embodiments the fluid passage or fluid channel will not change its permeability with respect to the gas generating agent in the activated configuration, irrespective of the degree of activation of the gas generating agent. In other embodiments, the fluid passage or fluid channel will typically change its permeability with respect to the degree of activation of the gas generating agent, in the sense that permeability will increase with increasing pressure inside the cavity. E.g. the fluid passage or fluid channel may increase its minimum cross section with increasing degree of activation of the gas generating agent. However, in such embodiments it is conceivable that even in a condition of the envelope with low gas pressure inside the cavity (in practice: when the gas generating agent is essentially completely in the unactivated configuration thereof) the fluid passage will not be closed completely, but may still be permeable to some extent with respect to gas generating agent in the activated configuration. Such configuration ensures that the fluid passage or fluid channel does not have to be opened, or activated otherwise, under increasing pressure in the cavity, e.g. by rupturing of any envelope material or build up of a sufficiently high gas pressure gradient. Therefore, no specific minimum threshold gas pressure exists for exchange of gas generating agent between the first and second sub-cavities. This allows a sensitive and particularly fast activation of the envelope with increasing temperature in the cavity. Further, highly efficient increase in insulation capability is possible with increasing temperature in the cavity, as gas generating agent, once activated, may spread quickly over the volume of the first and second sub-cavities and may help to activate other gas generating agent. As a result, a relatively large insulating volume can be achieved within a very short activation time. The threshold activation temperature can be adjusted relatively precisely using a suitable gas generating agent. Relatively modest activation temperatures in the range of 30 to 70° C. are sufficient for activation of the adaptive insulating function. If desired for particular embodiments, the adaptive insulation structure can therefore be arranged relatively far towards the inner, heat protected side of fire protecting garment. This reduces heat stress considerably. In other embodiments, of course higher activation temperatures can be used, if desired, e.g. because of a configuration where the adaptive insulation structure is arranged relatively far outwards. In such cases, thermal load for the adaptive insulating structure may still be reduced by adding a heat protection shield as described in detail below.

A further benefit, in particular in embodiments of the envelope as described above, is that the at least one fluid passage may be adapted to reversibly change between a first configuration in a condition of the envelope with the gas generating agent in the unactivated configuration thereof, and a second configuration in a condition of the envelope with the gas generating agent in the activated configuration thereof. Since there is no need to fully close the fluid passage in a condition of the envelope with the gas generating agent in the unactivated configuration, a plurality of successive activation/deactivation cycles may be carried out.

The fluid passage need not be permeable with respect to the gas generating agent in the unactivated configuration thereof. It may even be of advantage to have an envelope configuration not allowing any exchange between the first and second sub-cavities with respect to gas generating agent in the unactivated configuration thereof, since such envelope design facilitates even distribution of—unactivated-gas generating agent among the first and second sub-cavities.

In embodiments, the first sub-cavity and the second sub-cavity each may be enclosed by a respective sub-cavity wall. A number of configurations are conceivable, where the sub-cavity walls of the first and second sub-cavities are connected such as to allow for movement of the first sub-cavity with respect to the second sub-cavity in response to change of configuration of the gas generating agent. For example, in some embodiments, the first sub-cavity may be connected with the second sub-cavity essentially only in the region surrounding the fluid passage. In such configurations, the sub-cavity walls of the first and second sub-cavities will be essentially unconnected in other regions thereof. This allows significant movement of the first and second sub-cavities with respect to each other, as there is only a localized or "dot-shaped" connection between the sub-cavity walls enclosing the first and second sub-cavities and movement of the sub-cavity wally with respect to each other is hindered only in such localized connection portions, however not in other regions of the sub-cavity walls outside such localized connection portions. Some other localized portions may be provided where the sub-cavity walls of the first and second sub-cavities are connected in some way: E.g. retaining means may be provided to limit relative movement of the first sub-cavity with respect to the second sub-cavity beyond a predefined condition with maximum thickness of the envelope, or other means for guiding movement of the first sub-cavity with respect to the second sub-cavity in a predefined direction are provided.

The at least one fluid passage may be located essentially centrally with respect to the lateral extension of the envelope in a condition with the gas generating agent in the unactivated configuration. In such configuration the envelope essentially has the configuration of two inflatable pillows stapled on top of each other. Alternatively, the at least one fluid passage may be located along a lateral side of the envelope in a condition with the gas generating agent in the unactivated configuration, thus having a more "accordion" like or hinge like configuration. In both configurations, it is useful if the first sub-cavity and the second sub-cavity are each enclosed by a respective wall and if the walls of the first and second sub-cavities are joined only in the region surrounding the fluid passage. Such configuration ensures a particularly large increase in thickness of the envelope after activation of the gas generating agent, in particular in case there is only one fluid passage, since both sub-cavities may inflate essentially independently of each other.

The thickness of the envelope, in a condition with the gas generating agent in the activated configuration thereof, may be larger by 6 mm, or more, than the thickness of the envelope, in a condition with the gas generating agent in the unactivated configuration thereof. In particular embodiments the thickness of the envelope, in a condition with the gas generating agent in the activated configuration thereof, may larger than the thickness of the envelope, a condition with the gas generating agent in the unactivated configuration thereof, by 8 mm, or more, or may even be larger by 10 mm, or more. Thickness increases up to 14 mm, and even up to 30 mm have been achieved in particular embodiments.

The envelope may be configured to reversibly change such that the thickness of the envelope increases in response to the increase in gas pressure inside the cavity and/or the thickness of the envelope decreases in response to a decrease in pressure inside the cavity.

Particularly, the envelope may be configured such that a volume of the cavity increases in response to the increase in gas pressure inside the cavity.

In embodiments, the envelope may be fluid tight.

An envelope enclosing the cavity with the gas generating agent being included in such cavity, as described above, may be used to provide adaptive thermal insulation to a wide range of laminar structures, including textile laminar structures used to produce garments. Envelopes of the type described may even be used to provide adaptive thermal insulation functionality to existing laminar structures, for example those used with garments, or to improve the thermal insulation functionality of existing conventional laminar structures, e.g. those used with garments.

In embodiments, the first and second sub-cavities may be connected in such a way as to allow the first and second sub-cavities to move relative to each other essentially in thickness direction. Thus, the first sub-cavity will move essentially linearly with respect to the second sub-cavity in response to activation of the gas generating agent. In such embodiments, often the first and second sub-cavities may have a configuration with the first and second sub-cavities having lateral planes extending parallel to each other in a condition with the gas generating agent in the unactivated configuration thereof, and also in a condition with the gas generating agent in the activated configuration. The above mentioned "stacked pillow" configuration with two or more pillows stacked on top of each other is a typical example of an envelope of such configuration.

It is particularly useful to have the at least one fluid passage located at a portion with maximum increase in thickness of the envelope in a condition with the gas generating agent in the activated configuration thereof. The first and second sub-cavities are connected with each other, in order to form the fluid channel, and therefore the maximum increase in thickness of each sub-cavity adds up to the thickness increase of the envelope as a whole. As an example, the at least one fluid passage may be located essentially centrally with respect to the lateral extension of the envelope in a condition with the gas generating agent in the unactivated configuration thereof. For most conceivable shapes of the envelope, in particular for an envelope having the first and second sub-cavity stacked on top of each other without a lateral offset, such central location will be the location where increase in thickness of both sub-cavities is largest.

In further embodiments, the envelope may be made up of at least a first and a second sub-envelope, the first sub-envelope enclosing the first sub-cavity and the second sub-envelope enclosing the second sub-cavity. Then, the first and second sub-envelopes may be bonded together such as to form a fluid communication between the first and second sub-cavities at least with respect to the gas generating agent in its activated configuration. This allows to produce "simple" envelopes each enclosing a single cavity, and to bond together as much of these envelopes as desired in the form of a stack of envelopes. Basically, such sub-envelopes may all have an identical shape, but in some embodiments it may also be conceivable to stack sub-envelopes of different size or shape on top of each other.

As known for "simple envelopes", each of the first and second sub-envelopes may be made of at least one envelope piece of fluid tight material. In a particular embodiment, each envelope may be made of at least two envelope pieces of fluid tight material, the envelope pieces being bonded together in a fluid tight manner, respectively, such as to form the first and second sub-envelopes. See below for a more detailed description of possible configurations of such envelopes.

To realize the fluid communication, an envelope piece of the first sub-envelope located on a side of the first sub-envelope facing an adjacent envelope piece of the second sub-envelope, and the adjacent envelope piece of the second sub-envelope may be configured to provide for the fluid communication between the first and second sub-cavities. As an example, for combining two "simple" envelopes to a composite structure made up of two sub-envelopes, such envelope piece of the first sub-envelope may be provided with at least one first fluid passage, and the adjacent envelope piece of the second sub-envelope may be provided with at least one corresponding second fluid passage. Then the sub-envelopes are joined in such a way that the first and said second fluid passages form the fluid communication. In such construction, the envelope piece of the first sub-envelope may be bonded to the adjacent envelope piece of the second sub-envelope such as to provide for a fluid tight connection between the first passage formed in the envelope piece of the first sub-envelope and the corresponding second passage formed in the adjacent envelope piece of the second sub-envelope. The result of such operation is an essentially fluid-tight envelope. For bonding essentially the same possibilities exist as described below with respect to bonding of different envelope pieces. Further, see below for a more detailed specification of the fluid-tightness achievable by such bonding.

In further embodiments of the envelope the first and second sub-cavities may be connected in a hinge-like configuration allowing the first sub-cavity to rotate relative to the second sub-cavity. The configuration of the envelopes may be such that rotation of the first cavity with respect to the second cavity is possible in addition, or alternative to, an essentially linear movement in thickness direction as described above.

The effect achieved by connecting the first and second sub-cavities in a hinge-like configuration has turned out to be dramatic. With an envelope of this type, there are, in the condition of the envelope with the gas generating agent in the unactivated configuration, at least two relatively flat or thin sub-cavities superposed to each other, such as to essentially extend in parallel to each other. The envelope as a whole is therefore relatively thin or flat.

However, once the gas generating agent has been activated, it will spread over the complete volume of all sub-cavities, thus inflating all sub-cavities. The result of such inflation will be that all sub-cavities, being connected to each other in the hinge-like configuration, will change their configuration relative to each other from their essentially parallel orientation towards an angled orientation where the thickness direction of the first sub-cavity will be angled towards the thickness direction of the second sub-cavity. Thereby, the change in thickness of the envelope as a whole will be larger than the sum of the changes in thickness of the first and second sub-cavities.

The hinge-like configuration may comprise a first pivot. The hinge like configuration allows for rotation of the first sub-cavity relative to the second sub-cavity around the first pivot. Further, the first pivot may be assigned to the at least one fluid passage, in particular in such a configuration that the at least one fluid passage extends across the first pivot. For example, the first pivot may be formed with walls enclosing the at least one fluid passage.

Each of the first and second sub-cavities may define a lateral sub-cavity plane, in a manner analogous to the above description of a lateral plane of the envelope as a whole. The lateral sub-cavity planes of the first and second sub-cavities define an angle in between, the angle increasing from a first angle, in a condition with the gas generating agent in the unactivated configuration thereof, to a second angle, in a condition with the gas generating agent in the activated configuration thereof. The first angle may be very small, sometimes close to zero degrees or even zero degrees (in case the lateral sub-cavity planes are parallel).

In further embodiments, the first pivot may be located on a first lateral side of the envelope. In embodiments where sub-cavity walls of the first sub-cavity and the second sub-cavity, respectively, are connected in the region surrounding the at least one fluid passage, the at least one fluid passage, in a condition with the gas generating agent in the unactivated configuration thereof, may also be be located on the first lateral side of the envelope.

A particular configuration of an envelope as described, being easy to manufacture and providing good thermal insulation capabilities, has a folded configuration such as to form the first and second sub-cavities separated from each other by a folding structure, in a condition of the envelope with the gas generating agent in the unactivated configuration thereof. In such embodiments the hinge-like configuration comprises such folding structure, the folding structure forming the first pivot of the hinge-like configuration, or even may be formed by such folding structure.

This particularly simple design of envelopes allows to essentially manufacture a simple envelope, e.g. as described in the applicant's international patent application PCT/EP2011/051265, and to fold such envelope along a folding structure, in particular along a folding line, in order to create the first and second sub-cavities stacked on top of each other in thickness direction. It is advantageous for such configuration if the unfolded envelopes have an elongate shape in a plan view, such that an essentially symmetrical shape in the lateral plane, e.g. an essentially round or quadrangular shape, results after folding. The at least one fluid channel crosses the folding structure such as to provide the fluid communication between the first and second sub-cavities.

In further embodiments, the hinge-like configuration may comprise a second pivot. Then, the first and second pivots together provide for a configuration allowing for rotation of the second sub-cavity with respect to the first sub-cavity. In such configuration is, however, not absolutely necessary and in a number of embodiments only the first pivot will be assigned to a fluid passage.

A particular advantage of providing a second pivot is that the rotation of the first sub-cavity with respect to the second sub-cavity may be defined more precisely. In particular, the first pivot and the second pivot may define an axis of rotation of the first sub-cavity with respect to the second sub-cavity, and thus rotation of the first sub-cavity with respect to the second sub-cavity in response to activation of the gas generating agent will be limited to rotation in a plane orthogonal to such axis of rotation. Moreover, the angle of rotation may be limited to an optimum range with respect to allow reversible increase/decrease in thickness of the envelope in response to activation/deactivation of the gas generating agent.

In simple embodiments, the second pivot may be located at the same lateral side of the envelope as the first pivot. However, in other embodiments the second pivot may be located at a second lateral side of the envelope different from the first lateral side. E.g. the second pivot may be located on an adjacent lateral side.

In further embodiments, the envelope further may comprise a connection member connecting the first and second sub-cavities with each other at a position different from the first pivot. One function provided by such connection member is to restrict rotation of the first sub-cavity with respect to the second cavity to rotational angles below a maximum threshold angle, in order to make sure that a return to the original configuration of the envelope is possible in response to a change of gas generating agent from the activated configuration thereof to the unactivated configuration thereof. In such case, the connection member has the function of a retaining member. Such retaining function may be provided by a connection member provided on an opposite lateral side with respect to the first pivot, or by a connection member provided on a lateral side angled with respect to the lateral side on which the first pivot is located, but in some distance to the first pivot.

A connection member provided on a lateral side of the envelope angled with respect to the lateral side on which the first pivot is located, in particular located on an adjacent lateral side of the envelope, is particularly well suited to define an axis of rotation for movement of the first sub-cavity with respect to the second sub-cavity, and thus to guide such rotational movement.

In particular embodiments, the second pivot may comprise a connection member as described above.

As mentioned above, the envelope still may be made of the same material as the envelopes known from PCT/EP2011/051265. In particular, the envelope may be made of at least one envelope piece of fluid tight material, preferably made of one envelope piece or two envelope pieces of fluid tight material, being bonded together in a fluid tight manner such as to enclose the first and second sub-cavities.

Further, the at least one envelope piece may be bonded together such as to form at least one fluid passage connecting the first and second sub-cavities, the fluid passage crossing the folding structure. The fluid passage may have the form of a fluid channel of given cross section. The cross section may be adjusted according to a desired permeability of the fluid passage with respect to the gas generating agent in the activated configuration thereof.

The envelope may even include more than two sub-cavities. As an example, in one particular embodiment, the envelope may include at least a first, a second and a third sub-cavity at least partially, or even fully, stacked above each other in thickness direction of the envelope. In such embodiment, the first and second sub-cavities may be separated from each other along a first folding structure, while the second and third sub-cavities may be separated from each other along a second folding structure located on an opposite side of the second sub-cavity with respect to the first folding structure. The result is a type of "accordion" configuration of the envelope which yields a particularly pronounced increase in thickness of the envelope—and thus of insulation capability—with increasing temperature. Particularly interesting, such increase in insulating capability does not lead to significantly longer reaction times between temperature increasing beyond a desired threshold and full activation of the insulating capability of the envelope.

As set out above, an envelope according to the invention may have the form of stacked or interconnected "pillows" or "pockets". Such envelope may have in the unactivated configuration of the gas generating agent a lateral dimension of 2 mm or more. In particular embodiments the envelope may have a lateral dimension of 5 mm or more, preferably of 15 mm or more. Typically, the envelope may have a thickness dimension of less than 2 mm. Lateral dimension, as used in this context, refers to the smallest dimension of an envelope in a width/length plane. i.e. in a plane orthogonal to the thickness direction, which in general is the by far smallest dimension of an envelope in the unactivated configuration of the gas generating agent. Therefore, the lateral dimension basically defines the maximum increase in thickness which an envelope can reach in the activated configuration of the gas generating agent. A plurality of such flat envelopes may be used to form a flat laminar structure (as described above) which allows a high breathability of the laminar structure and therefore a higher comfort level for the wearer.

Expressed in term of volume increase, the cavity may have, in the activated configuration of the gas generating agent, a volume increase of between 10 and 1000 with respect to the volume in the unactivated configuration of the gas generating agent. Preferably the volume increase may be above 40.

In a still further embodiment the envelope enclosing the cavity may comprise an outer envelope and an inner envelope, the outer envelope enclosing an outer cavity, the inner envelope being located within the outer cavity and enclosing the cavity.

In an embodiment the gas generating agent in the unactivated configuration may have the form of a liquid. In that case the activation temperature of the adaptive thermal insulation laminar structure may correspond to the boiling temperature of the gas generating agent.

In another embodiment a solid or gel may be used as gas generating agent. Such solid is preferably in the form of a powder which provides for large surface area. A gel is a compound having functional groups embedded therein according to chemical and/or physical bonding mechanisms (e.g. chemical mechanisms like covalent bonding or physical mechanisms like van der Waals-bonds, sterical bonding effects). Examples for gels are hydrogels. Gels may have a limited fraction of solids. A solid or a gel is easier to handle than liquid due to the requirement of fluid tightness of the envelope.

The activation of a liquid or solid gas generating agent may involve a physical transformation, namely a phase transition into gaseous phase. The gas generating agent may be in the form of a liquid, then vaporization of the gas generating agent takes place by activation. It is also possible to use a solid gas generating agent which is able to undergo sublimation into the gas phase.

It is not intended to transform thermal energy into latent heat, in order to slow down increase in temperature. Rather, it is intended to transform all thermal energy into an increase of the distance between first layer and second layer. In case the phase transition does not need to provide for latent heat, gas production in the cavity is fast, and hence a fast increase in the distance between the first layer and the second layer can be achieved at the activation temperature. This is particularly advantageous at low activation temperatures, since it has been found that fast activation rates can be obtained down to rather low activation temperatures of about 50° C. In a garment, therefore, the inventive laminar structure does not need to be located close to the outer side of the garment which is usually exposed to highest temperatures, e.g. in a flame. Rather, it is possible to locate the laminar structure more to the inner side of the garment, i.e. towards the skin of a wearer. Such an arrangement reduces the requirements concerning the thermal resistance of the materials used.

In an embodiment, the gas generating agent may have a non-significant enthalpy of vaporization or enthalpy of sublimation. The enthalpy of vaporization may be 150 J/g or even lower. In another embodiment the gas generating agent may have a low activation energy in case of physical desorption or chemical reaction.

In case of a fluid gas generating agent, the gas generating agent may have a boiling temperature below 200° C. In particular embodiments a boiling temperature between 30° C. and 100° C., preferably between 30 and 70° C., even more preferably between 40 and 60° C. and most preferably between 45° C. and 55° C. has been used. In a particular embodiment a fluid has been used with a boiling point at about 49° C. An example for such a fluid is a fluid comprising 1,1,1,1,2,2,4,5,5,5-nonafluoro-4-(trifluoromethyl)-3-pentanone $CF_3CF_2C(O)CF(CF_3)_2$ (available as "3M NOVEC® 1230 Fire Protection Fluid"). The enthalpy of vaporization of such fluid is about 88 J/g.

In some embodiments a fluid gas generating agent with one or more of the following characteristics may be used: freezing point of the liquid below room temperature; non flammable or ignition temperature above 200° C.; non hazardous; non or at least low toxicity; low ozone depletion potential; low global warming potential; high chemical and/or temperature stability. In the case thermal decomposition of the fluid occurs it is preferred that such thermal decomposition is reversible.

The gas generating agent may be selected from the group including, but not limited to, the following compounds or mixtures thereof: hydrochlorofluoro-carbons; hydrofluoropolyethers; hydrofluoroethers; hydrofluorocarbons; hydrofluoroketones; perfluoro-analogies and the like. Typically such liquids are used for applications like heat exchangers, refrigeration, air conditioning, fire fighting, cleaning/cooling fluids in the electronic industry.

Examples for conceivable fluids are: Galden® HT55, Galden®SV55, Galden®ZV60, all available from Solvay Solexis; Novec® 1230 Fire Protection Fluid, Novec® 649 Engineered Fluid, Novec® HFE 7100, Novec® HFE 7200, Novec® HFE 7500, all available from 3M; Vertrel® XF 2,3-dihydrodecafluoro-pentane available from DuPont; Asahiklin® AE, Asahiklin® AK, available from Ashahi Glass Company, Daikin HFC available from Daikin.

In a further embodiment the gas generating agent, in the unactivated configuration, may have the form of a liquid, a gel or a solid, and the activation temperature of the adaptive thermal insulation laminar structure will be a temperature which corresponds to the activation energy of a chemical reaction leading to release of at least one gaseous compound from the gas generating agent.

When gas generating agent is a solid or a gel, activation may more easily be achieved by a chemical process producing a compound that is released into the gaseous phase. A number of chemical reactions producing gaseous reaction products are known. Examples are: release of gaseous compounds embedded in a gel; soda-reaction; release of ammonia and hydrochloric acid from ammonium chloride. Preferable chemical reactions for releasing gaseous compound have kinetics with very steep increase in reaction rate at the activation temperature, and fast reaction rate.

To facilitate handling of the gas generating agent, in particular to facilitate placement of the gas generating agent in the cavity when manufacturing the envelope a dosing aid might be used.

In one embodiment the envelope may include a dosing aid wherein the dosing aid extends into the cavity and has a portion to which the gas generating agent is applied, said portion being included in the cavity. The gas generating agent may be in many cases a substance that is difficult to handle, e.g. because of its viscosity, fugacity, stickiness and/or because it is hazardous. In such cases the use of a dosing aid will be helpful as it is much easier to handle than the gas generating agent alone. When the gas generating agent is activated it will increase the pressure in the cavity. Should the gas generating agent be deactivated at a later stage the gas generating agent may again collect at the dosing aid. This is, however, not absolutely necessary. It is conceivable that the gas generating agent, once re-converted into its unactivated configuration will be included in the cavity separate from the dosing aid.

The dosing aid may be made of a material that is able to absorb the gas generating agent in its unactivated configuration. Alternatively, the dosing aid may be made of a material that is able to adsorb the gas generating agent in its unactivated configuration. Typically, a dosing aid which absorbs the gas generating agent will allow a better handling of the gas generating agent during manufacture, as the gas generating agent is safely included in the structure of the dosing aid. However, it may happen that desorption of the gas generating agent is hindered or at least retarded. In such cases a dosing aid to which the gas generating agent adheres only at the surface may be beneficial.

In an embodiment, the dosing aid may be smaller than the cavity in the unactivated configuration of the gas generating agent, such that the dosing aid can be safely enclosed by the envelope enclosing the cavity.

In a further embodiment the dosing aid is welded together with the material of the envelope. In such a case the dosing aid may be made of a material that is able to support the formation of a fluid tight seal when being welded together with the material of the envelope. Such configuration of the dosing aid is beneficial as it allows the dosing aid to be sandwiched between and to be welded together with the layers that have to be bonded together to form a fluid-tight seal. As an example, the dosing aid may be provided as a sheet forming a weldable dosing aid layer. A number of embodiments of such dosing aid are described in applicant's international patent application PCT/EP2011/051265. The description of these dosing aids is incorporated herein by reference.

In further embodiments, an envelope as described above may be combined with a heat protection shield being assigned to cover at least a heat exposed side of the envelope with respect to a source of heat. It has turned out to be a particular advantage of the envelopes described above that activation of the gas generating agent can occur at relatively moderate temperatures, e.g. at activation temperatures of about 40 to 70° C. Being subject to such moderate activation temperatures, the envelopes are subject to moderate thermal stress only. Because of the lower thermal stress envelopes can be designed which are able to undergo an extended number of activation/deactivation cycles without significant degradation of their adaptive thermal insulation capabilities, e.g. up to 30 to 40 cycles, or even more.

Under emergency situations often fire protecting garment is exposed to temperatures much higher than the modest activation temperatures mentioned above. This particularly applies for the outer layer of fire protective garment, or a layer close to such outer layer.

A heat protection shield as suggested herein may efficiently reduce temperature at the heat exposed side of the envelope. Therefore, in combination with a heat protection shield, envelopes with modest activation temperatures can also be used in configurations where significantly higher thermal loads are to be expected. With respect to other solutions, like using a gas generating agent having higher activation energy, providing an additional heat protection shield improves reversibility of the envelope because of the lower thermal stress to which the envelope is exposed.

For example, the heat protection shield may have a configuration to essentially exclusively cover the at least one envelope to which it is assigned. In an embodiment, the envelope may have assigned to it a corresponding heat protection shield. Such heat protection shield may have essentially the same shape as the envelope to which it is assigned. The heat protection shield may have a first lateral extension measured by the area covered by the heat protection shield in a plane essentially orthogonal to the source of heat. The at least one envelope to which it is assigned may a second lateral extension measured by the area covered by the at least one envelope in the plane essentially orthogonal to the source of heat. Then, the first lateral extension of the heat protection shield may be essentially identical to the second lateral extension of the at least one envelope. A heat protection shield configured in this way essentially provides a shield with respect to a heat flux from the source of heat towards the envelope to which it is assigned. It does, however, not cover any other areas of the fabric, thus the influence of the heat protection shield on breathability is insignificant.

The heat protection shield may be assigned to a single envelope. Then, there is a 1:1 relationship between heat protection shield and envelope, except for some envelopes that may not necessarily need to have a heat protection shield assigned to it. Alternatively, a heat protection shield may be assigned to a group of envelopes, thus essentially covering the area occupied by the envelopes of that group with respect to a source of heat. Typically, the envelopes belonging to a same group will be adjacent envelopes.

Particularly, the heat protection shield may be positioned in between the source of heat and an outer side of the envelope directed towards the source of heat. The heat protection shield may be joined to the envelope assigned to it, or may be provided separately from such envelope, e.g. as part of an outer fabric layer. The source of heat will usually be located adjacent an outer side of a fabric or garment. Thus, often the source of heat may be referred as the outer side of such fabric or garment, and the flux of heat will be from the outside to the inside of the fabric or garment essentially orthogonal to the outer side of the fabric or garment.

In order to extend the envelope service life and to allow for a number of consecutive activation/deactivation cycles, it is desirable if the heat protection shield has a configuration to provide for a temperature decrease at the heat exposed side of the envelope below a temperature where envelope material starts to degrade. Thus, the configuration of the heat protection shield depends on the material from which envelope is composed as well as on the expected thermal loads in "activation situations". E.g. the envelope may be made of a composite material and the heat protection shield may have a configuration to provide for a temperature decrease at the heat exposed side of the envelope below a lowest melting point of the envelope material. Such lowest melting point will often be determined by an adhesive by which layers of the envelope are bonded together. In some embodiments, the envelope may include a polymer material, particularly PET, as described above. Then, the heat protection shield may have a configuration to provide for a temperature decrease of the heat exposed side of the envelope below the melting point of the polymer material.

It has been found to be reasonable for a lot of embodiments of the envelope, if the heat protection shield has a configuration to provide for a temperature decrease at the heat exposed side of the envelope below 270° C.

The heat protection shield may be made of a single material, given such material is temperature resistant enough and able to absorb or reflect sufficient flux of heat. Alternatively, the heat protection shield may be is made of a composite material. A heat protecting shield made single or composite material may comprise any of the any of the following types of material: ceramic, aramides, carbon, glass, heat resistant polymers like PTFE, PPS, melamine, polyimide, or combinations thereof. In particular, the heat protection shield may be made up of any of a woven fabric, non-woven fabric and/or film. "Film", as used herein, is understood to refer to a contiguous, continuous or microporous, layer of a polymer material or other material, e.g. metal.

It has been found that sufficient protection against flux of heat can be obtained by using a heat protection shield with a thickness between 100 and 1600 µm, in particular between 200 and 800 µm.

In particular embodiments, the heat protection shield may comprise a polymer layer made of polytetrafluorethylene (PTFE), expanded polytetrafluorethylene (ePTFE), polyimide, or combinations thereof. In particular embodiments, the polymer layer, e.g. made of ePTFE, has a thickness in the range of 30 to 90 µm.

The heat protection shield not necessarily needs to be coupled physically with the envelope protected by it. The heat protection shield may well be positioned in an outer layer of a fabric or garment, while the envelope may be assigned to a more inner layer. In a number of embodiments, the heat protection shield may be bonded to an outer layer of the envelope, such that the envelope and the heat protection shield assigned to it form a unitary body which is incorporated in a laminar structure, fabric, or garment.

Particularly, the heat protection shield may be bonded to the outer layer of the envelope within a laterally inner, or central, bonding portion, such that a lateral end portion, or peripheral portion, of the heat protection shield projects from the outer layer of the envelope. This applies in the activated configuration of the gas generating agent, at least. If the heat projecting shield projects from the outer layer of the envelope in such a way, it provides for additional thermal protection, since an air gap is formed in between the lateral end portion of the heat protection shield and the outer layer of the envelope in the activated condition of the envelope. Such additional air gap efficiently provides for thermal insulation. E.g. in a lot of embodiments it will be sufficient if the laterally inner bonding portion has an essentially dot shaped configuration.

Typically, only one side of a fabric or garment is expected to be potentially exposed to high temperatures. In such cases, the heat protection shield may be provided at the heat exposed side of the envelope only, but on other sides thereof, in particular not at the side opposite to the heat exposed side. In other cases, it may be preferable if the heat protection shield covers the envelope completely. Such configuration may be simpler in manufacture of a great number of envelopes, and additionally has the benefit of simplifying assembly into a laminar structure or fabric easier.

Envelopes as described above may be used to form a laminar structure providing adaptive thermal insulation, comprising a first layer, a second layer, at least one envelope according to any of the previous claims, the envelope being provided in between the first layer and the second layer, the first layer, the second layer and the cavity being arranged such that a distance between the first layer and the second layer increases in response to the increase in gas pressure inside the cavity.

Laminar structure as used herein defines a structure having, at least in the unactivated condition of the structure, a planar or sheet like configuration extending essentially in lateral directions, as defined by length and width directions, and being thin. A configuration is considered thin if it has a thickness in the direction orthogonal to length and width directions that is much smaller than length and width. In typical applications, the laminar structure as defined herein will be a flexible laminar structure with respect to bending, or a rigid laminar structure.

The first and second layers may be layers arranged such as to face each other in a thickness direction of the laminar structure. The first and second layers do not necessarily need to be adjacent layers. Besides the cavity, other structural elements of the laminar structure, e.g. insulating material, may be interposed in between the first and second layers. The first and second layers will usually extend essentially parallel to each other and orthogonal to the thickness direction. Distance between the first and second layers can be measured in thickness direction. In case the first and/or second layers are not in the same plane, but have a structure with embossments and/or depressions, distance between the layers is meant to refer to a given reference plane. In practical implementations, the first and second layers may e.g. be layers of a fabric, e.g. a first fabric layer and a second fabric layer, with the cavity being sandwiched in between the first layer and the second layer. The first and second layer may be referred to as inner layer and outer layer, respectively. In applications of the inventive laminar structure to fabrics used in garment, the term "inner layer" means a layer that is directed to the body of the wearer and typically is arranged as close as possible to the skin of the wearer, whereas the term "outer layer" means a layer directed away from the body of the wearer to the environment.

The laminar structure may comprise a plurality of cavities and each of the cavities may be encased by a respective envelope. Preferably each of the envelopes is fluid tight. In such arrangement the envelopes will be arranged next to each other and with distance to each other.

E.g. such a laminar structure may comprise a plurality of the envelopes and have the configuration of a quilted blanket, wherein the first layer and the second layer are coupled to each other via a stitching such as to form a plurality of pockets and wherein the envelopes are each inserted into a respective pocket.

Such an arrangement provides breathability of the laminar structure, especially in case the envelopes themselves are not water vapor permeable. Rather, breathability is maintained by spaces between the envelopes. Such spaces are formed at least in the unactivated condition of the laminar structure. In the activated condition the spaces between the envelopes preferably do not shrink much, since the envelopes are inflated only and do not substantially increase their surface area. Hence, breathability is maintained also in the activated condition of the laminar structure.

The envelope may have the form of a pad or chip, the pad or chip being flat in the unactivated condition and changing shape to the shape of an inflated pillow in the activated condition.

Breathability as used herein is understood to specify the characteristic of the laminar structure, or of a fabric or garment including such a laminar structure, to be able to transport water vapor from one side of the laminar structure to its other side. In one embodiment the laminar structure may be also water-tight in comprising at least one water-tight and water vapor permeable (breathable) functional layer. In one embodiment the first layer and/or the second layer comprises said functional layer. In another embodiment said functional layer forms an additional layer of the laminar structure. The functional layer can be realized using suitable membranes, e.g. microporous membranes made from expanded polytetrafluoroethylene (PTFE).

The term "water vapor permeable layer" as used herein is intended to include any layer which ensures a water vapor transmission through a layer or said laminar structure or layered composite. The layer might be a textile layer or a functional layer as described herein. The functional layer may have a water vapor permeability measured as water vapor transmission resistance (Ret) of less than 30 $(m^2 Pa)/W$.

The water vapor transmission resistance or resistance-evaporation-transmission (Ret) is a specific material property of sheet-like structures or composites which determine the latent evaporation heat flux through a given area under a constant partial pressure gradient. A laminar structure, fabric composite, textile layer or functional layer according to the invention is considered to be water vapor permeable if it has a water vapor transmission resistance Ret of below 150 $(m^2 Pa)/W$. The functional layer preferably has a Ret of below 30 $(m^2 Pa)/W$. The water vapor transmission resistance (Ret) is measured according to ISO EN 11092 (1993).

The term "functional layer" as used herein defines a film, membrane or coating that provides a barrier to air penetration and/or to penetration of a range of other gases, for example gas chemical challenges. Hence, the functional layer is air impermeable and/or gas impermeable. The functional layer is in particular embodiments air impermeable, but it might be air permeable in other applications.

In a further embodiment the functional layer also provides a barrier to liquid water penetration, and ideally to a range of liquid chemical challenges. The layer is considered liquid impermeable if it prevents liquid water penetration at a pressure of at least 0.13 bar. The water penetration pressure may be measured on a sample of the functional layer based on the same conditions described with respect to the ISO 811 (1981).

The functional layer may comprise in one embodiment one or more layers wherein the functional layer is water vapor permeable and air-impermeable to provide air impermeable but water vapor permeable (breathable) characteristics. Preferably the membrane is also liquid impermeable, at least water impermeable.

A suitable water impermeable and water vapor permeable flexible membrane for use herein is disclosed in U.S. Pat. No. 3,953,566 which discloses a porous expanded polytetrafluoroethylene (PTFE) material. The expanded porous PTFE has a micro-structure characterized by nodes interconnected by fibrils. If desired, the water impermeability may be enhanced by coating the expanded PTFE with a hydrophobic and/or oleophobic coating material as described in U.S. Pat. No. 6,261,678.

The water impermeable and water vapor permeable membrane might also be a micro-porous material such as high molecular weight micro-porous polyethylene or polypropylene, micro-porous polyurethane or polyester, or a hydrophilic monolithic polymer such as polyether polyurethane.

In a particular embodiment the laminar structure and/or the envelope may be configured to reversible change. In such embodiment the gas generating agent is configured to decompose or evaporate, and recombine or condensate again in response to a respective change in temperature. In an activation cycle, in response to an increase in temperature, the distance between the first layer and the second layer will increase from the first distance (in the unactivated configuration of the gas generating agent) to the second distance (in the activated configuration of the gas generating agent). In a deactivation cycle, in response to a decrease in temperature, the distance between the first layer and the second layer will decrease from the second distance (in the activated configuration of the gas generating agent) to the first distance (in the unactivated configuration of the gas generating agent). Similarly, in an activation cycle, in response to an increase in temperature, the volume of the cavity enclosed by the envelope will increase from a first volume (in the unactivated configuration of the gas generating agent) to a second volume (in the activated configuration of the gas generating agent). In a deactivation cycle, in response to a decrease in temperature, the volume of the envelope will decrease from a second distance (in the activated configuration of the gas generating agent) to a first distance (in the unactivated configuration of the gas generating agent). Such a sequence of activation cycle plus deactivation cycle may be repeated multiple times. It goes without saying that the terms "first distance" (in the unactivated configuration of the gas generating agent) and "first volume" (in the unactivated configuration of the gas generating agent) as used herein refer to any situations in which the laminar structure/envelope is in a non-inflated condition, while the terms "second distance" (in the activated configuration of the gas generating agent) and "second volume" (in the unactivated configuration of the gas generating agent) as used herein refer to any situations in which the laminar structure/envelope is in an inflated condition. For the laminar structure/envelope to be reversible, it is not required that the first distances, or the first volumes, realized before start and after completion of an activation/deactivation cycle, respectively, are exactly the same. Rather, these distances/volumes should be reasonably within the same range before start and after completion of the first activation/deactivation cycle to allow the start of new second activation/deactivation cycle, and so on. Similar consideration may be applied with respect to the second distances/second volumes. Reversibility requires that at least one full activation/deactivation cycle be carried out and that at least one further activation process be possible. In particular embodiments, an even larger numbers of consecutive activation/deactivation cycles, e.g. 2 full cycles, 5 full cycles, 10 full cycles, or even more, is achievable.

The envelope is intended not to rupture after activation, thereby the activation process is in principle reversible, and may be repeated multiple times. This requires a gas generation process that is in principle reversible and that the gaseous product(s) released remain within the cavity (i.e. the envelope should be, at least temporarily, gas tight with respect to the gases released). Typical examples for reversible gas generating processes are a physical phase transition of the gas generating agent (in the form of a pure compound or in the form of a mixture), or a sublimation process, e.g. sublimation of iodine. Another example for a reversible gas generating process is the reversible decomposition of e.g. ammonium chloride.

Preferably, the laminar structure and/or the envelope are flexible and have a "self-recovering capability". Thereby, in a deactivation cycle the envelope automatically recovers its original shape, i.e. its shape before activation of the gas generating agent started. No further mechanical action is necessary to support this process. The "self-recovering capability" of the envelope is supported by the fluid tightness of the envelope: In a deactivation cycle, the gas generating agent generally will increase its density when undergoing a transformation from the gaseous phase into the liquid phase. Hence the gas generating agent will occupy a much smaller volume in the unactivated configuration than in the activated configuration. In the absence of air flowing into the envelope during a deactivation cycle, the transformation of the gas generating agent will induce a contraction of the envelope into a (flat) shape in which it encloses a cavity of minimum volume. By such process also the distance between the first layer and the second layer will return to the original distance in the unactivated configuration of the gas generating agent.

The configuration of the laminar structure, as outlined above, allows for provision of macroscopic cavities enclosed by respective envelopes, which can be activated when subject to heat.

The laminar structure outlined above may be incorporated into a fabric composite structure. The term "fabric" refers to a planar textile structure produced by interlacing yarns, fibers, or filaments. The textile structure may be a woven, a non-woven, a fleece or combinations thereof. A "non-woven" textile layer comprises a network of fibers and/or filaments, felt, knit, fiber batts, and the like. A "woven" textile layer is a woven fabric using any fabric weave, such as plain weave, crowfoot weave, basket weave, satin weave, twill weave, and the like. Plain and twill weaves are believed to be the most common weaves used in the trade.

Such fabric composite structure typically will comprise a plurality of fabric layers arranged to each other. The plurality of fabric layers may include an outer heat protective shell structure having an outer side and an inner side. The plurality of fabric layers may also include the laminar structure providing adaptive thermal insulation, as described above.

In a particular embodiment, the laminar structure providing adaptive thermal insulation may be arranged on the inner side of the outer heat protective shell structure.

As an embodiment the outer heat protective shell structure denotes an outer layer of an article (such as a garment) that provides primary flame protection. The outer heat protective shell structure may comprise a flame resistant, thermally stable textile, e.g. a woven, knit or non-woven textile comprising flame resistant textiles like polyimides (meta-aramid, para-aramid) or blends thereof. Specific examples for flame resistant or thermally stable textiles comprise polybenzimidazole (PBI) fiber; polybenzoxazole (PBO) fiber; poly diimidazo pyridinylene dihydroxy phenylene (PIPD); modacrylic fiber; poly(metaphenylene isophthalamide) which is marketed under the tradename of Nomex® by E.I. DuPont de Nemours, Inc; poly (paraphenylene terephthalamide) which is marketed under the tradename of Kevlar® by E.I. DuPont de Nemours, Inc.; melamine; fire retardant (FR) cotton; FR rayon, PAN (poly acrylnitril). Fabrics containing more than one of the aforementioned fibers may also be utilized, (Nomex®/Kevlar®, for example). In one embodiment an outer shell layer made with woven Nomex® Delta T (textile weight of 200 g/m$^2$) is used.

Flame resistant materials are specified in international standard EN ISO 15025 (2003). DIN EN ISO 14116 (2008) specifies test methods for assessing flame resistance of materials. According to DIN EN ISO 14116 (2008), different levels of flame resistance are specified. As an example, flame resistant materials to be used for fire fighter's garments are required to pass the test procedures specified for level 3 in DIN EN ISO 14116 (2008). For other applications less strict criteria, as specified for levels 1 and 2, may be sufficient.

The fabric may also comprise a barrier structure. In one embodiment the barrier structure will be arranged on the inner side of the outer heat protective shell structure.

In particular applications, the barrier structure comprises at least one functional layer. Said functional layer may be water vapor permeable and water proof and comprising at least one water vapor permeable and water proof membrane.

The barrier structure is a component that serves as a liquid barrier but can allow moisture vapor to pass through the barrier. In garment, such as firefighter turn out gear, such barrier structures keep water away from inside the garment and thereby minimize the weight which the firefighter carries. In addition, the barrier structure allows water vapor (sweat) to escape—an important function when working in a hot environment. Typically, the barrier structure comprises a membrane laminated to at least one textile layer like a nonwoven or woven fabric. Membrane materials which are used to be laminated to at least one textile layer (also known under the term laminate) include expanded polytetrafluoroethylene (PTFE), polyurethane and combinations of those. Commercially available examples of such laminates include laminates available under the name CROSSTECH® moisture barrier laminates or a Neoprene® membrane on a nonwoven or woven meta-aramid fabric.

In one embodiment a barrier structure comprising a membrane of expanded PTFE (ePTFE) made as described in EP 0 689 500 B1 is used. The barrier layer may be adhered to a textile layer made of non-woven aramide textile (15% para-aramid and 85% meta-aramid) with a textile weight of 90 g/m$^2$. Such a barrier structure is commercially available under the name GORE-TEX® Fireblocker N. In another embodiment a barrier structure available under the name CROSSTECH®/Nomex® PJ moisture barrier is used. Such moisture barrier comprises an ePTFE film with a polyurethane layer attached to a polyamide textile (Nomex®IIIA) with a textile weight of 105 g/m$^2$. Other barriers may be used, e.g. as described in U.S. Pat. No. 4,493,870, U.S. Pat. No. 4,187,390, or U.S. Pat. No. 4,194,041.

Barriers other than moisture barriers are conceivable, e.g. barriers providing at least one functional layer that prevents permeation of gases and/or liquids like chemical compounds in the form of gases, liquids and/or aerosols, or like substances comprising biological material in the form of gases, liquids and/or aerosols. In particular embodiments such other barrier layers may also be breathable.

The barrier structure may be positioned in between the outer heat protective shell structure and the laminar structure that provides adaptive thermal insulation.

The fabric may be used in protective garment or functional garment typically used in applications, like fire fighting, law enforcement, military or industrial working, where protection of the wearer against environmental influence is required, or where it is required to provide desired functional characteristics under given environmental conditions. The garment may be required to protect a wearer against heat, flame, or impact by liquids. It is typically desired that the garment provides sufficient comfort for the wearer that he is able to do the work he is supposed to do.

In particular, it is intended that the fabric be adapted for use in a fire/heat protective garment.

Exemplary embodiments of the invention will be described in greater detail below taking reference to the accompanying drawings which show embodiments.

FIG. 10 shows a fire fighter's jacket including a fabric as shown in FIG. 9a;

Figure 16:
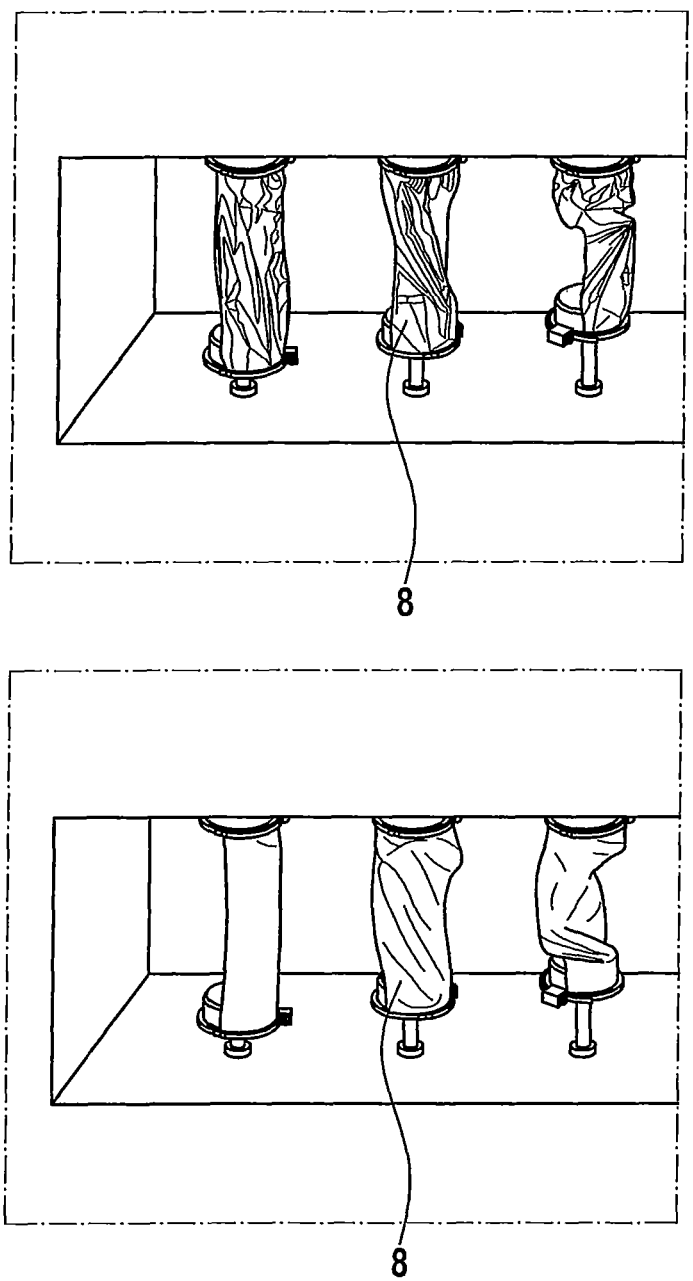
Figure 17:
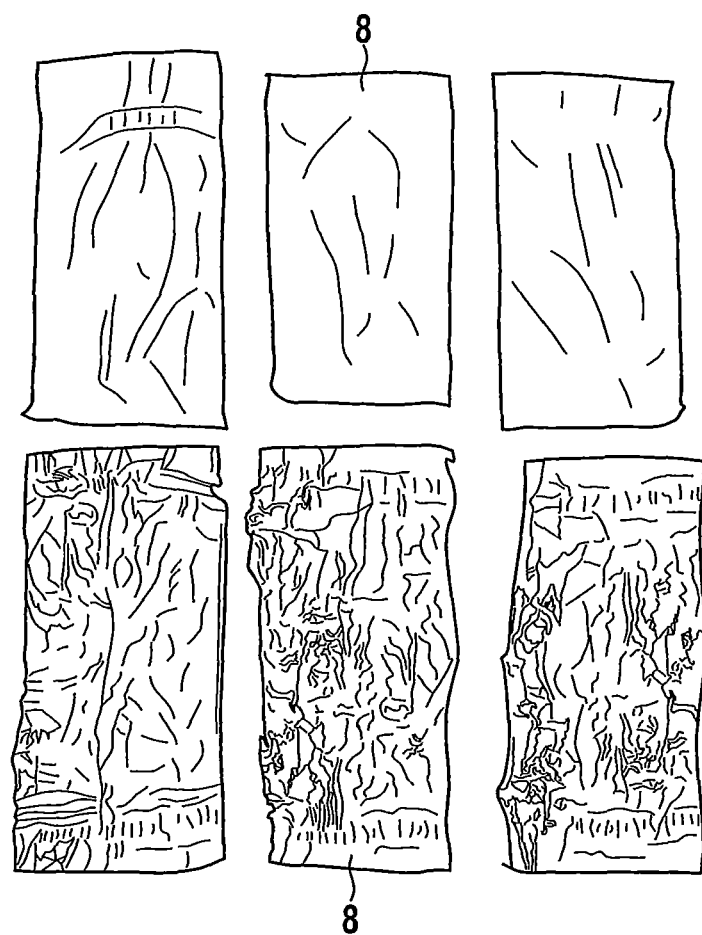

FIG. 16 shows in schematic form an apparatus for measuring formation of wrinkles in sheet material 8 used to form the envelope 20; and FIG. 17 shows photographs of different types of sheet material 8 after a wrinkle formation test has been carried out.

In all Figs. components of respective embodiments being identical or having corresponding functions are denoted by the same reference numerals, respectively. In the following description such components are described only with respect to the first one of the embodiments comprising such components. It is to be understood that the same description applies in respective following embodiments where the same component is included and denoted by the same reference numeral. Unless anything is stated to the contrary, it is generally referred to the corresponding description of that component in the respective earlier embodiment.

Figure 1A:
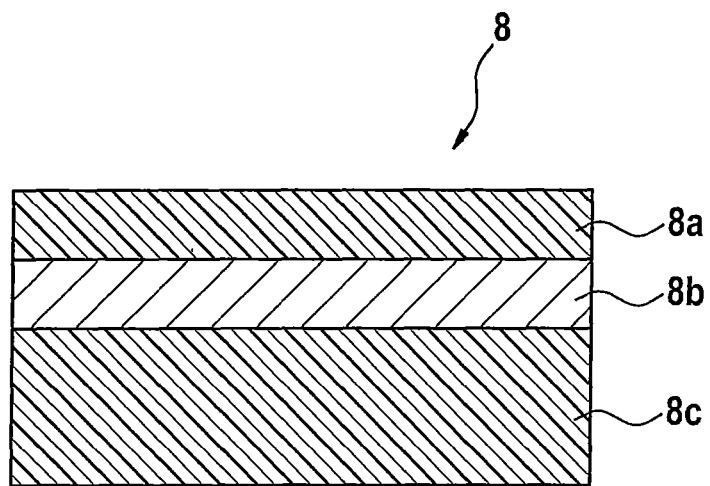
FIG. 1a shows a simplified and schematic cross-sectional view of a layer used to form an envelope in an embodiment.

FIG. 1a shows a simplified and schematic cross-sectional view of a layer 8 according to an embodiment. Such layer 8 may be used to prepare an envelope. The layer 8 is a laminate comprising a cover layer 8a, a fluid tight layer 8b and a sealing layer 8c. In one example the layer 8 made of an aluminum/plastics composite material comprising a polyethylene terephtalate (PET)-cover layer 8a, an aluminium (Al)-fluid tight layer 8b and a polyethylene (PE)-sealing layer 8c. In order to provide sufficient fluid tightness, a reasonable thickness range for the Al-layer 8b is between 4 μm and 25 μm. In the example shown the Al-layer 8b has a thickness of at least 12 μm. The PE-layer 8c is used as sealing layer by which adjacent laminate layers 8 can be bonded together fluid tightly, in order to create the envelope. The thickness of the PE-layer 8c can be between 20 μm and 60 μm. A preferable thickness is about 40 μm. The PET-layer 8a may be used as a cover layer to provide for desired characteristics of the outer surface of the envelope. In the example a 12 μm thick PET-layer 8a is used. The laminate layer 8 as described may be obtained by the company Ko-busch-Sengewald GmbH, Germany.

Figure 1B:
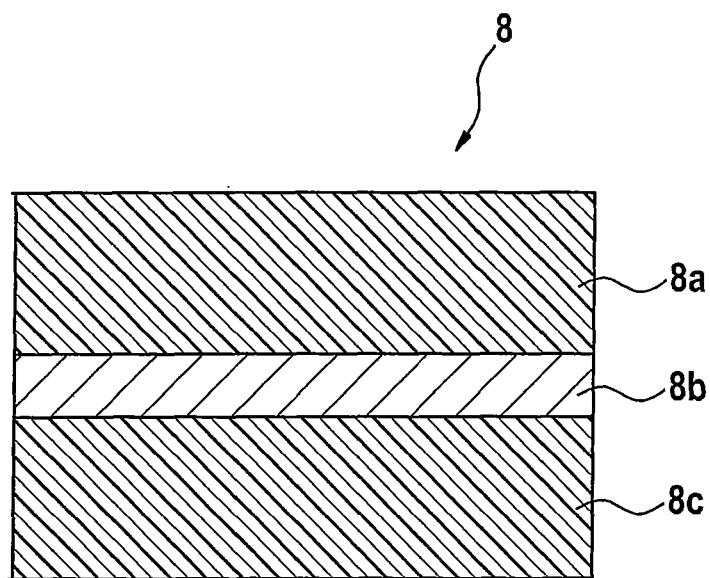
FIG. 1b shows a simplified and schematic cross-sectional view of a further layer used to form an envelope.

An alternative layer 8 for forming the envelope is shown in FIG. 1b. This layer 8 also is a laminate including a cover layer 8a made of PE with a thickness of 40 μm, an Al layer 8b with a thickness of at least 12 μm, and a PE sealing layer 8c with a thickness of 40 μm. In this embodiment the cover layer 8a is made of the same material as the sealing layer 8c. The cover layer 8a may be used as an additional sealing layer.

Figure 1C:
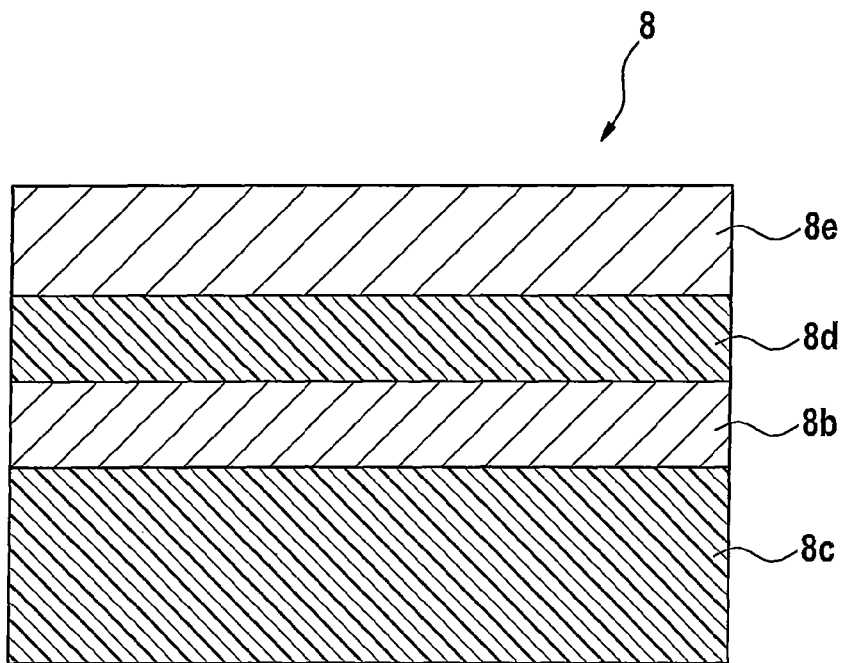
FIG. 1c shows a simplified and schematic cross-sectional view of a further layer including a polymer reinforcing layer for limiting formation of wrinkles, such layer also used to form an envelope.

FIG. 1c shows a simplified and schematic cross-sectional view of a further layer 8 including a composite polymer reinforcing layer made of a homogenous polymer material layer 8d and a porous polymer material layer 8e. Such layer 8 is also used to form an envelope 20 in particular embodiments. The composite polymer reinforcing layer is configured to limit formation of wrinkles in the fluid tight layer 8b. A reinforcing layer as shown in FIG. 1c has turned out to be particularly helpful when being intimately laminated together with a metallic fluid tight layer 8b, e.g. a fluid tight layer of an Al or Al alloy.

In the embodiment shown in FIG. 1c a reinforcing layer is bonded to the fluid tight layer 8b on the side thereof facing outwards when an envelope is manufactured (upper side in FIG. 1c). The reinforcing layer in this example replaces cover layer 8a. The reinforcing layer has a composite structure with a porous polymer material layer 8e and a homogenous polymer material layer 8d. Porous polymer material layer 8e in this example is made of expanded polytetrafluoroethylene (ePTFE) and has a thickness in the range of 70 to 250 μm. in one preferred example the thickness is of 200 μm with a density of 0.7 g/cm³ The porous polymer material layer 8e may have a of 0.2 to 1 g/cm³.

A polymer material forming a homogeneous polymer layer 8d is applied to the side of porous polymer material layer 8e facing inwards in an envelope, i.e. to the side facing towards fluid tight layer 8b. Homogeneous polymer material layer 8d may be made of polymer materials like PP, PE, PU, or PEK. Homogenoeus polymer material layer 8d may have a thickness between 40 and 300 μm. The polymer material of the homogenous polymer material layer 8d, although shown with a sharp boundary to the porous layer 8e in FIG. 1c, in reality does not have such sharp boundary, but penetrates into the pore structure of porous material layer 8e to some extent. Penetration depth of the polymer material may be between 10 and 50 μm. Penetration of the polymer material into the pores of porous polymer layer 8e results in a firm and tight bonding between layers 8e and 8d. Moreover, such penetration allows a smooth transition between good stretchability of the reinforcing layer at its side facing outwards in a manufactured envelope (upper side in FIG. 1c), where porous polymer material layer 8e is positioned, and good resistance against compressive loads at the side to which fluid tight layer 8b is bonded (lower side in FIG. 1c), where homogeneous polymer layer 8d is provided.

The reinforcing layer formed by porous material layer 8e and homogeneous polymer layer 8d is bonded to the fluid tight layer 8b of Al using a polyurethane resin. In the embodiment shown in FIG. 1c the same polyurethane resin which is used as a polymer material to form the homogeneous polymer layer 8d is used to bond the reinforcing layer to the fluid tight layer. In other embodiments, an adhesive different from homogeneous polymer layer may be used.

Figure 8A:
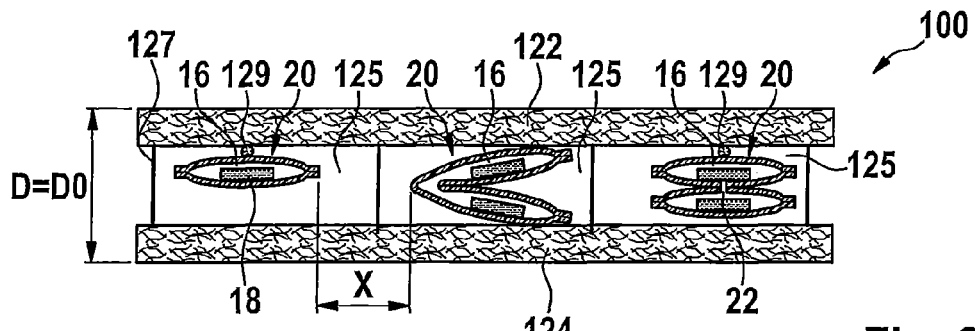
FIG. 8a shows a simplified and schematic cross-sectional view of a laminar structure, according to an embodiment, formed with a plurality of envelopes positioned in between a first layer and a second layer in an unactivated condition.
Figure 8B:
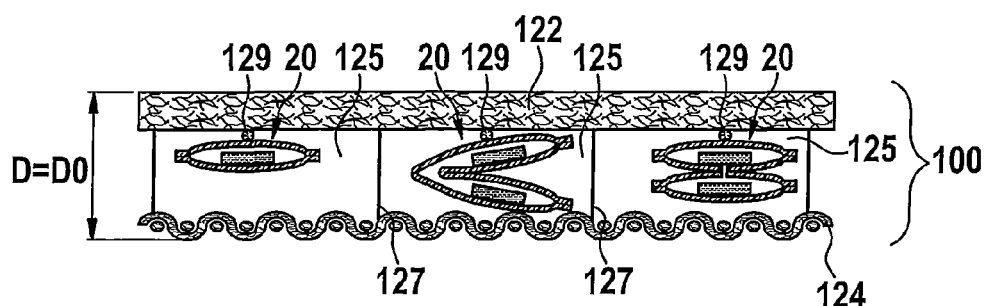
FIG. 8b shows a simplified and schematic cross-sectional view of a laminar structure, according to a further embodiment, with a plurality of envelopes positioned in between a first layer and a second layer, in an unactivated condition.

Inner layer 8c is a sealing layer made of PET similar to the embodiments shown in FIGS. 8a and 8b.

Figure 2A:
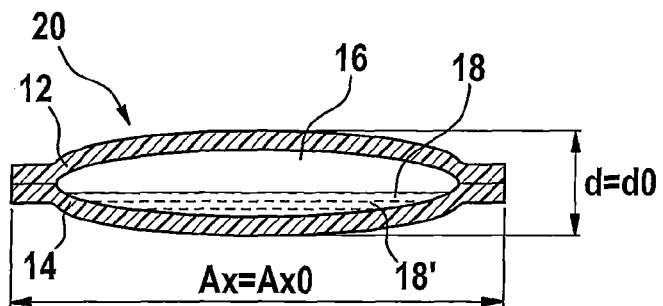
FIGS. 2a and 2b show an example of an envelope as described in PCT/EP2011/051265, in an unactivated condition and in an activated condition.

FIG. 2a shows a simplified and schematic cross-sectional view of an envelope (generally designated as 20) as disclosed in applicants previous international patent application PCT/EP2011/051265 enclosing a cavity 16 which includes a gas generating agent (generally designated as 18). In FIG. 2a the envelope 20 is shown in an unactivated configuration of the gas generating agent 18, and hence the envelope 20 has an uninflated, essentially flat shape, also referred to as the unactivated condition. In a flat configuration as shown in FIG. 2a, the envelope 20 has a dimension $d=d0$ in thickness direction being significantly smaller than the dimensions $Ax=Ax0$, $Ay=Ay0$ of the envelope 20 directions orthogonal to the thickness direction, i.e. in lateral directions $Ax$, $Ay$. Dimension of the envelope 20 in thickness direction is designated by d in FIG. 2a. Dimension of the envelope 20 in lateral directions is designated by $A=Ax0$ in FIG. 2a. Here, $Ax$ designates the length from one end of the weld to the end of the opposite weld of the envelope 20. In embodiments with a generally "round" or quadrangular shape of the envelope, dimensions $Ax$, $Ay$ of the envelope may be substantially equal for all lateral directions. In other embodiments of the envelope with a generally elongate shape, dimension $Ax$ in a width direction may be smaller than dimension $Ay$ in a length direction.

In an embodiment the envelope 20 is made of two envelope layers 12, 14. Envelope layers 12, 14 may each have a configuration as the layers 8 shown in FIG. 1a, 1b or 1c. Particularly, although not explicitly shown, the envelope layers 12, 14 may be each made up of three layers, corresponding to the layers 8 depicted in FIG. 1a, 1b or 1c. The envelope layer 12 forms an upper part of the envelope 20, such upper part enclosing an upper part of cavity 16. The envelope layer 14 forms a lower part of the envelope 20, such lower part enclosing a lower part of cavity 16. In the embodiment shown, the envelope layer 12 and the envelope layer 14 have an identical configuration, e.g the configuration of the layer 8 shown in FIG. 1a. The envelope 20 has an innermost sealing layer, an intermediate fluid tight layer, and an outside cover layer.

Alternatively, the envelope 20 may be made up of two envelope layers 12, 14 configured from a layer 8 as depicted in FIG. 1b, or may be made up of one envelope layer 12 configured from a layer 8 as depicted in FIG. 1a and one envelope layer 14 configured from a layer 8 as depicted in FIG. 1b. Alternative materials, in particular monolayers or laminate layers of more or less complicated configuration, may be used for making the envelope 20, as outlined above, given the materials themselves are fluid tight and bonded together fluid tightly such that a fluid tight envelope 20 is produced. In one embodiment the envelope layers may be made of a fluid tight single layer (monolayer). Said layer might be formed to the envelope by welding or gluing.

The envelope 20 encloses cavity 16 which is filled with gas generating agent 18. Gas generating agent 18 is chosen to be a liquid having a suitable equilibrium vapor pressure at room temperature. Room temperature is considered to define an unactivated configuration of gas generating agent 18. In the unactivated configuration of the gas generating agent 18 shown in FIG. 2a, gas generating agent 18 is substantially in its liquid phase designated by 18'. The envelope 20 provides a substantially fluid tight enclosure of cavity 16, and hence cavity 16 contains sufficient amount of gas generating agent 18, and the remaining volume of cavity 16 is filled with gas, in particular with a rest amount of air or other gas having been enclosed in cavity 16 at the time gas generating agent 18 was filled in. In the example disclosed, gas generating agent 18 is a fluid having the chemical formula $CF_3CF_2C(O)CF(CF_3)_2$. Such fluid is typically used for extinguishing fires and is commercially available under the trade name "Novec® 1230 Fire extinguishing fluid" from 3M. Other fluids may be used for the gas generating agent, as set out above.

A first method for producing an envelope 20 as shown in FIG. 2a is as follows:

First Sealing Step:

Two envelope layers 12, 14 made from a material according to FIG. 1a or 1b are put on top of each other, such that their respective sealing layers face each other. For forming a quadrangular envelope 20 a hot bar (sealing width: 2 mm) is brought into contact with the envelope layers 12, 14 such as to bring the sealing layers into contact and to weld the sealing layers together. This procedure is done for three of four sides of the quadrangular envelope 20. Thus an envelope 20 with one side open is formed.

Filling Step:

The envelope 20 is put onto a precision scale and the gas generating agent 18 is filled into the envelope, e.g using a syringe needle. The amount of gas generating agent to be filled in is controlled by the scale.

As an example: A quantity of 0.07 g gas generating agent 18 will be filled into the envelope 20, in case the envelope 20 has the following specification: the envelope 20 is formed from two envelope layers 12, 14 made up of PET/Al/PE as described above, outer size of the envelope 20 is 20 mm length and 20 mm width (corresponding to an inner size of the cavity of 16 mm length and 16 mm width), and gas generating agent 18 is selected as Novec® 1230.

Second Sealing Step:

After the filling step is finished the open side of the envelope 20 is closed by a fourth 2 mm sealing line. The envelope 20 is then cut precisely along the sealing line.

Such method is also available for producing any other envelope as shown in FIGS. 4a-4e, 5, 6a/b, 7a/b. In case a dosing aid 19 is used, in the filling step the dosing aid 19 including the gas generating agent applied to the dosing aid is placed inside the envelope, before the second sealing step, or in some cases even before the first sealing step.

Correctness of the filling quantity for envelopes produced as outlined above can be measured as follows:

A predetermined quantity of envelopes 20 (e.g. 10 envelopes) is produced according to the first sealing step, each of these envelopes 20 is marked and weighed individually on a 4 digit scale (e.g. Satorius BP121S). A predetermined quantity of gas generating agent 18 in the form of a liquid is injected through a pipe from a gravity feed reservoir, including a time-triggered valve, through a syringe needle into the interior of the envelope. A predetermined time for valve opening is ensured by an adjustable electrical timer. Each envelope 20 is closed immediately by the second sealing step. Each of the filled envelopes 20 is weighed, and the weight of the empty envelope 20 (measured before filling) is subtracted. A maximum deviation of plus/minus 10% from the mean value of the sample set should be achievable.

Figure 2B:
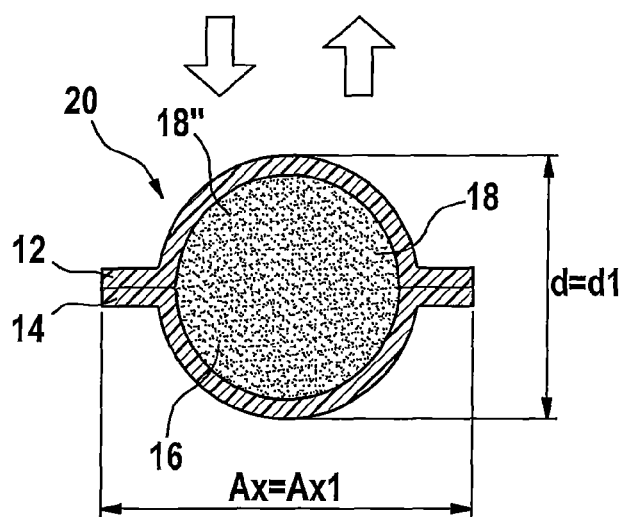

A second method for producing an envelope 20 according to FIG. 2a, 2b is shown in FIGS. 3a to 3d. FIGS. 3a to 3e show how such method may be used to produce envelopes 20 as shown in FIGS. 5, 6a-6e. The method is as follows:

First Step (FIG. 3a):

An elongate sheet, e.g. sheet being 65 mm wide and 1.3 m long, made from a laminate material 8 according FIG. 1a is used. Alternatively, a sheet of different size and/or made from another laminate material, e.g. made from a laminate material 8 as shown in FIG. 1b, may be used. The sheet is folded along its long side in such a way that the cover layer 8a of the laminate 8 (see FIG. 1a or FIG. 1b) is located outside, and the sealing layer 8c is located inside. Thereby, an upper envelope layer 12 and a lower envelope layer 14 are formed in such a way that the sealing layers of the envelope layers 12, 14 are facing each other. In this way a pre-envelope 101 is created. The pre-envelope 101 has a width of 32.5 mm and a length of 1.3 m. The pre-envelope 101 is closed at its one long side 102 and is open along its opposite long side 103. Both short sides 104 and 105 of the pre-envelope 101 are open.

Second Step (FIG. 3b):

A rotating ultrasonic welding wheel (e.g. 5 mm wide) is brought into contact with the pre-envelope 101 at the open long side 103, such as to bring the two sealing layers of the envelope layers 12, 14 into contact with each other. The sealing layers are welded together continuously along a sealing line 106 extending parallel to the open long side 103 of the pre-envelope 101. Thereby the long side 103 is closed and the pre-envelope 101 has a tubular shape with two open short sides 104, 105. A hot sealing bar (sealing width: 2 mm) is brought into contact with the pre-envelope 101 at one of the shorter sides 105, such as to bring the sealing layers into contact with each other. The sealing layers are welded together along a sealing line 107 extending parallel to the shorter side 105 such as to close the pre-envelope 101 at the shorter side 105. The pre-envelope 101 then has a shape of a tube with one end closed.

Then, holding open short side 104 higher than closed short side 105, gas generating agent 18 is filled into the open tubular pre-envelope 101 via the open short side 104. As an example, for a pre-envelope 101 as described and forming a cavity with inner size of 23 mm in width and 1 m in length, the pre-envelope 101 being made of a laminate layer 8 made up of PET/Al/PE, as described above and shown in FIG. 1a, and for a gas generating agent 18 being a liquid known as Novec® 1230, as described above, a quantity of 4 ml of gas generating agent 18 is filled into the pre-envelope 101.

Figure 3A:
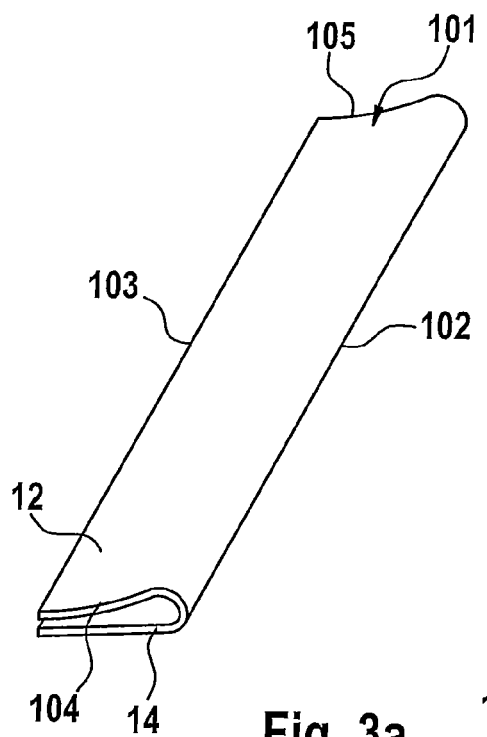
FIGS. 3a-3c show a way how to manufacture envelopes.
Figure 3B:
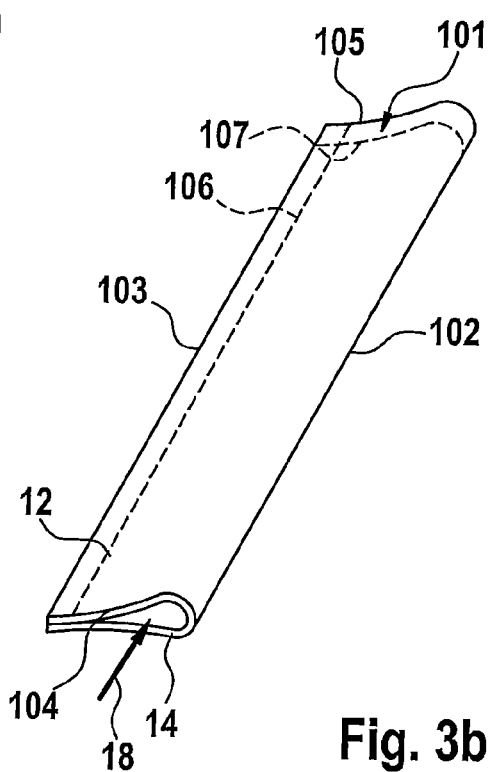
Figure 3C:
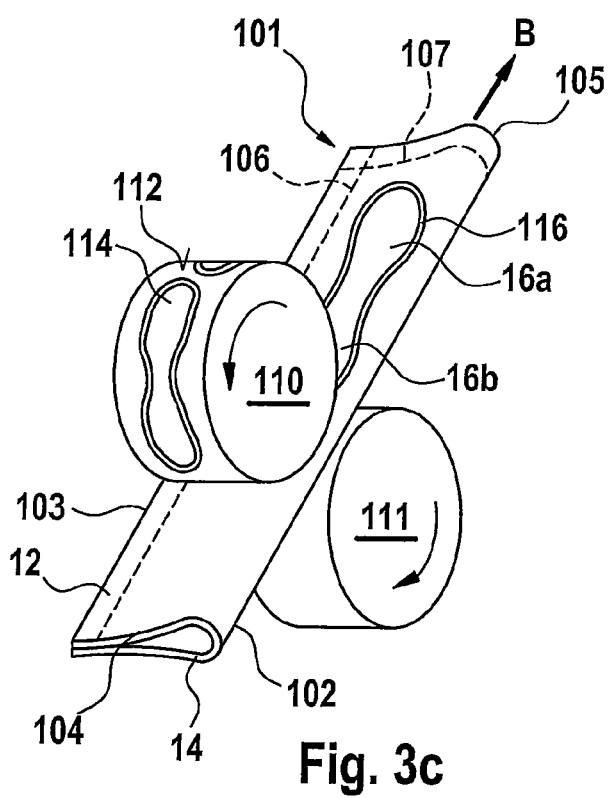

Third Step (FIG. 3c)

The pre-envelope 101 is held with its open short side 104 facing upwards, and is held in an up-right position, such that the gas generating agent 18 filled in the cavity concentrates at the closed shorter side 105 of the pre-envelope 101. Starting from the closed shorter side 105, the pre-envelope 101 is brought into intimate contact with a second rotating ultrasonic welding wheel 110. Welding wheel 110 is part of an ultrasonic welding machine having a pair of welding wheels 110, 111. The welding wheel 110 has a circumferential face 112 formed with a plurality of circumferential seal contours 114 Each of the seal contours 114 has a shape corresponding to the shape of the sealing line of the envelopes 20 to be produced (FIG. 2d). In this configuration welding wheel 111 has a planar circumferential surface.

The pre-envelope 101 is transported through the pair of welding wheels 110, 111 starting with its short closed side 105, see arrow B in FIG. 2c indicating the direction of movement of the pre-envelope 101. In this way the welding wheel 110 first contacts first the closed short side 105 of the pre-envelope 101 and finally contacts the open short side 104 of pre-envelope 101.

When the welding wheel 110 contacts the pre-envelope 101, the gas generating agent 18 is pushed away by the rotating ultrasonic welding wheels 110, 111 in areas where one of the sealing contours 114 comes into contact with the pre-envelope 101, since in such areas the sealing layers are brought into contact with each other and are welded together. In this way, a closed sealing contour 116 defining the sealing portion of the final envelope 20 (FIG. 2*d*) is formed in the pre-envelope 101.

As the pre-envelope 101 travels through the gap between the rotating welding wheels 110, 111 a plurality of consecutive sealing contours 116 are formed in the pre-envelope 101. Each sealing contour 116 encloses a respective cavity 16 including a first sub-cavity 16*a* and a second sub-cavity 16*b* filled by a predetermined amount of gas generating agent 18.

It has been found that, following the procedure described above, each sub-cavity 16*a*, 16*b* formed in pre-envelope 101 can be filled by the approx. same predetermined amount of gas generating agent 18. Particularly good reproducible results can be obtained by using an ultrasonic welding tool, e.g. in the form of a pair of ultrasonic welding wheels 110, 111, to produce the sealing contours 116 in the pre-envelope 101.

In one example having dimensions as outlined above 20 filled sealing contours 116, each having outer dimensions of 20 mm width and 46 mm length and a sub-cavity size of 16 mm width and 18 mm length, can be created.

Figure 3D:
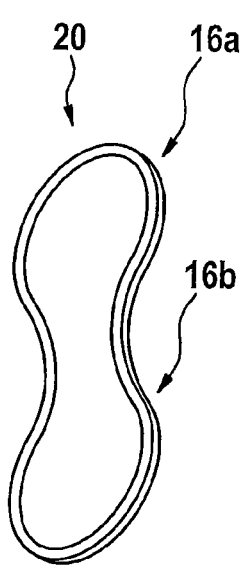
FIG. 3d shows a single envelope in a configuration before folding to create first and second sub-cavities.
Figure 3E:
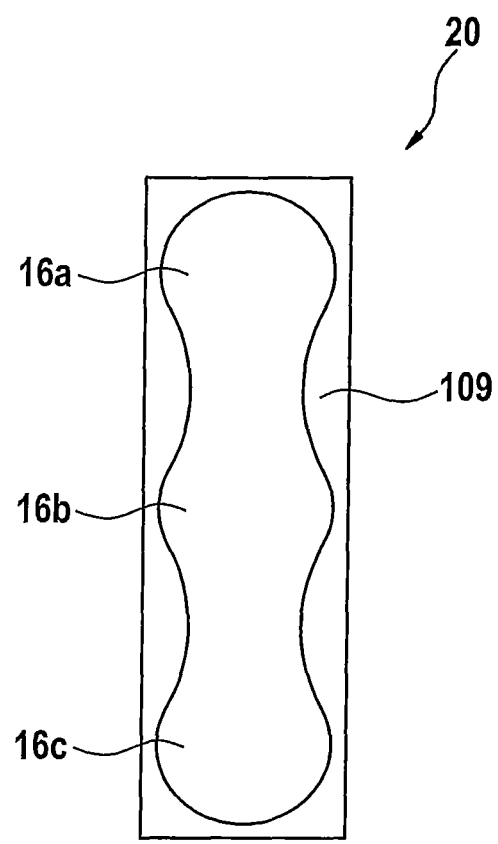
FIG. 3e shows an embodiment of a sheet layer structure including a three of interconnected sub-cavities of a single envelope, in a configuration before folding.

Fourth Step (FIG. 3*d*):

Finally, the final pre-envelope 101 having sealing contours 116 formed therein, is cut, e.g. using a hand operated or automated standard dye cut machine with a cutting dye having the shape of the outer dimensions of the sealing contours 116. In this way individual envelopes 20 having a first sub-cavity 16*a* and a second sub-cavity 16*b* as shown in FIG. 3*d*, are produced.

It is even conceivable to omit or modify the fourth step, i.e. the last cutting step. Then instead of a plurality of single envelopes 20, a sandwich type laminate sheet 20 (see FIG. 3*e*) is provided. In such sheet layer structure the envelope 20 may be formed by sub-cavities 16*a*, 16*b*, 16*c* aligned along a single line, as indicated for the sheet layer structure of FIG. 3*e* which is produced from a pre-envelope 101 according to FIGS. 3*a* to 3*c*.

Correctness of the filling quantity for envelopes produced according to the second method above can be measured as follows:

A predetermined quantity of envelopes 20 (e.g. 10 envelopes) are produced according to the first to fourth sealing/filling steps above, each of these envelopes 20 is marked and weighed individually on a 4 digit scale (e.g. Satorius BP121S). Each of the envelopes 20 is put on a hot plate with a temperature well above the activation temperate of the gas generating agent 18 to ensure that each of the envelopes 20 will burst and release the gaseous gas generating agent 18 completely. The empty envelopes are weighed individually on a 4 digit scale. The weight loss of each envelope is calculated. In case of humidity pick-up of the envelope material, the envelopes must be conditioned for at least 1 h in the same environment, ideally at 23° C. and 65% relative humidity.

Fluid tightness of the envelope can be measured according to one of the following methods:

Method 1 for Measurement of the Fluid Tightness of the Envelopes:

Each envelope 20 is marked individually. Each envelope 20 is weighed on a 4 digit scale (e.g. SatoriusBP121S). The envelopes 20 are stored under predetermined environmental conditions (20° C., 65% relative humidity). The weighing procedure described is repeated after 1 month of storage. This procedure is continued for at least 6 months. The weight loss after 6 months should be less than 20%, better 10%, ideally less than 1% of the filling weight. Additionally, functionality of each envelope 20 is checked after 6 months on a hot plate or in a water bath. The envelope 20 must show thickness increase when subjected to temperature above activation temperature.

FIGS. 4*a* to 4*e* each show three different embodiments of an envelopes 20 enclosing a cavity 16. Each of FIGS. 4*a* to 4*e* show in the top a first embodiment in form of a single envelope 20 similar to FIGS. 2*a/b*, in the middle a further embodiment in form of a folded envelope similar to FIGS. 5, 6*a/b*, 6*c/d*, and in the bottom a further embodiment in form of stacked envelopes 20 similar to FIGS. 7*a/b*.

Figure 4A:
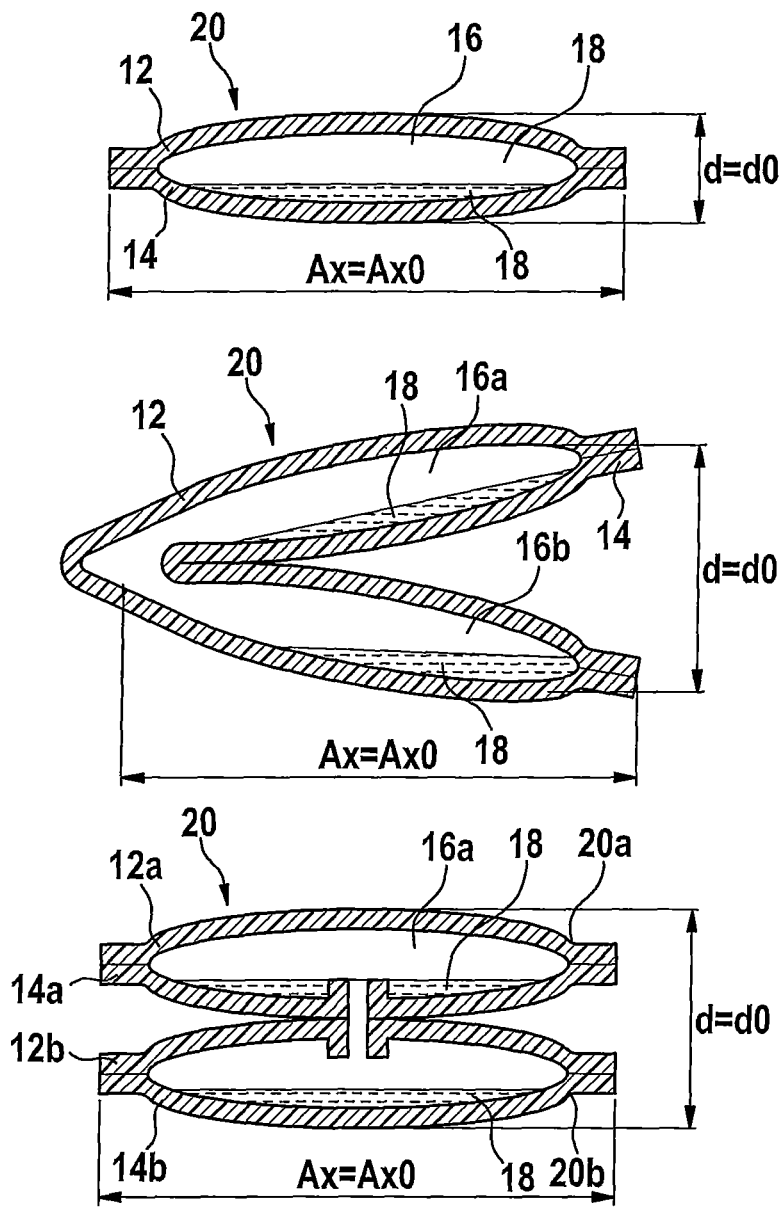
FIG. 4a shows simplified and schematic cross-sectional views of three different embodiments of an envelope enclosing a cavity which includes a gas generating agent, wherein the envelope laminate layers are welded to each other such as to form the envelope.

The three different envelopes 20 shown in FIG. 4*a* all include a gas generating agent 18 in the form of a liquid, or in the form of a highly viscous liquid, or in form of a coating applied to the inner wall of envelope 20 surrounding the cavity 16 or sub-cavities 16*a*, 16*b*. In FIG. 4*a* the envelopes 20 are all shown in the unactivated configuration of the gas generating agent 18.

Figure 4B:
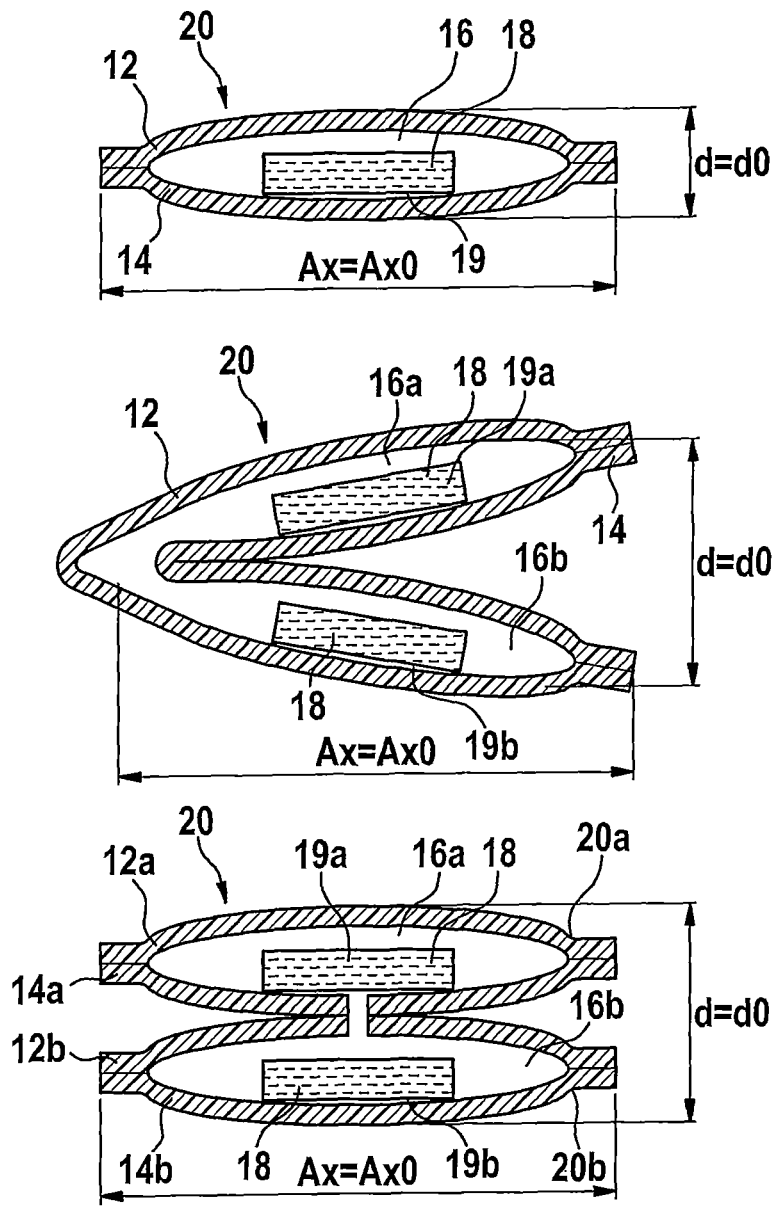
FIG. 4b shows simplified and schematic cross-sectional views of three different embodiments of an envelope enclosing a cavity which includes a gas generating agent applied on a dosing aid.

The three different envelopes 20 shown in FIG. 4*b* all include a gas generating agent 18 applied on a dosing aid 19. The dosing aid 19 may be made of any material that is able to absorb gas generating agent 18, e.g. an absorbent paper material, a woven or non-woven textile material, or a sponge-like material. In the embodiments of FIG. 4*b* a blotting paper or non-woven textile is used as the dosing aid 19. The dosing aid 19 is soaked with a predefined amount of gas generating agent 18, and then is inserted into the cavity 16. This can be done in a way similar to the first method described above. As an alternative to the procedure described above, the dosing aid 19 may be provided with the gas generating agent 18 in a first step, and then the dosing aid 19 may be arranged in between the first and second envelope layers 12, 14, before the first and second envelope layers are bonded together. In FIG. 4*b* the envelopes 20 are all shown in the unactivated configuration of the gas generating agent 18. Gas generating agent 18, once activated, will be released from dosing aid 19 and inflate cavity 16 or sub-cavities 16*a/*16*b*.

In the three different embodiments of FIG. 4*b* the dosing aid 19 has smaller lateral dimension than the cavity 16 has, or the sub-cavities 16*a/*16*b* have, such that the dosing aid 19 does not interfere with the bonding (e.g. along sealing lines) of the first and second envelope layers 12, 14.

Figure 4C:
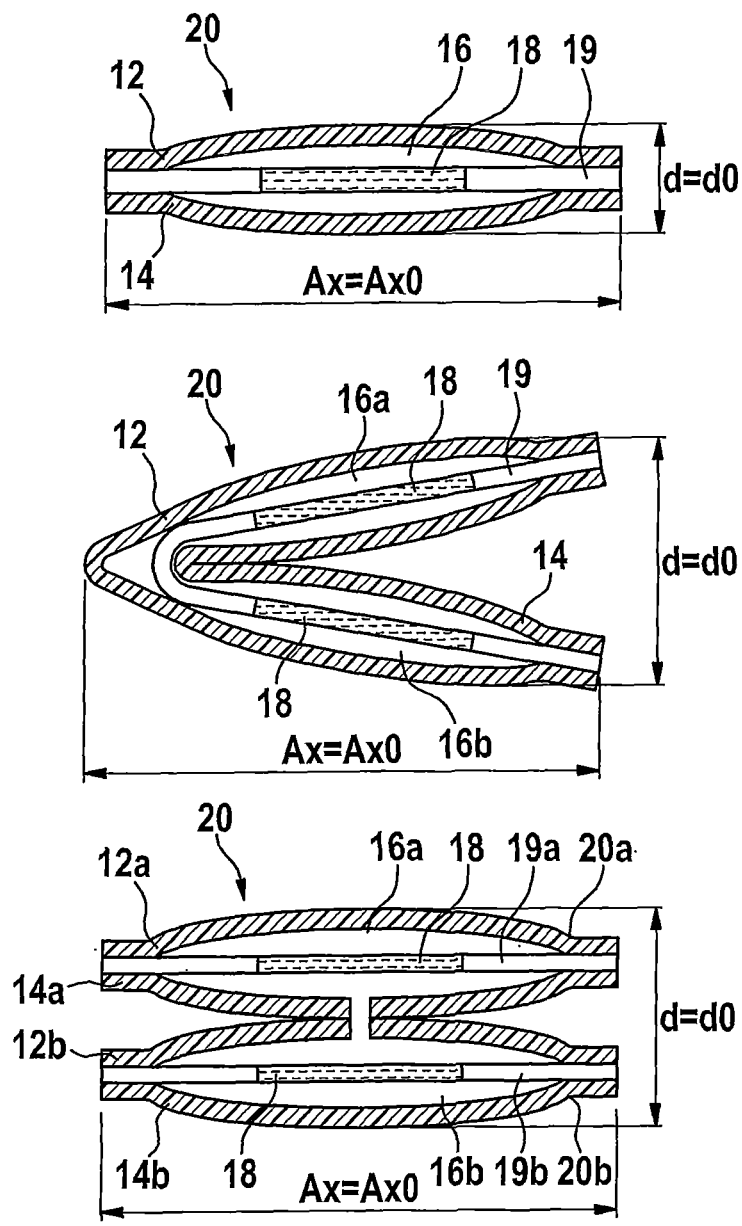
FIG. 4c shows simplified and schematic cross-sectional views of three different embodiments of an envelope enclosing a cavity, which includes a gas generating agent applied on a weldable dosing aid layer.

Also in the three different embodiments of FIG. 4*c* the envelope 20 includes the envelope 20 includes a gas generating agent 18 applied on a dosing aid 19. In this embodiment the dosing aid 19 is made of a material that does not interfere with the bonding process used to bond the envelope layers 12, 14 together, or may even be made of material that does support such bonding process as a sealing layer. This allows the dosing aid 19 to be applied in a sandwich type arrangement between the first and second envelope layers 12, 14 before these are bonded together. In case of the embodiment with stacked sub-envelopes 20*a*, 20*b* shown in the bottom of FIG. 4*c*, a respective dosing aid 19*a*, 19*b* is placed between the first and second envelope layers 12*a/*14*a*; 12*b/*14*b*, respectively. For sake of brevity, this not explicitly referred to in the following. The dosing aid 19 may even cover the sealing areas where the first and second envelope layers 12, 14 are to be bonded together. Hence the dosing aid 19 may have a sheet like configuration and be used in the form of a dosing aid layer 19 interposed in between the first and second envelope layers 12, 14 and covering the whole sealing area of the first and second envelope layers 12, 14. The first and second envelope layers 12, 14 are bonded together along the sealing areas, e.g. by welding, with the dosing aid 19 interposed. E.g. the dosing aid 19 may be a sheet made of the above described non-woven textile (PET non-woven, 55 g/cm²) in which case the dosing aid 19 even provides for an additional sealing layer useful to fluid tightly seal the envelope 20 when welding envelope layers 12, 14 together.

Given the gas generating agent 18 does not interfere with the bonding of the first and second envelope layers 12, 14, gas generating agent 18 may be applied to the dosing aid 19 as a whole. To restrict areas where gas generating agent is applied to the dosing aid in a sealing portion, the gas generating agent 18 may be applied in the form of discrete stripes onto the dosing aid 19. Distance between the stripes can then be selected such that each envelope is crossed by one stripe of gas generating agent. It will generally be more advantageous to apply the gas generating agent 18 only at those portions of the dosing aid 19 which will be inside the cavity 16, i.e. which will be fully enclosed by sealing areas where the first and second envelope layers 12, 14 are bonded together. In this way, the desired predetermined amount of gas generating agent 18 for proper activation and inflating of the envelope 20 can be adjusted more precisely. E.g. the gas generating agent 18 may be applied to the dosing aid 19 in an array of a plurality of discrete spots or areas, all of which are fully enclosed in a respective cavity 16.

In an embodiment where the first and second envelope layers 12, 14 are bonded together by welding having the dosing aid in between, the dosing aid 19 may be made of a textile structure like polypropylene non-woven; or may be made of a porous material like expanded polyethylene (ePE) or expanded polypropylene (ePP). Each of these materials allows welding of the first envelope layer 12 to the second envelope layer 14 with a layer of that material interposed in between.

In a further embodiment, the first envelope layer 12 and/or the second envelope layer 14 may provide the function of the dosing aid 19. This can be achieved by forming the innermost layers of the first envelope layer 12 and/or the second envelope layer 14, which come into contact when welding the first envelope layer 12 to the second envelope layer 14, from a suitable material, e.g. the materials mentioned before.

In the embodiment shown in FIG. 4c the dosing aid 19 is interposed in the form of a further layer in between the first and second envelope layers 12, 14. Gas generating agent 18, once activated, will be released from dosing aid 19 and inflate cavity 16 and sub-cavities 16a and 16b. A dosing aid 19 in form of a layer as shown in FIG. 4c may be used to improve fluid tightness of the seal between the first and second envelope layers 12, 14, e.g. in case the dosing aid 19 is made from material having a sufficiently low melting point interposing dosing aid layer 19 may improve sealing when welding envelope layers 12, 14 together. One example for a suitable material for forming a dosing aid layer 19 is the above mentioned PET non-woven, 55 g/cm² material.

Figure 4D:
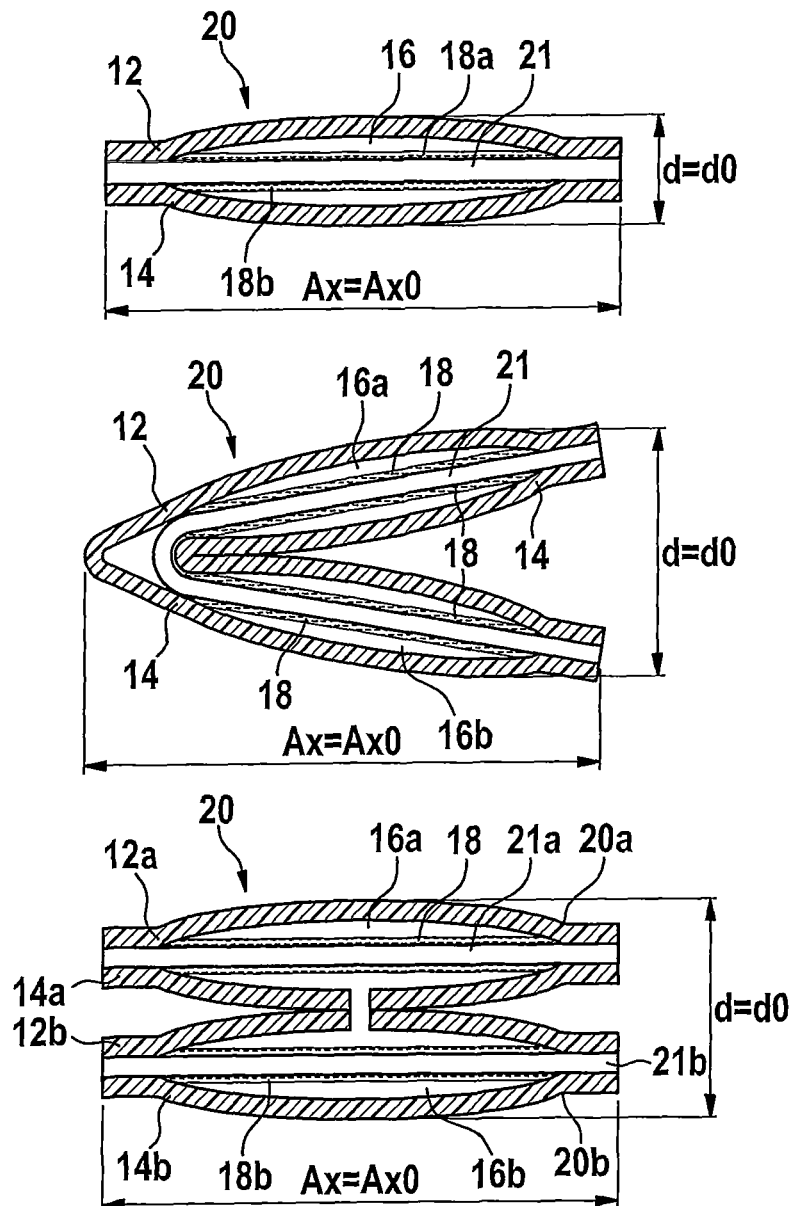
FIG. 4d shows simplified and schematic cross-sectional views of three different embodiments of an envelope, the envelope enclosing two separated cavities each including a gas generating agent.

FIG. 4d shows three different embodiments of similar envelopes 20 as shown in FIG. 4c. The envelopes 20 of FIG. 4d have first and second envelope layers 12, 14 and an intermediate layer 21 (or sub-envelope layers 12a,14a with intermediate layer 21a; and sub-envelope layers 12b/14b with intermediate layer 21b in the embodiment of FIG. 4d). In the embodiments shown, the intermediate layer 21 (or 21a/21b) has a configuration according to the layer 8 in FIG. 1b, but may have other configuration in other embodiments. The intermediate layer 21 is interposed between layer 12 and layer 14 in a sandwich type arrangement. Gas generating agent 18 is provided as a coating on both sides of intermediate layer 21. The intermediate layer 21 is made of essentially fluid tight material with respect to gas generating agent 18, 18 in the unactivated configuration as well as with respect to gas generating agent 18, 18 in the activated configuration. Intermediate layer 21 may also made of material that provides a fluid tight bonding between first and second envelope layers 12, 14, as described above. A suitable combination of materials in the embodiment of FIG. 3d is: First envelope layer 12: PET/Al/PE (see FIG. 1a); intermediate layer 21: PE/Al/PE (see FIG. 1b); second envelope layer 14: PET/Al/PE (see FIG. 1a).

In the embodiments of FIGS. 4a, 4b, 4c and 4d, the size/volume of cavity 16 or sub-cavities 16a and 16b, and correspondingly the amount of gas generating agent 18, to be filled in the cavity/sub-cavities 16, 16a, 16b can be adjusted as desired.

In the embodiments shown in middle and bottom of FIGS. 4a to 4e, respectively, the thickness d of envelope 20 will be determined by the sum of two distances (thickness of first sub-cavity 16a), and (thickness of second sub-cavity 16b). Both distances will increase in case gas generating agent 18 will change from the unactivated configuration to the activated configuration. Increase in distance between the first layer and the second layer of a laminar structure including such envelopes 20, after activation of the gas generating agent 18 will be substantially identical to the increase in thickness d of the envelope 20, and hence given by increase in thickness of the first sub-cavity 16a plus the increase in thickness of second sub-cavity 16b. In case of the embodiment shown in the middle of FIGS. 4a to 4e, an even larger increase in thickness may be obtained by the hinge-like configuration of the envelope 20.

Besides facilitating the accurate dosing of gas generating agent 18, dosing aid 19, as shown in the embodiments of FIGS. 4c and 4d, provides the advantage that it can be applied in a sandwich type configuration as an intermediate sheet in between the first and second envelope layers 12 and 14. This allows for simplified manufacture of the envelopes 20. It is possible to manufacture a plurality of envelopes 20 using only one sheet of envelope layer 12, one sheet of dosing aid layer 19 and one sheet of envelope layer 14.

Figure 4E:
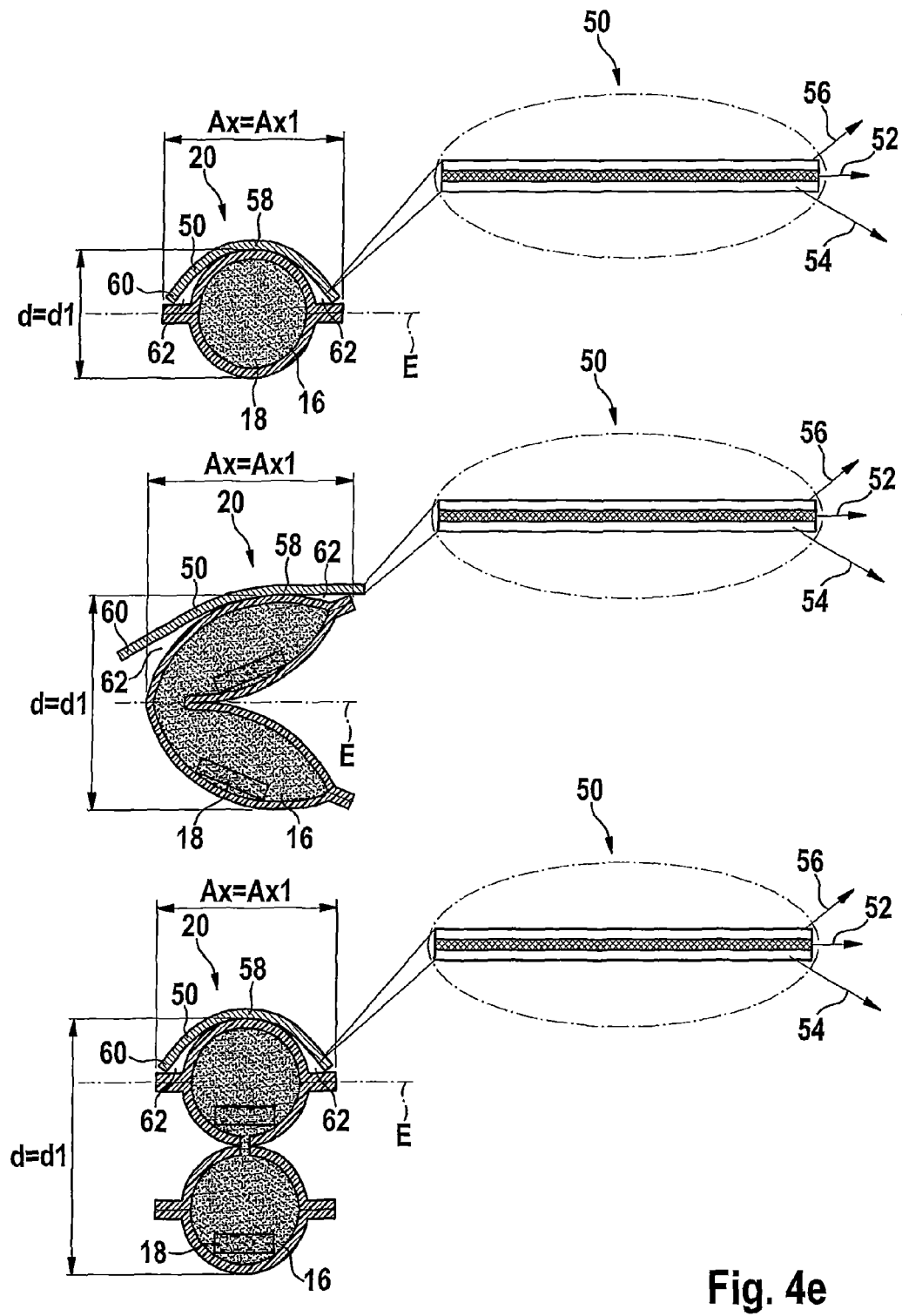
FIG. 4e shows simplified and schematic cross-sectional views of three different embodiments of an envelope in an activated condition, with a heat protection shield applied to the heat exposed side of the envelope; as well as a detail showing the heat protection shield in cross section.

FIG. 4e shows simplified and schematic cross-sectional views of envelopes 20 according to three further embodiments. In FIG. 4e, each of the envelopes 20 is in an activated condition in which the gas generating agent 18 is in the activated configuration thereof and thus is mostly present in gaseous form. With each embodiment shown in FIG. 4e, the thickness d of the envelope 20 has increased to d=d1, while the lateral extension of the envelope 20, indicated as Ax=Ax1, is still essentially the same as in the unactivated condition of the envelope 20. The envelopes 20 in FIG. 4e each have a heat protection shield 50 applied to the heat exposed side of the envelope 20, respectively. Such heat protection shield 50 is shown in the detail in form a schematic cross section. The heat protection shield 50 is a laminate made up of essentially three layers 52, 54, 56. Layer 52 is a fabric layer, in this example made of non-woven fabric, e.g. non woven polyphenylene sulfide (PPS) imbued with polyurethane (PU) or silicone resin. In other embodiments, layer 52 may be made of other heat resistant material like aramids, glass fibers, melamine, or similar material, or a composition of such materials. Layer 52 provides for a heat resistant and insulating backbone to which two layers 54, 56 of a further insulating material are applied such that layer 52 is sandwiched in between layers 54, 56. In the embodiment of FIG. 4e, layers 54, 56 are both made of an expanded polytetrafluoroethylene (ePTFE) membrane. Other membranes, e.g. membranes based on polyolefins and/or polyurethanes, may be conceivable as well with respect to layers 54 and/or 56. The layers 54 and 56 have thicknesses of 30-90 μm each. Layer 52 has a thickness in the range of 100-1600 μm, in particular in the range of 200 and 800 μm.

The heat protection shield 50 is bonded to the outer side of envelope 20 using an adhesive 58. Adhesive 58 is applied in the central region of the envelope 20 and the heat protection shield only, such that a lateral end region or peripheral region 60 of heat protection shield 50 is not bonded to the envelope 20. In the activated condition of the envelope 20, shown in FIG. 4e, such lateral end region 60 of heat protection shield 50 projects from envelope 20, thereby leaving a circumferential air gap 62 in between heat projection shield 50 and envelope 20. The air gap 62 provides for additional thermal insulation, thereby reducing temperature load for the envelope 20 in the activated condition thereof significantly.

The envelopes 20 shown in FIG. 4e each comprise a dosing aid 19 as shown in FIG. 4b. However, alternatively, a dosing aid 19 as shown in FIG. 4c or 4e may be used, or the gas generating agent may be applied without use of a dosing aid as shown in FIG. 4a.

Figure 5:
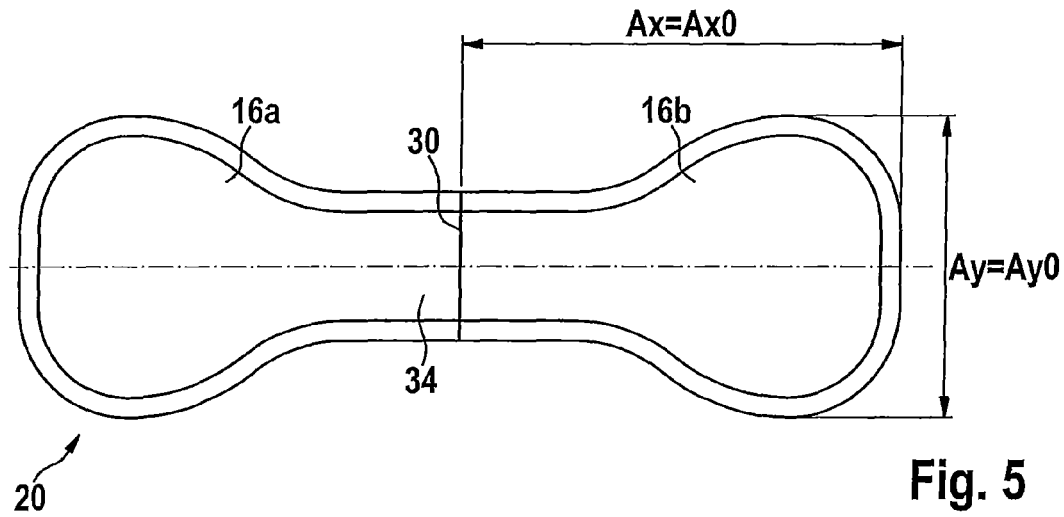
FIG. 5 shows an embodiment of an envelope including two sub-cavities connected via a fluid passage, according to an embodiment, in a simplified and schematic plan view in a configuration before folding the envelope along a folding line to superpose the two sub-cavities.

FIG. 5 shows an embodiment of an envelope 20 including two sub-cavities 16a, 16b connected via a fluid passage 34, according to a first embodiment (see the embodiments shown in the middle of FIGS. 4a to 4e, respectively), in a simplified and schematic plan view. The embodiment shown in FIG. 5 has a folded configuration, see FIGS. 6a and 6b. FIG. 5 shows a situation before folding the envelope 20 along a folding line 30 to superpose the two sub-cavities 16a, 16b in direction of thickness d.

Figure 6A:
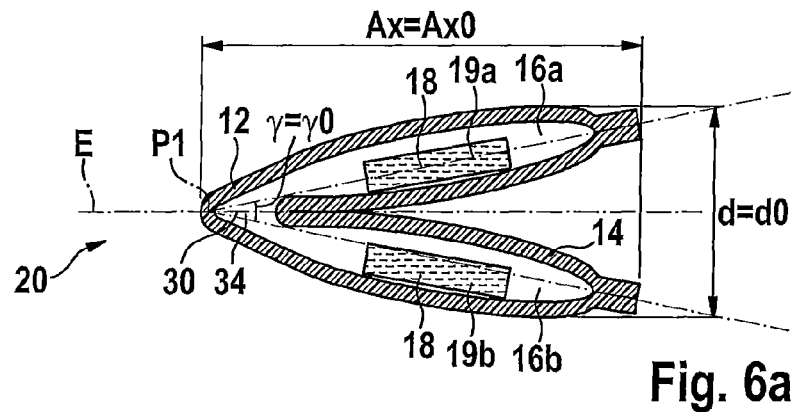
FIG. 6a shows a simplified and schematic cross section of the envelope of FIG. 5 after folding, in a condition with the gas generating agent in the unactivated configuration.
Figure 6B:
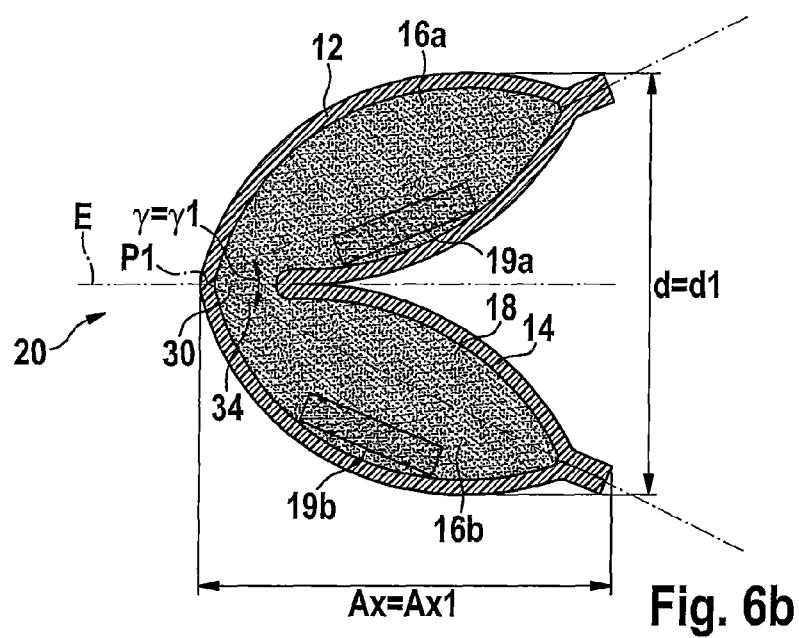
FIG. 6b shows a simplified and schematic cross section of the envelope of FIG. 5 after folding, in a condition with the gas generating agent in the activated configuration.

FIG. 6a shows a simplified and schematic cross section of the envelope 20 shown in FIG. 5 after folding along the folding line 30, in a condition with the gas generating agent 18 in the unactivated configuration. Gas generating agent 18 is applied by means of a dosing aid 19a, 19b, similar to the embodiment shown in FIG. 4b. In such configuration, the envelope 20 has an essentially thin and flat shape. FIG. 6b shows a simplified and schematic cross section of the envelope 20 shown in FIG. 6a in a condition with the gas generating agent 18 in the activated configuration. The envelope 20 in the condition shown in FIG. 6b has a blown up shape. In particular, the thickness dimension of the envelope 20 has increased dramatically from d=d0 in FIG. 6a to d=d1 in FIG. 6b. Also the angle γ formed in between the folding line 30 and the welded lateral ends of first and second sub-cavities 16a, 16b, respectively, has increased considerably from γ=γ0 in FIG. 6a to γ=γ1 in FIG. 6b.

Figure 6C:
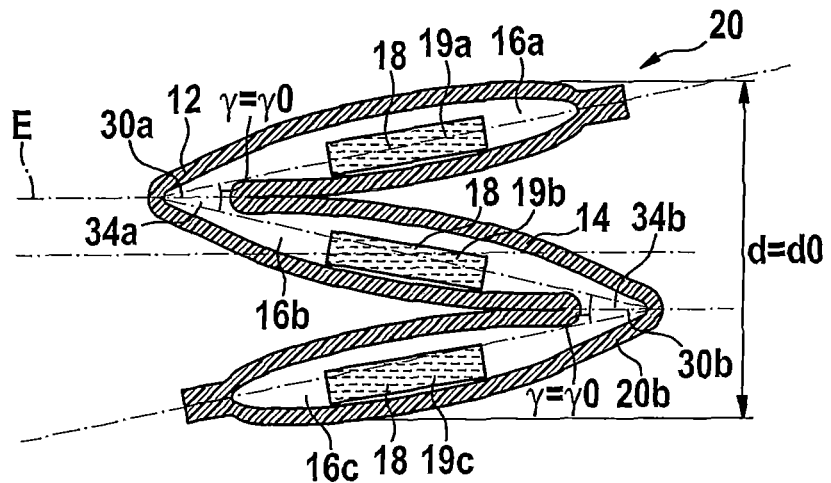
FIG. 6c shows a simplified and schematic cross section of another envelope including three sub-cavities in folded configuration, in a condition with the gas generating agent in the unactivated configuration.
Figure 6D:
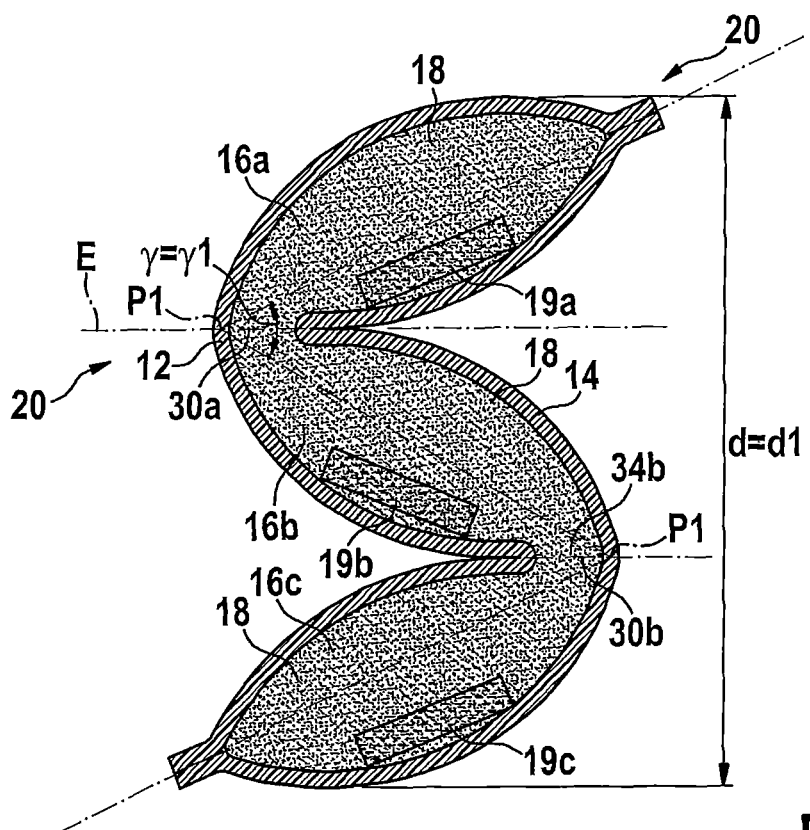
FIG. 6d shows a simplified and schematic cross section of the envelope of FIG. 6c in a condition with the gas generating agent in the activated configuration.

FIG. 6c shows a simplified and schematic cross section of another envelope including three sub-cavities 16a, 16b, 16c in a folded configuration, in a condition with the gas generating agent in the unactivated configuration. FIG. 6d shows a simplified and schematic cross section of the envelope of FIG. 6c in a condition with the gas generating agent 18 in the activated configuration. Similar to the situation in FIGS. 6a and 6b, but even more pronounced, the thickness dimension of the envelope 20 has increased dramatically from d=d0 in FIG. 6c to d=d1 in FIG. 6d, and the angles γ formed in between a plane including folding line 30a and the welded lateral ends of first sub-cavity 16a, and a plane including both folding lines 30a, 30b, as well as between a plane including both folding lines 30a, 30b, and a plane including folding line 30b and the welded lateral ends of third sub-cavity 16c, respectively, have increased considerably from γ=γ0 in FIG. 6c to γ=γ1 in FIG. 6d.

Folding line 30 in FIG. 6a/b, as well as each of folding lines 30a, 30b in FIGS. 6c/d, defines a first pivot P1. Two adjacent sub-cavities (first and second sub-cavities 16a, 16b in FIG. 6a/b: first and second sub-cavities 16a, 16b as well as second and third sub-cavities 16b, 16c in FIG. 6c/d) are able to rotate relative to each other around first pivot P1, in response to increase in gas pressure inside the sub-cavities 16a, 16b, 16c.

In the embodiments of FIGS. 6a/b and 6c/d, fluid channels 34, 34a, 34b are located at one lateral end, or both of two opposite lateral ends, of envelopes 20. The fluid channels 34, 34a, 34b cross the folding lines 30, 30a, 30b, respectively and connect the respective adjacent sub-cavities 16a, 16b (FIGS. 6a/6b) and 16a,16b/16b,16c (FIG. 6c/6d) with each other. Therefore, adjacent ones of the sub-cavities 16a, 16b/16a, 16b, 16c formed in the envelopes 20 are connected only in the regions surrounding the fluid channels 34, 34a, 34b, respectively.

With a folded configuration of the envelopes 20 as shown in FIGS. 6a/b, 6c/d, thickness d of the envelope 20 as a whole is not determined by the sum of the thicknesses of the cavities 16a+16b/16a+16b+16c, each of these thicknesses measured in direction orthogonal to the respective lateral plane of these individual cavities. Rather, the thickness d of the envelope 20 is determined by effective thicknesses of the individual cavities. These effective thicknesses are the larger the larger the angle γ is. The angle γ will increase when, after activation of the gas generating agent 18 the envelope 20 changes condition from the unactivated condition (envelopes 20 being essentially flat) to the activated condition (envelopes 20 being inflated).

By increasing the angle γ when changing from the unactivated condition to the activated condition, the envelopes 20 of FIGS. 6a/b, 6c/d provide a function similar to a hinge. This is a very efficient way of increasing the thickness of the envelope 20 after activation of the gas generating agent.

A consequence of this hinge-type behaviour is that the envelopes 20 allow for a large increase in distance between a first layer and the second layer in a fabric or laminar structure having the envelope structure of FIGS. 6a/b, 6c/d sandwiched in between. Alternatively, to achieve a desired increase in distance between the first layer and the second layer, an envelopes of smaller lateral extension can be used covering much less area of the fabric than it would be necessary if envelopes of other type were used.

By using envelopes having a plurality of two or even more sub-cavities arranged on after the other in folded configuration, as just described, very large increase in thickness of the envelope as a whole can be achieved, thereby enabling a very pronounced increase in distance between first layer and second layers. The result is a very effective increase in thermal insulating capability as a result of a temperature change.

Figure 6E:
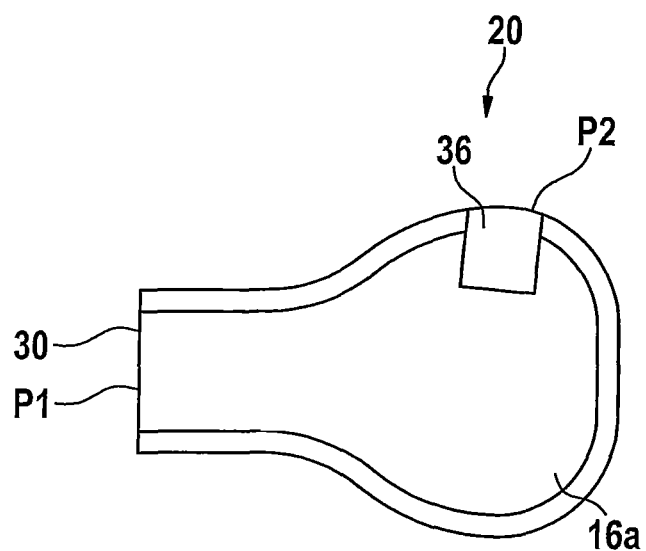
FIG. 6e shows a simplified and schematic plan view of an envelope according to FIGS. 5, 6a, after folding.

FIG. 6e shows another embodiment of an envelope 20 having a folded configuration, in a plan view. FIG. 6e shows the envelope 20 in a configuration after folding along folding line 30 is done, such that first sub-cavity 16a is stacked on top of second sub-cavity 16b. Folding line 30 defines a first pivot P1 allowing rotation of first sub-cavity 16a relative to second sub-cavity 16b around first pivot P1, as explained above. Principally, the envelope 20 may have any configuration as shown in FIGS. 4a to 4e, 5, 6a/b, 6c/d. The envelope 20 of FIG. 6e comprises a connection member 36 which connects first sub-envelope 16a and second sub-envelope 16b at a position distant from first pivot P1. Connection member 36 may be a bonding strip, e.g. adhesive tape, fastened to the outer side of envelope piece 12 in such a way to fix first and second sub-cavities 16a, 16 relative to each other, or at least allow a limit movement of first sub-cavity 16a away from second sub-cavity 16b.

Connection member 36 is fixed to envelope at a position distant from folding line 30, thus distant from first pivot P1. Connection member 36 provides for the following functions: First, connection member 36 restricts rotation of the first sub-cavity 16a with respect the second sub-cavity 16b around first pivot P1 to rotational angles smaller than a predetermined threshold angle. Second, connection member 36 itself forms a second pivot for rotational movement of first sub-cavity 16a with respect to second sub-cavity 16b. However, rotational movement of second sub-cavity 16b with respect of first sub-cavity 16a around second pivot is limited by first pivot. Therefore, second pivot P2 in cooperation with first pivot P1 allow a relatively limited rotational movement of first sub-cavity 16a with respect to second sub-cavity 16b around an axis of rotation connecting first and second pivots. Such rotational movement is limited to rotational angles below a maximum threshold rotation angle, because first and second pivots P1, P2 are located on different, particularly adjacent, lateral sides of the envelope 20.

In FIGS. 6a to 6e gas generating agent 18 is applied by means of a dosing aid 19a, 19b as shown in FIG. 4b. The above description also applies with respect to the embodiments shown in the middle of FIGS. 4a, 4c, and 4d using other dosing aids 19, or no dosing aid, for applying gas generating agent 18.

Figure 7A:
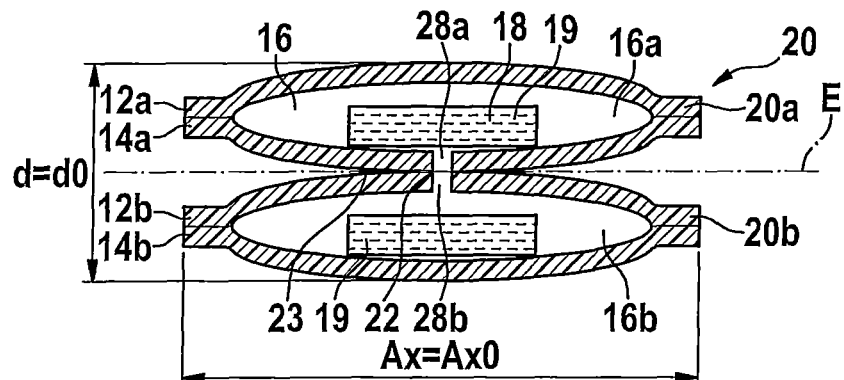
FIG. 7a shows a simplified and schematic cross section of another envelope formed of two identical sub-envelopes bonded together one on top of the other, in a condition with the gas generating agent in the unactivated configuration.
Figure 7B:
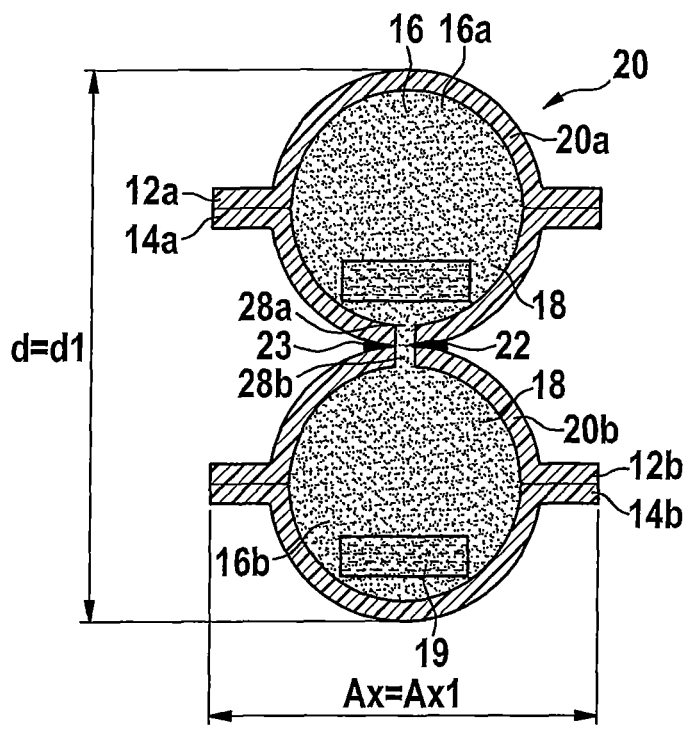
FIG. 7b shows a simplified and schematic cross section of the envelope of FIG. 7a in a condition with the gas generating agent in the activated configuration.

FIG. 7a shows a simplified and schematic cross section of another envelope 20 formed of two sub-envelopes 20a, 20b bonded together one on top of the other, in a condition with the gas generating agent 18 in the unactivated configuration. FIG. 7b shows a simplified and schematic cross section of the envelope 20 of FIG. 7a in a condition with the gas generating agent 18 in the activated configuration. In FIG. 7a/b two identical sup-envelopes 20a, 20b are stacked on top of each other. If desired, it is conceivable to stack envelopes of different size or different shape on top of each other.

In FIGS. 7a/7b two sub-envelopes 20a and 20b are bonded together via a bond 23 to form an envelope 20. Each of the sub-envelopes 20a, 20b encloses a respective sub-cavity 16a, 16b. First sub-cavity 16a includes a dosing aid 19 provided with gas generating agent 18. Also, second cavity 16b includes a dosing aid 19 provided with gas generating agent 18. Other dosing aids 19, as shown in FIGS. 4c, 4d may be used to provide gas generating agent 18. As an alternative to the use of a dosing aid 19, gas generating agent 18 may be provided without using a dosing aid, e.g. in the form of a liquid. Each sub-envelope 20a, 20b is essentially fluid tight.

In the embodiment of FIGS. 7a/7b both sub-envelopes 20a, 20b have an essentially identical size, however it also conceivable to use sub-envelopes 20a, 20b of different size. Further, more than two sub-envelopes 20a, 20b may be arranged on top of each other.

In the embodiment of FIGS. 7a/7b the sub-envelopes 20a, 20b are bonded together by a bond 23 located in a central region of the sub-envelopes 20a, 20b, where each sub-envelope 20a, 20b has the largest increase in thickness in response to activation of gas generating agent 18 (see FIG. 7b). Hence, thickness d of the envelope 20 as a whole is determined by the sum of the two thicknesses of the individual sub-envelopes 20a, 20b. Increase in thickness of the envelope 20 after activation of the gas generating agent 18 will be substantially identical to the increase in thicknesses of the individual sub-envelopes 20a, 20b.

Bonding of the sub-envelopes 20a and 20b can be effected by suitable adhesives, adhesive layers, by welding or by glueing (in the case of glueing, proper measures should be taken to maintain fluid tightness).

Importantly a fluid passage 22 is provided in the region where sub-envelops 20a, 20b are bonded together. Fluid passage 22 is formed by an opening 28a formed in first sub-envelope 20 and a corresponding opening 28b formed in second sub-envelope 20b. Since both sub-envelops 20a, 20b are bonded only in the region around fluid passage 22, both sub-envelopes 20a, 20b can increase their respective thickness effectively in response to activation of the gas generating agent.

Each of the envelopes shown in FIGS. 5, 6a/b,6c/d, and 7a/b may be provided in combination with a respective heat protection shield 50 assigned thereto, similar to the heat protection shield of FIG. 4e.

FIGS. 8a to 8d show exemplary embodiments of a laminar structure 100 according to the invention.

The embodiment of FIG. 8a comprises a plurality of envelopes 20. In FIGS. 8a to 8e, as well as in FIGS. 9a to 9f, three different types of envelopes according to the embodiments shown in FIG. 4b, above are shown, respectively. This illustration is for the purpose of indicating that envelopes according to each of these embodiments may be used alternatively. It be understood that typically envelopes 20 of a same configuration will be used for a laminar structure. It also be understood that any of the other envelopes described herein may be used alternatively to the three embodiments shown exemplary in FIGS. 8a to 8e, 9a to 9g. In the laminar structure 100, the envelopes 20 are positioned in between a first layer 122 and a second layer 124. Both the first and second layers 122, 124 may be textile layers. In a possible configuration the textile layers 122, 124 may be connected via stitches 127 in the form of a quilted composite. In this way, pockets 125 are formed by the first and second layers 122, 124. In this embodiment, each of these pockets 125 receives a respective one of the envelopes 20. Other embodiments are conceivable in which each pocket 125 receives more than one envelope 120, or where part of the pockets 125 do not receive any envelope 20. The envelopes 20 are thus fixed by their respective pocket 125 with respect to movement in the length/width plane defined by the layers 122, 124.

In a possible configuration, the first layer 122 may be a textile having flame resistant properties. In one example the first layer 122 is made of 55 g/m$^2$ spun-laced non-woven of aramid fiber (available as Vilene Fireblocker from the company Freudenberg). In the embodiment shown in FIG. 8a, the second layer 124 is made of the same material as the first layer 122. In other embodiments, the second layer may be made of a fire resistant textile liner made of 125 g/m$^2$ aramid viscose FR blend 50/50 woven (available from the company Schueler), as shown in FIG. 8b. Both, the first layer 122 and the second layer 124 may be either a non-woven or a woven, depending on the application.

Activation of the gas generating agent 18 provides for a volumetric increase ("inflation") of the envelopes 20 in the pockets 125. Such inflation of the envelopes 20 induces movement of the first layer 122 and second layer 124 away from each other and increases the distance D between the first layer 122 and the second layer 124 from a first distance D0 to a second distance D1. In case the first layer 122 and/or the second layer 124 have a structure with embossments and depressions, it may be convenient to measure the distance D with respect to reference planes of the first and second layers 122, 124 respectively. In the example shown the distance is measured by using reference planes touching the most distant points of the first and second layers 122, 124 respectively.

FIG. 8*a* further shows that the envelopes 20 are received in the pockets 125 in such a way that gaps remain free in between each two neighbouring envelopes 20. The distance of these gaps is indicated by X. It can be seen that this distance X remains nearly constant or even increases slightly, when the gas generating agent 18 in the envelopes 20 changes from the unactivated configuration to the activated configuration. Further, thermally triggered shrinkage of the laminate structure 100 is advantageously reduced.

FIG. 8*b* shows a simplified and schematic cross-sectional view of a laminar structure 100 according to a further embodiment. The laminar structure 100 is similar to FIG. 8*a* with a plurality of envelopes 20 positioned in between a first layer 122 and a second layer 124 in an unactivated condition. In the embodiment of FIG. 8*b* the envelopes 20 are fixed to layer 122 by means of adhesive spots 129. Such adhesive spots 129 may provide fixation of the envelopes 20 only temporarily for mounting purposes. In such case, typically additional measures for fixing the envelopes 20 in position will be provided, e.g. stitches 127 to form pockets in the type of a quilted composite structure as shown in FIG. 8*a*.

Figure 8C:
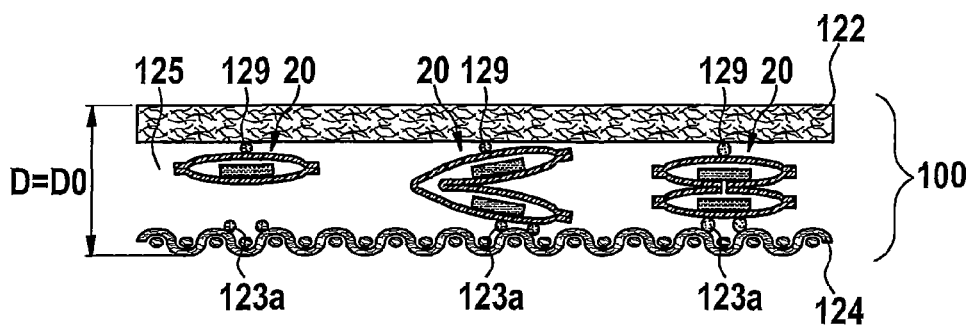
FIG. 8c shows a simplified and schematic cross-sectional view of a laminar structure, according to a further embodiment, with a plurality of envelopes positioned in between a first layer and a second layer, in an unactivated condition.

Alternatively, the adhesive spots 129 may be formed of an adhesive providing durable fixation of the envelopes with respect to either first layer 122 (see FIG. 8*b*) or second layer 124, or to both of them (see FIG. 8*c*). In such case, additional stitches 127 are not absolutely necessary. In all embodiments shown, the envelopes 20 may be connected with the first layer 122 and/or the second layer 124 via stitches, instead of adhesive spots 129.

In FIG. 8*c* the first layer 122 and the second layer 124 are not fixed to each other. Only the envelopes 20 are fixed to the first layer 122, and may optionally be fixed to the second layer 124. With respect to the single envelope 20 shown in left part of FIG. 8*c*, it be understood that such envelope may be fixed to first layer 122 and/or second layer 124 (as indicated by adhesive spots 123*a*). The gap shown between envelope 20 and adhesive spots 123*a* in the single envelope embodiment 20 in FIG. 8*c* does not exist in reality, of course, but is a consequence of the schematic drawing. The laminar structure 100 in such embodiment as shown in FIG. 8*c* provides a relatively loosely coupled structure. Such arrangement facilitates assembly of the laminar structure 100 and provides for flexibility. In case a tighter connection between the first and the second layer 122, 124 is desired it is possible to additionally provide stitches joining the first and second layers 122, 124 with each other. Generally such additional stitches will be provided with larger distances to each such as to form rather large pockets. In a further embodiment it is possible to connect a plurality of envelopes 20 such as to form a chain of envelopes 20, and to connect the first layer 122 and the second layer 124 via a plurality of parallel stitches running parallel to each other. The first and second layers 122, 124 thus will form a plurality of channels in between each two adjacent stitches. Into such channels a respective chain of envelopes 20 may be introduced.

Figure 8D:
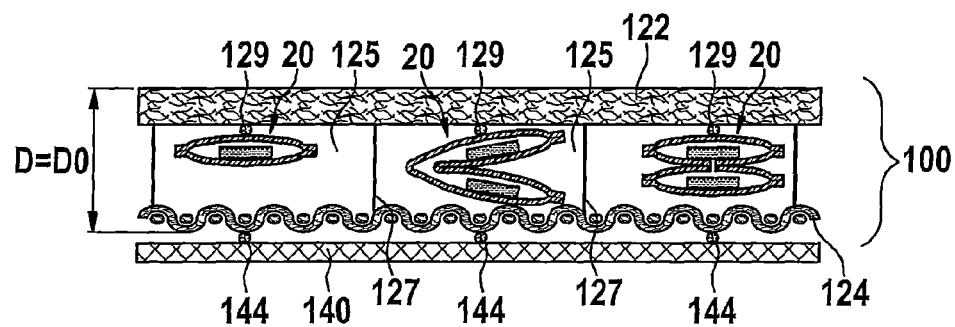
FIG. 8d shows a simplified and schematic cross-sectional view of a laminar structure, according to a further embodiment, with a plurality of envelopes positioned in between a first layer and a second layer and an additional functional membrane laminated onto one of the first and second layers, in an unactivated condition.
Figure 8E:
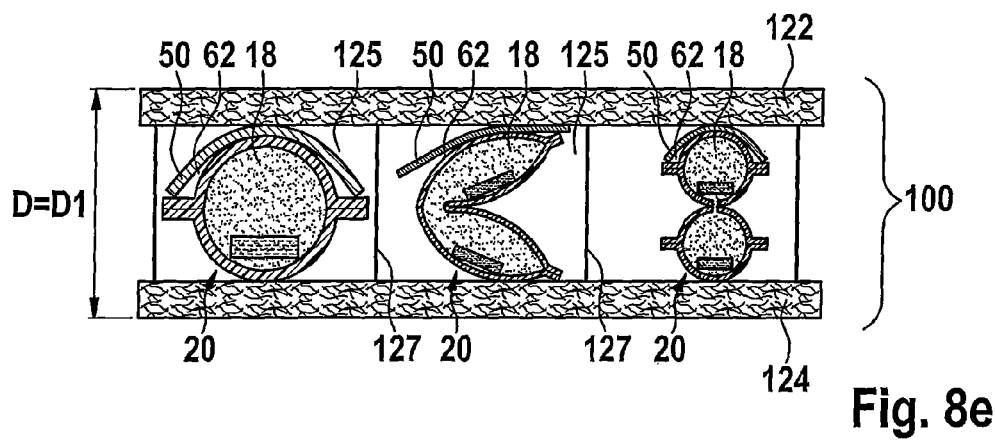
FIG. 8e shows a simplified and schematic cross-sectional view of a laminar structure, according to a further embodiment, with a plurality of envelopes and heat protection shields positioned in between a first layer and a second layer, in an activated condition.

FIG. 8*d* shows a laminar structure 100, according to a further embodiment in an unactivated condition. The laminar structure 100 of FIG. 8*e* is similar to the embodiment shown in FIG. 8*b* and has an additional functional layer 140 attached to at least the first layer 122 or the second layer 124. In the embodiment of FIG. 8*d* the functional layer 140 is attached to the second layer 124. The additional functional layer 140 may include a water vapour permeable and waterproof membrane, as described above, and thus provide for water proofness of the laminar structure 100, and also for a barrier against other liquids and gases, while still maintaining the laminar structure 100 water vapor permeable. For a more detailed description of the functional layer, see the description above.

The additional functional layer 140 is applied to the second layer 124 in a low temperature bonding process by using adhesive spots 144, in order to avoid activation of the laminar structure 100 when the functional layer 140 is applied. A functional layer 140 may be attached to the first layer 122 and/or to the second layer 124. Such first and/or second layer 122, 124 may be made of a woven material as shown in FIG. 8*d*, or may be made of a non-woven material, e.g. as shown in FIG. 8*a*.

FIG. 8*e* shows a simplified and schematic cross-sectional view of a laminar structure 100 according to a further embodiment. The laminar structure 100 is similar to FIG. 8*a* with a plurality of envelopes 20 positioned in between a first layer 122 and a second layer 124. Again, the first layer 122 and/or second layer 124 may be made of a woven or non-woven material. FIG. 8*e* shows the laminar structure 100 in an activated condition in which the gas generating agent 18 included in the envelopes 20 is in the activated configuration thereof. The envelopes 20 of the embodiment in FIG. 8*e* are assigned to respective heat protection shields 50. These heat protection shields 50 are provided on the heat exposed side of the envelopes 20, in such way that the heat protection shields 50 are bonded to the respective envelope 20 in a central region only. In the activated condition shown in FIG. 8*e*, an insulating air gap 62 is formed in between a peripheral region of a respective heat protection shield 50 and the envelope 20 assigned to it.

Also, in the embodiment of FIG. 8*e* the laminar structure 100 has the configuration of a quilted blanket with the first layer 122 and the second layer 124 attached to each other via stitches 127 such as to form pockets 125. The envelopes 20 together with their respective heat protection shields 50 are inserted into these pockets 125. In other embodiments, the envelopes 20 including heat protection shields 50 may be fixed to first layer 122 and/or second layer 124 by means of adhesive spots 123, 129, in a manner similar as shown in FIGS. 8*b* to 8*d*.

In the embodiment of FIG. 8*e* the heat protection shields 50 are bonded to the respective envelopes 20. In other embodiments it may be possible to provide the respective envelopes 20 and heat protection shields 50 assigned thereto separately, e.g. by inserting a respective envelope 20 and heat protection shield 50 into a pocket 125 of suitable shape.

The envelopes 20 having assigned a heat protection shield 50 thereto may be used in any other laminar structure as shown in FIGS. 8*a* to 8*d*. Further, any form of envelopes, as shown in FIGS. 2*a,b*, 4*a-e*, 5, 6*a,b*, 7*a,b* may be provided in combination with a heat protection shield 50.

Figure 9A:
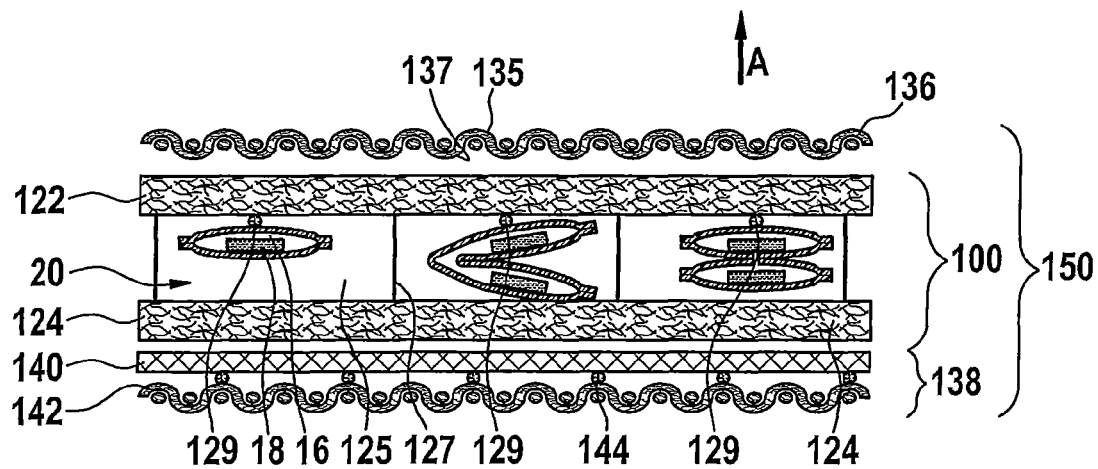
FIG. 9a shows a simplified and schematic cross-sectional view of a fabric including a laminar structure.

FIG. 9*a* shows a simplified and schematic cross-sectional view of a fabric composite 150 including a laminar structure 100 as shown in FIG. 8*a*. The fabric composite 150 comprises a plurality of layers arranged to each other, seen from an outer side A of a garment made with such fabric composite 150:

(1) an outer heat protective shell layer 136 having an outer side 135 and an inner side 137;

(2) a laminar structure 100 providing adaptive thermal insulation as shown in FIG. 8*a*, the laminar structure 100 is arranged on the inner side 137 of outer heat protective shell layer 136, and (3) a barrier laminate 138 comprising a functional layer 140, the barrier laminate 138 is arranged on the inner side laminar structure 100.

The outer side A means for all the embodiments in the FIGS. 9a to 9g said side which is directed to the environment.

Figure 9B:
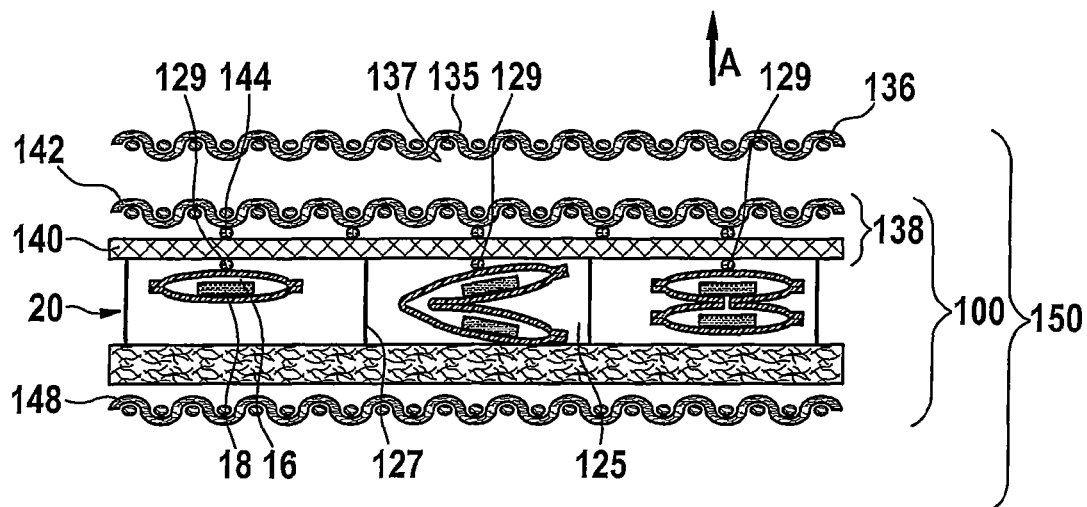
FIGS. 9b to 9g show other possible configurations of fabrics including the laminar structure providing adaptive thermal insulation according to the invention.

The barrier laminate 138 includes a functional layer 140 which typically comprises a waterproof and water vapor permeable membrane for example as described above. The functional layer 140 is attached to at least one layer 142 via an adhesive layer 144 (two layer laminate). Layer 142 may be a woven or non-woven textile layer. Adhesive layer 144 is configured such as not to significantly impair breathability of the barrier laminate 138. In further embodiments the barrier laminate 138 comprises two or more textile layers wherein the functional layer is arranged between at least two textile layers (three layer laminate). Other configurations of fabrics 150 to which the laminar structure 100 can be applied are shown in FIGS. 9b to 9g:

In FIG. 9b the fabric composite 150 includes an outer layer 136 with an outer side 135 and an inner side 137. A laminar structure 100 providing adaptive thermal insulation is positioned on the inner side 137 of the outer layer 136. The laminar structure 100 comprises a barrier laminate 138 having a functional layer 140 adhesively attached to a textile layer 142 for example by adhesive dots 144, an inner layer 124 and envelopes 20 arranged between the barrier laminate 138 and the inner layer 124. The envelopes 20 of the laminar structure 100 are bonded to the inner side of functional layer 140 via a suitable discontinuous adhesive 129, e.g. silicone, polyurethane. The inner layer 124 may comprises one or more textile layers. In this embodiment barrier laminate 138 has the function of the first layer of the laminar structure providing adaptive thermal insulation. On the inner side of inner layer 124 there is provided an inner layer 148 of woven material.

Figure 9C:
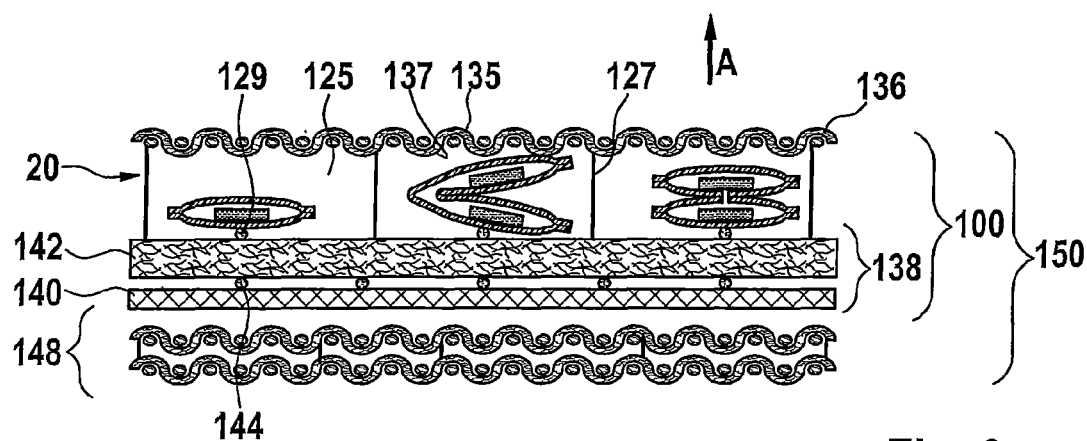

In FIG. 9c the fabric composite 150 includes a laminar structure 100 providing adaptive thermal insulation forming the outer fabric layer. The laminar structure 100 comprises an outer layer 136 with an outer side 135 and an inner side 137 and a barrier laminate 138 having a functional layer 140 adhesively attached to a textile layer 142 for example by adhesive dots 144. The laminar structure 100 further comprises envelopes 20 which are arranged between the inner side 137 of the outer layer 136 and the barrier laminate 138. In particular the envelopes 120 are adhesively bonded to the outer side of the textile layer 142 by adhesive dots 129. In this embodiment barrier laminate 138 has the function of the second layer of the laminar structure 100 providing adaptive thermal insulation and outer layer 136 has the function of the first layer of the laminar structure 100 providing adaptive thermal insulation. The composite 150 further comprises an inner layer 148 which may comprise one or more textile layers.

Figure 9D:
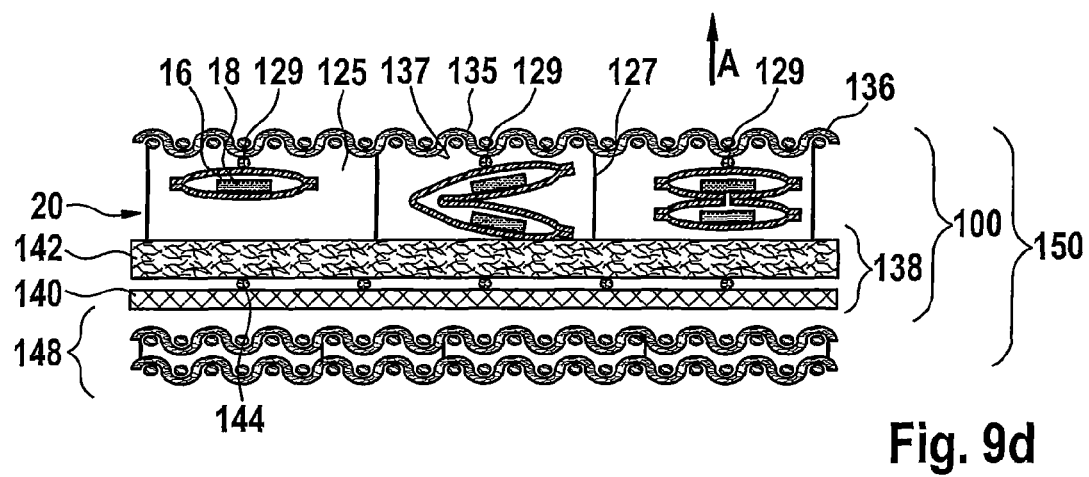

In FIG. 9d the fabric composite 150 includes a laminar structure 100 providing adaptable thermal insulation. The laminar structure 100 comprises an outer layer 136 with an outer side 135 and an inner side 137 and a barrier laminate 138 having a functional layer 140 adhesively attached to a textile layer 142 for example by adhesive dots 144. The laminar structure further comprises envelopes 20 which are bonded to the inner side 137 of the outer layer 136 for example by a discontinuous adhesive in the form of adhesive dots 129. In this embodiment barrier laminate 138 has the function of the second layer of the laminar structure 100 providing adaptive thermal insulation and outer layer 136 has the function of the first layer of the laminar structure 100 providing adaptive thermal insulation. The composite 150 further comprises an inner layer 148 which may comprise one or more textile layers.

The insulation capability of the individual layers can be adjusted as required for a particular application, e.g. by area weight, thickness, number of layers.

Figure 9E:
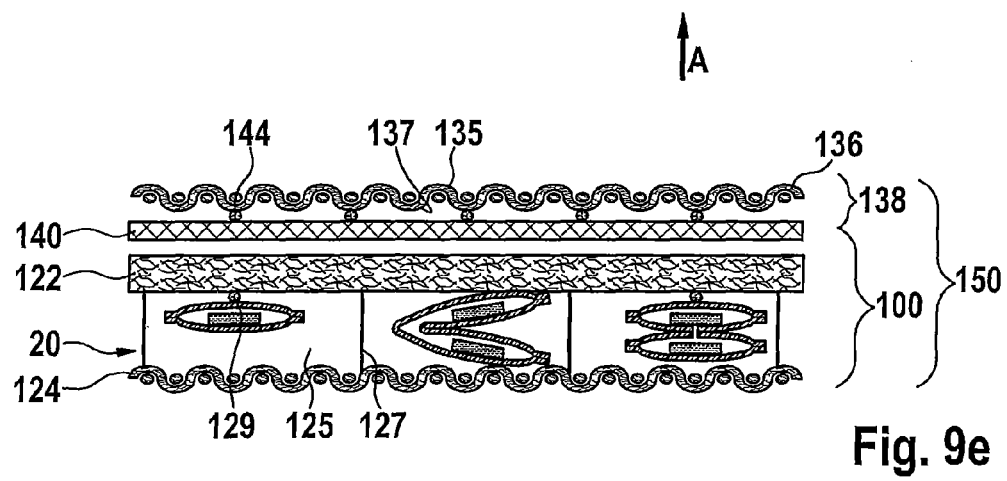

In FIG. 9e the fabrics composite 150 comprises a laminar structure 100 including a first layer 122 and a second layer 124 with a plurality of envelopes 20 in between as shown in FIG. 8a, with the second layer 124 having the configuration of a woven layer. Further the fabric composite 150 includes a barrier laminate 138 forming the outer shell of the composite 150 and being positioned on the outer side of the laminar structure 100. The barrier laminate 138 comprises an outer layer 136 and a functional layer 140 adhesively attached to the inner side of the outer layer 136 for example by polyurethane adhesive dots 144.

Figure 9F:
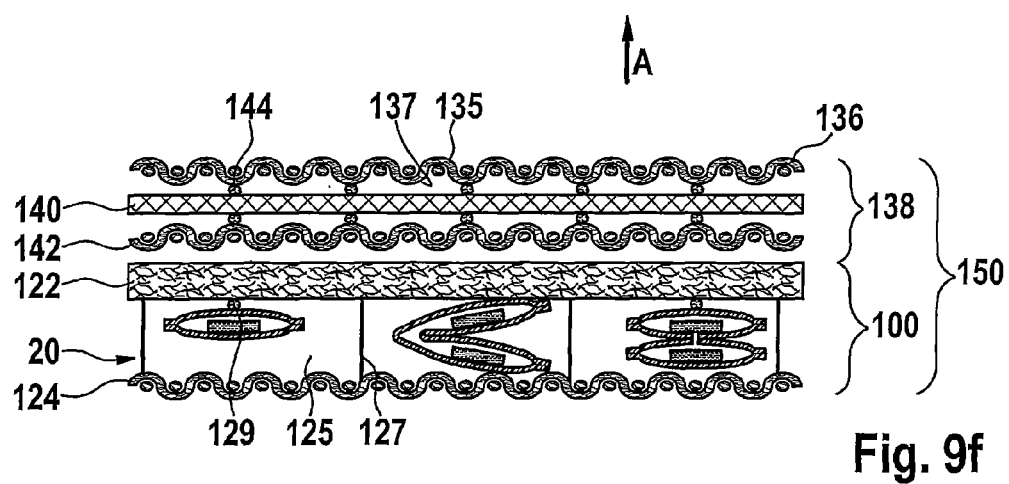

The fabrics composite 150 in FIG. 9f is similar to the fabric composite of FIG. 9e. In this embodiment the barrier laminate 138 has an additional inner textile layer 142 attached to the functional layer 140 such that the functional layer 140 is embedded between outer textile layer 136 and textile layer 142. The textile layer 142 might be for a fire resistant liner made of 125 g/m$^2$ Aramide Viscose FR blend 50/50 woven.

In all embodiments shown in FIGS. 9a to 9e the laminar structure 100 has the configuration of a quilted blanket with the first and second layers being connected by stitches 127 such as to form pockets 125.

Figure 9G:
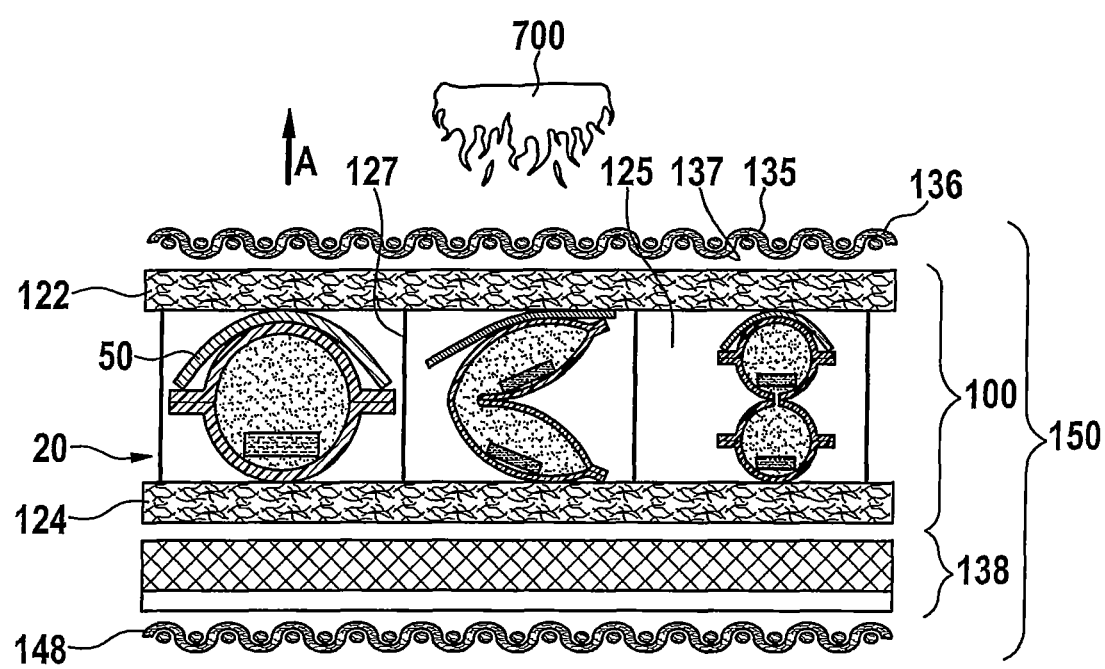

The fabrics composite 150 shown in FIG. 9g is similar to the fabric composites of FIGS. 9a-9f. In this embodiment the laminar structure 100 has the configuration of a quilted blanket and is provided with envelopes 20 each combined with a heat protection shield 50, as described above and shown in FIG. 8e. The laminar structure 100 is positioned adjacent to the inner side 137 of an outer heat protective shell 136 as described above. Thus, the laminar structure 100 is expected to be exposed to relatively high temperature in case the fabric is exposed to a source of heat, as indicated by 700 in FIG. 9g. On the inner side of the laminar structure 100 there is provided a barrier laminate 138 similar to the barrier laminates described above. On the inner side of barrier laminate 138 there is an insulating lining 148.

The envelopes 20 having assigned a heat protection shield thereto may be used in any other laminar structure as shown in FIGS. 8a to 8e, or fabric as shown in FIGS. 9a to 9e, or in laminar structures or fabrics of other configuration.

Figure 10:
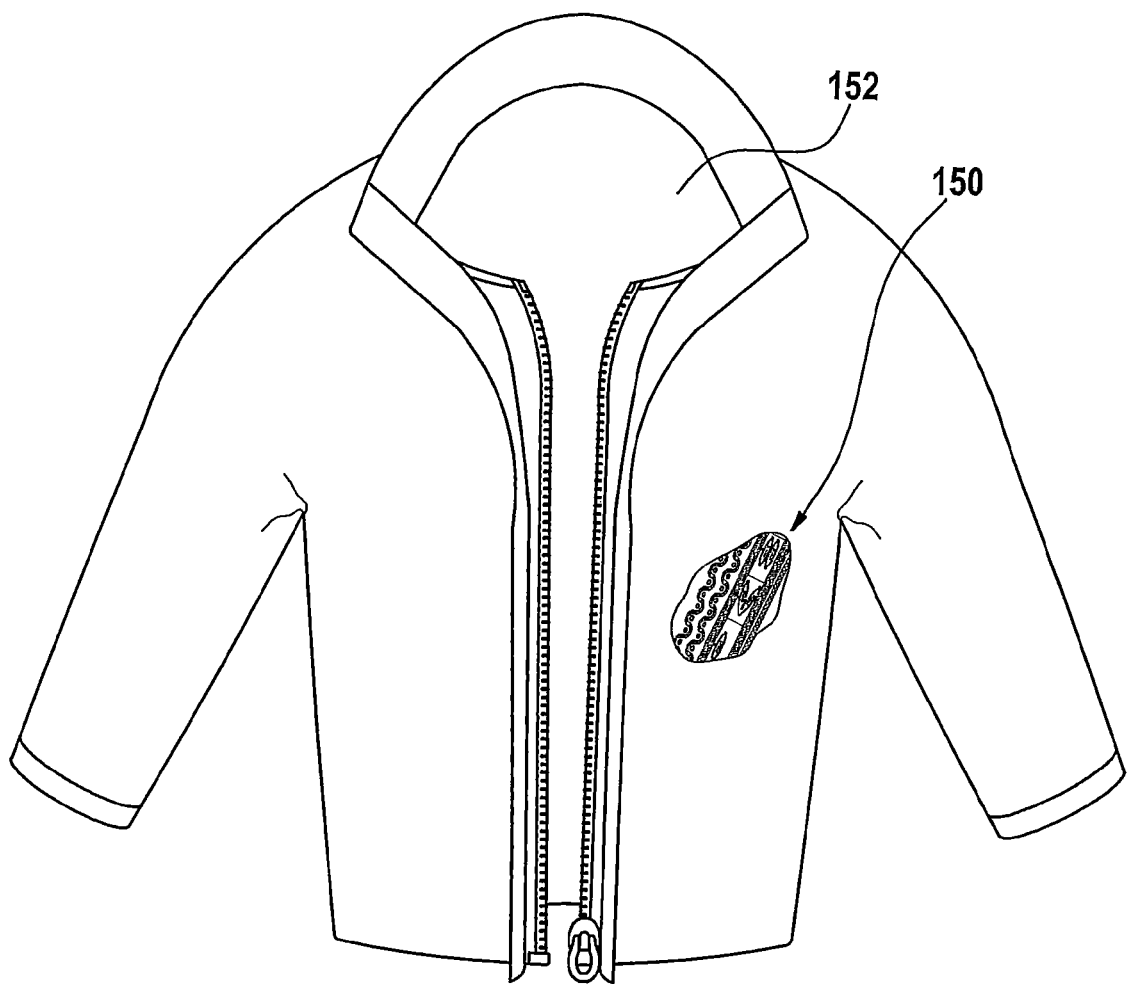

FIG. 10 shows a fire fighter's jacket 152 including fabric composite 150 as shown in FIGS. 9a-9f. Other garments which may comprise fabrics 150 according to invention include jackets, coats, trousers, overalls, shoes, gloves, socks, gaiters, headgear, blankets, and the like or parts of them. The fabric composite may be used in other articles as well, for example in tents or the like.

The following is a description of a method for determining thickness d of an envelope 20, in particular applicable to an envelope 20 as described with respect to FIGS. 5, 6a/b and 6c/d.

The envelope was produced as described above with respect to FIGS. 3 to 3e ("Second method 2 for producing envelopes"), The welding wheel 110 was provided with sealing contours 116 of a shape to form envelopes 20 as shown in FIG. 5 with Ax=22.5 mm, and Ay=21 mm. The sealed envelope 20 was folded at the middle along folding line 30 to produce an envelope 20 having two sub-cavities 16a, 16b stacked on top of each other. Then an adhesive tape 36 was fixed to envelope 30 such as to fix the first sub-cavity the second sub-cavity. The adhesive strip 36 thus provided a second pivot P2 essentially oriented rectangular to folding line 30 forming a first pivot P1. Such envelope 20 is shown in FIG. 6e.

Method for Measuring Thickness Change of Envelopes:

A method for measuring thickness change of such envelope is as follows:

A heating plate is connected to a heating apparatus (heating plate 300 mm×500 mm out of a Erichsen, doctor blade coater 509/MC/1+heating control Jumo Matec, with controller Jumo dtron16, connected to 220V/16 A).

An envelope 20 is placed onto the center of the heating plate in switched off mode, at ambient temperature of 23° C. The height d=d0 of the unactivated envelope 20 is measured by placing a temperature resistant ruler rectangular to the heating surface of the heating plate and observing the thickness d as a function of time by looking parallel to the heating plate surface onto the ruler scale. Thickness d is measured relative to the surface of the heating plate.

Then, the temperature is increased in steps of 5K starting 5K below the activation temperature. After each temperature increase the thickness d is measured. This procedure is repeated until no further increase in thickness d is observed. This thickness d is reported as the final thickness d=d1 of the envelope 20 in the condition with the gas generating agent 18 in the activated configuration thereof.

Examples for Envelopes

Example 1 (Single Envelope)

Single envelopes 20 as shown in FIG. 4a have been produced and used to carry out the test measurements. Such envelopes 20 have a slightly elliptical shape when seen from above with larger axis of ellipse b1=23 mm, and smaller axis of ellipse b2=20 mm).

Each of the envelopes is filled with 0.03 g of "3M NOVEC® 1230 Fire Protection Fluid" (chemical formula: $CF_3CF_2C(O)CF(CF_3)_2$) as gas generating agent according to method described above with respect to FIGS. 3a to 3e. Gas generating agent 18 is applied using a dosing aid layer 19, as shown in FIG. 4c, made of 50 g/m² non woven polypropylene.

The area covered by the envelope 20 in the unactivated condition with the gas generating agent 18 in the unactivated configuration thereof is 394 mm².

Example 2 (Envelope with Folded Configuration)

Single envelopes 20 as shown in FIGS. 5, 6a and 6b have been produced and used to carry out the test measurements. Such envelopes 20 have in unfolded condition a shape as shown in FIG. 5 with Ax=22.5 mm and Ay=21 mm. Width of the envelopes at the folding line 30 is Ay (folding line)=15 mm. After folding the envelope 20 of example 2 has a similar shape in the lateral plane as the envelope 20 in example 1. The area covered by the folded envelope 20 of example 2 is 380 mm². Each of the envelopes 20 is filled with 0.06 g of "3M NOVEC® 1230 Fire Protection Fluid" (chemical formula: $CF_3CF_2C(O)CF(CF_3)_2$) as gas generating agent. Production of these envelopes 20 follow the method described above with respect to FIGS. 3a to 3d. Gas generating agent 18 is applied using a dosing aid layer 19, as shown in FIG. 4c, made of 50 g/m² non woven polypropylene.

A strip of adhesive tape 36 (Tesafilm, order number 57335 at www.tesa.de) is attached to the outer side of envelope 20 at a lateral side of the envelope essentially rectangular to the folding line 30. The adhesive strip 36 has a width of 19 mm and a length of 8 mm, and is attached with its longer side being is on the outer sides of the envelope 20. Thus, the adhesive strip 26 fixes the first and second sub-cavities 16a, 16 to each other, against movement away from each other. Provided in such way, adhesive strip 36 restricts rotation of first sub-cavity 16a with respect to second sub-cavity 16b to rotation angles avoiding complete unfolding of the envelope 20 (into a state where the envelope 20 is not able to recover its original folded state in response to decrease of gas pressure inside the sub-cavities 16a, 16b)

Example 3 (Envelope with Sub-Envelopes Stacked on Top of Each Other)

2 sub-envelopes 20a, 20b, each having a configuration of the single envelope 20 shown in FIG. 4a, with a square size of 40 mm×40 mm side length, have been made according the first method for producing an envelope described above. The filling step was omitted. In each of the sub-envelopes 20a, 20b a circular opening 28a, 28b having a diameter of 1.5 mm was formed in one lateral wall 14a, 12b thereof. The openings 28a, 28b were formed in the central region of one lateral side 14a, 12b of the sub-envelopes 20a, 20b, such that the openings 28a, 28b formed in each sub-envelope 20a, 20b fit together when stacking the first and second sub-envelopes 20a, 20b on top of each other. An adhesive, e.g. adhesive film available from 3M, article number 9077, was applied to at least one sub-envelopes 20a, 20b around the openings 28a, 28b in a circular pattern with an inner diameter of 3 mm and an outer diameter of 12 mm. Novec 1230 Fire fighting fluid was injected into the first and second sub-envelopes 20a, 20b via the openings 28a, 28b by a syringe, and very quickly afterwards the two sub-envelopes 20a, 20b were attached to each other in a fluid tight manner by placing the openings 28a, 28b on top of each other. 0.024 g of 3M® Novec™ 1230 was measured as a filling amount of gas generating agent 18. This was measured by weight as a difference of the empty envelope parts and the final filled envelope.

The sub-envelopes 20a, 20b were made of envelope pieces 12a, 14a; 12b, 14b of the following configuration: PET 12 μm, Al 12 μm, PE 40 μm The gas generating agent in all three examples has been placed on a dosing aid as described with respect to FIG. 4c.

Results of thickness measurements, following the procedure described above, were as follows:

| | Example 1: Single envelope | Example 2: Envelope with folded configuration | Example 3: Envelope with sub-envelopes stacked on top of each other: |
|---|---|---|---|
| Covering area [mm²] | 394 | 380 | 1600 mm² |
| Initial thickness d0 [mm] | 0.4 | 1.2 | 1.5 |
| Thickness in activated condition d1 [mm] | 8 | 12.5 | 22 |

Measurement of Reversibility

The above described method for measuring the change of thickness d of envelopes 20 can be also used for checking the reversibility of the change from unactivated condition of the envelope 20 to activated condition ("activation cycle") and reverse ("deactivation cycle"). As a baseline the thickness d=d0 of the unactivated envelope 20 is measured, when the heating plate is switched off and its surface is at room temperature. For the continuation of the procedure the temperature of the heating plate is then set to the lowest temperature at which the maximum increase in thickness of envelopes 20 has been obtained in previous tests. After a waiting time required for the heating plate to the temperature of the hot plate the procedure is stated.

An envelope 20 in a condition with the gas generating agent 18 in the unactivated configuration thereof, is placed on the hot surface of the heating plate, and the change of thickness d of the envelope 20 is observed until the maximum thickness d=d1 is reached. Then the activated envelope 20 is placed with pincers on a surface at room temperature, e.g. a metal plate for quick heat transfer. Here the deactivation of the envelope 20 will be observed. The final thickness of the envelope d=d0 is measured with an equal ruler in the same procedure as on the hot plate and reported.

For obtaining not only minimum thickness d=d0 and maximum thickness d=d1 of the envelope 20, the heating plate and the unheated metal plate with the rulers mounted are placed next to each other and the envelope 20 will be placed repeatedly on the heating plate and on the unheated metal plate. Such back and forth placement of the envelope 20 will be then recorded by a video recording device, which is looking in the same direction onto the rulers as the observer does in the manual procedure described above. With almost continuous thickness data a graph can be printed similar to FIG. 13. (with the ordinate showing thickness d of an envelope 20 instead of thickness D of a laminar structure 100).

Example for a Laminar Structure Using Envelopes as Described Herein

Figure 11:
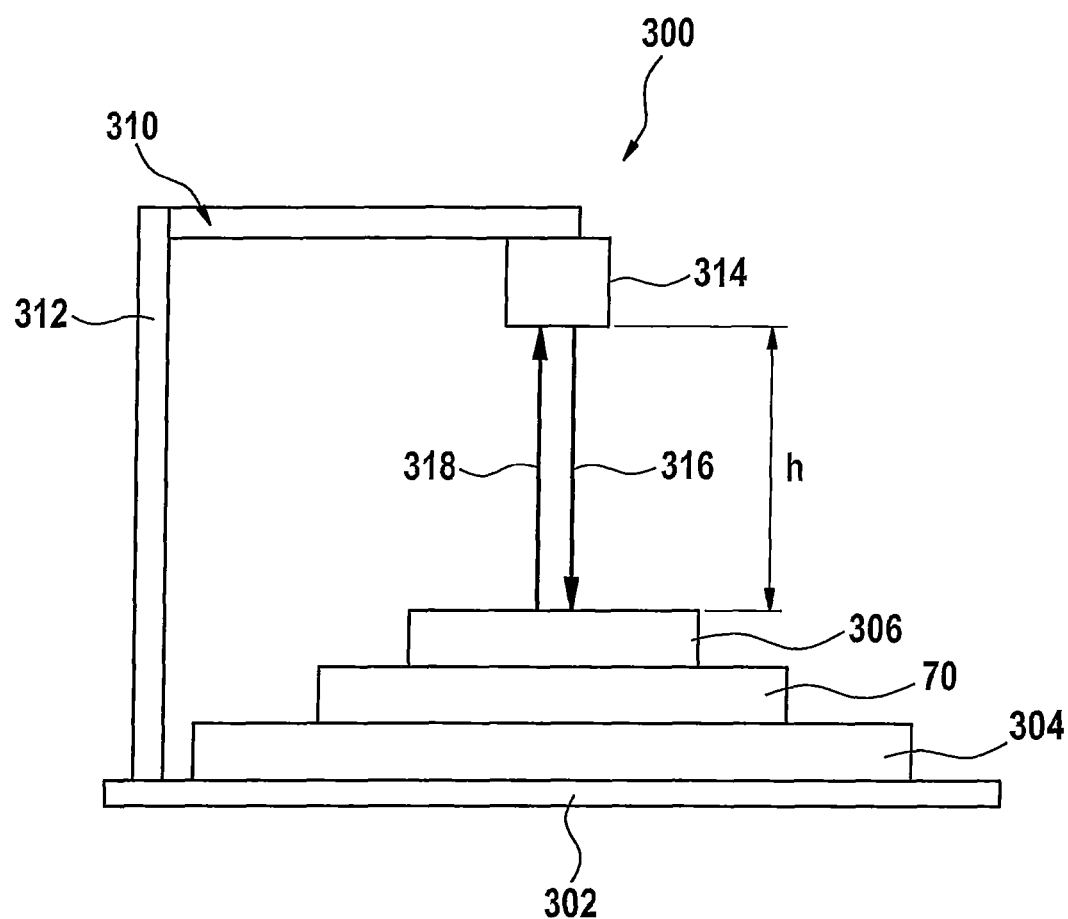
FIG. 11 shows a schematic sketch of an apparatus to measure increase in distance between the first layer and the second layer when the laminar structure is being brought from the unactivated condition into the activated condition.
Figure 12:
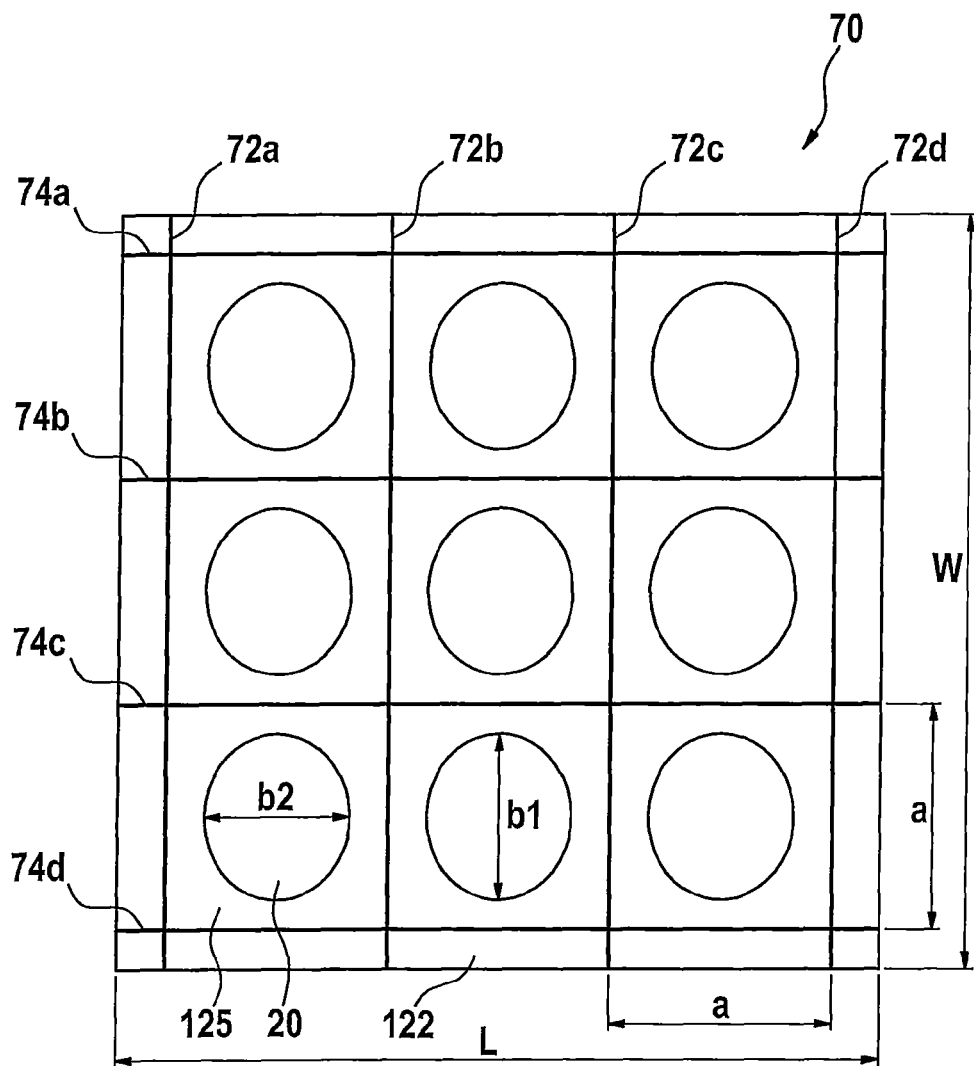
FIG. 12 shows a schematic sketch of a laminar structure test piece for measuring the increase in distance between the first layer and the second layer when the laminar structure is being brought from the unactivated condition into the activated condition.

FIG. 12 shows a schematic sketch of a laminar structure in the form of a test piece 70 to be used with the apparatus of FIG. 11 for measuring the increase in distance D between the first layer 122 and the second layer 124 when the laminar structure 100 is being brought from the unactivated condition into the activated condition. The test piece 70 is shown in plan view in FIG. 12. A cross-sectional view thereof corresponds to the cross sections shown in FIG. 8a. FIG. 12 shows the laminar structure 100 in the unactivated condition.

The test procedure as described herein is carried out using a laminar structure 70 including envelopes 20 as shown in FIG. 4a. The same test procedure is applicable to other test pieces 70 in the form of any other laminar structure 100 including envelopes 20 as shown in any of FIGS. 4a to 4e, 5, 6a-e, 7a, 7b as well.

The test piece 70 used in the test described below has the following configuration:

The test piece 70 forms a quilted structure with:
(a) a first layer (122) made of 55 g/m² spun-laced nonwoven of aramid fiber (available as Vilene Fireblocker from the company Freudenberg, Germany)
(b) a second layer (124)(not visible in FIG. 11), arranged underneath the first layer (122), made of 55 g/m² spun-laced nonwoven of aramid fiber (available as Vilene Fireblocker from the company Freudenberg, Germany)

The first and second layers 122, 124 have a size of 140 mm (length L)×140 mm (width W). The first and second layers 122, 124 are connected by a plurality of stitched seams 72a-72d, 74a-74d, thus forming a quilted composite. The stitched seams are formed by a single needle lock stitch. In this way, 9 pockets 125 are formed by the quilted composite 70. The pockets 125 each have the shape of a square with a side length of a=40 mm. Each of these pockets 125 receives a respective one of the envelopes 20 made as described above. Single envelopes 20 as shown in FIG. 7a, 7b have been used to carry out the test measurements. Such envelopes 20 have a slightly elliptical shape when seen from above with larger axis of ellipse b1=23 mm, and smaller axis of ellipse b2=20 mm). 9 envelopes 20 are arranged between the first and the second layers 122, 124 such that a single envelope 20 is spaced to at least one neighbour envelope 20 by one of said stitched seams 72a-72d, 74a-74d. Each of the pockets 125 receives one envelope 20. The envelopes 20 are inserted into the pockets 125 without being fixed to the first layer 122 or second layer 124.

Each of the envelopes is filled with 0.03 g of "3M NOVEC® 1230 Fire Protection Fluid" (chemical formula: $CF_3CF_2C(O)CF(CF_3)_2$) as gas generating agent according to method 2 described above with respect to FIGS. 3a to 3d A method for measuring thickness change of such test piece 70 is as follows:

Setup of Measurement Apparatus:

The arrangement for measuring a thickness change of the test piece 70 in response to a change in temperature is shown in FIG. 11. The arrangement comprises a apparatus 300 with a base 302, a heating plate 304, a top plate 306, and a laser based distance measuring device 314.

The heating plate 304 is connected to a heating apparatus (plate 300 mm×500 mm out of a Erichsen, doctor blade coater 509/MC/1+heating control Jumo Matec, with controller Jumo dtron16, connected to 220V/16 A).

Test piece 70 is laid flat on the heating plate 304.

Top plate 306 has the form of a flat disk with a diameter of 89 mm and is made of "Monolux 500" (available from Cape Boards & Panels, Ltd., Uxbridge, England) or an equivalent material. Top plate 306 has a weight of approx 115g. Top plate 306 is laid flat on top of the test piece 70.

Laser based distance measuring device 310 includes a frame 312 and a distance laser device 314 (laser sensor: Leuze ODSL-8N 4-400-S 12 which is connected to a A/D converter Almemo 2590-9V5 having a reading rate of 3 measurements per second, the A/D converter translates the 0-10 V output of the laser sensor into a 0-400 mm distance reading, accuracy: 0.2 mm on a plain plate). The frame 312 is mounted to the base 302. The distance laser device 314 is and has mounted to a top arm of the frame in such a way that the distance laser device 314 emits a laser beam 316 towards the top surface of the top plate 306 and receives a reflected beam 318. The distance laser device 314 is able to detect a distance h between the distance laser device 314 and the top surface of top plate 306. Preferably, laser beam 316 is emitted orthogonally to top surface of top plate 306.

Temperature gradient of plate 304 is lower than 2K across the plate in the range of the measurement.

Measurement Procedure:

Test is done at room temperature, i.e. controlled climate of 23° C. and 65% relative humidity.
(a) Top plate 306 is placed directly onto heating plate 304 (without test piece 70) to obtain a zero reading h_0.
(b) Then, test piece 70 is placed in between heating plate 304 and top plate 306. Heating plate 304 is heated to a temperature above ambient temperature and 5K below the expected activation temperature of the gas generating agent (e.g up to 44° C. in case of 3M Novec® 1230 Fire Protection Fluid as gas generating agent) to obtain an initial height reading h_1. Thickness of test piece 70 (corresponding to distance between first layer 22 and second layer 24 in unactivated condition) is D0=h_0−h_1.

(c) Temperature of heating plate is increased in steps of 5K, after each new step is adjusted, distance h is read after 1 minute to calculate a thickness change h_1−h. This procedure is repeated until the maximum expansion of the test piece 70 is reached. Maximum expansion is considered to be reached if thickness change h_1−h in at least two consecutive 5K steps is identical within 0.4 mm (which is twice the accuracy of the distance measurement tool). Reading h_max is obtained.

Thickness of test piece 70 (corresponding to distance between first layer 22 and second layer 24 in activated condition) is D1=h_0−h_max.

Increase in thickness of test piece 70 (corresponding to increase in distance between first layer 22 and second layer 24 in activated condition with respect to unactivated condition) is D1−D0=h_1−h_max.

In the example of test pieces that are able to undergo a plurality of activation/deactivation cycles the following test procedure is available:

Thickness Reversibility Method:

Set-up of thickness measurement apparatus, as described above, is used.

(a) Top plate 306 is placed directly onto heating plate 304 (without test piece 70) to obtain a zero reading h_0.

(b) Then, test piece 70 is placed in between heating plate 304 and top plate 306. Heating plate 304 is heated to a temperature above ambient temperature and 5K below the expected activation temperature of the gas generating agent (e.g up to 44° C. in case of 3M Novec® 1230 Fire Protection Fluid as gas generating agent) to obtain an initial height reading h_1. Thickness of test piece 70 (corresponding to distance between first layer 122 and second layer 124 in unactivated condition) D0=h_0−h_1.

(c) Heating cycle:
Target temperature of heating plate 304 is set to a temperature 30° C. above the boiling point of the gas generating agent in the envelope 20 and heating plate 304 is heated with a heating rate of 1 K/min. Increase in thickness (corresponding to increase in distance D between first layer 122 and second layer 124) is measured by distance laser device 314 every 10 s. When heating plate 304 reaches target temperature this temperature is maintained for about 10 min and reading of increase in thickness is continued. After 10 min final increase in thickness is measured (corresponding to distance between first layer 122 and second layer 124 in activated condition of gas generating agent).

(d) Cooling cycle:
Target temperature of heating plate 304 is set to room temperature and heating plate 304 is cooling down by the environment within 1 hour. Decrease in thickness (corresponding to decrease in distance D between first layer 122 and second layer 124) is measured by distance laser device 314 every 10 s. When heating plate 304 reaches target temperature this temperature is maintained for about 10 min and reading of decrease in thickness is continued. After 10 min final decrease in thickness is measured (corresponding to distance between first layer 122 and second layer 124 in unactivated configuration).

Heating cycle (c) and cooling cycle (d) are repeated 3 times. Each time thickness increase at topmost temperature and thickness decrease at lowermost temperature are measured.

Figure 13:
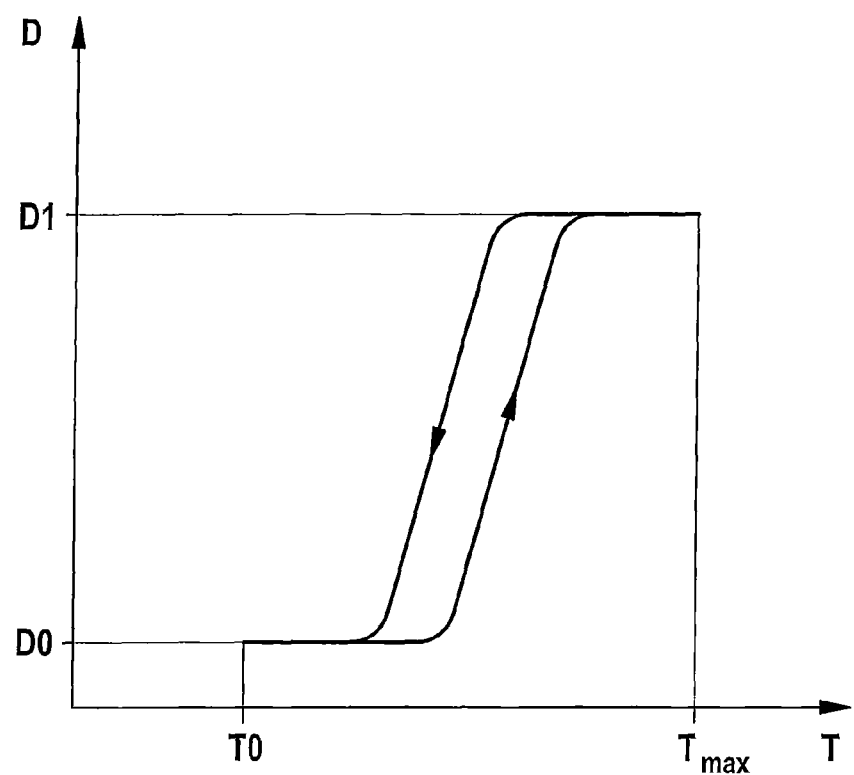
FIG. 13 shows the result of a functionality test for a laminar structure configured to reversibly undergo a plurality of activation/deactivation cycles.

A result of the thickness reversibility test for one heating cycle and one cooling cycle is shown in FIG. 13 in the form of a distance D vs. temperature T diagram. It can be seen that a hysteresis loop is produced. From the topmost plateau of this hysteresis loop the distance D1 between the first layer 122 and second layer 124 in the activated configuration, and from the lowermost plateau distance D0 between the first layer 122 and second layer 124 in the unactivated configuration can be inferred.

For reversible envelopes with a liquid gas generating agent, the following functionality test is available for single envelopes 20:

(a) 2 buckets are prepared. Each bucket is filled with 2 liters of liquid. The first bucket acts as a cold bath and the second bucket acts as a hot bath. The temperatures for the cold bath and the hot bath should be chosen with respect to the activation temperature of the gas generating agent and the onset temperature of condensation/freezing of the gas generating agent. If in one example the gas generating agent is a liquid and the boiling/condensing temperature range is from 47 to 52° C. then a cold bath temperature of 25° C. and a hot bath temperature of 80° C., using water as the liquid in the hot bath and the cold bath, is preferred.

(b) The envelope 20, filled with the gas generating agent 18, is held with a pincer and put it into the hot bath, until the envelope 20 will inflate.

(c) After inflation is complete, inflated envelope 20 is removed from the hot bath immediately and the thickness of the inflated envelope is estimated using a frame with an opening of the expected thickness. Such frame should be made of a material with a low thermal conductivity. As an example, in case the expected thickness of the inflated envelope is 5.5 mm, then using a frame with an opening of 5 mm height and 30 mm width can show that the envelope has reached at least 5 mm (d) The envelope is then put into the cold bath, until it collapses it again. Cycles (b) to (d) are repeated until the inflation is no longer reaching the gap of the frame indicating that functionality of the envelope becomes impaired. After every 10 repetitions the temperature of the liquids inside the 2 buckets is controlled and adjusted to the target, if necessary.

Example of a Fabric Composite

Fabric Example 1

As fabric example 1, a fabric composite sample 150, according FIG. 9a was produced, comprising
an outer shell in the form of a heat protective layer 136 made of 200 g/m² Nomex Delta T woven available from company Fritsche, Germany;
a laminar structure 100 in the form of the fabric composite sample 70 according to FIG. 12.
a barrier laminate 138 in the form of a Fireblocker N laminate (145 g/m²) available from company W.L. Gore & Associates GmbH, Germany
an inner lining made of 125 g/m² aramid viscose woven (available as "Nomex Viscose FR blend 50/50 woven from the company Schueler, Switzerland)

A reference fabric sample was produced using the same set-up as fabric example 1 without the envelopes 20.

Fabric example 2 envelopes 20 having a folded configuration, according FIGS. 5, 6a and 6b, instead of the single envelopes 20 of fabric example 1. Otherwise fabric example 2 is identical to fabric example 1. Each of the envelopes 20 is filled with 0.06 g of "3M NOVEC® 1230 Fire Protection Fluid" (chemical formula: $CF_3CF_2C(O)CF(CF_3)_2$) as gas generating agent according to the second method for producing envelopes, described above with respect to FIGS. 3a to 3d.

The following test results were obtained with fabric examples 1 and 2, and with the reference fabric sample

| 80 kW/m² | Example 2 (Envelopes with folded configuration) | Example 1 (Single envelopes) | Reference example |
|---|---|---|---|
| EN367 HT124 mean [s] | 34.2 | 29.3 | 17.0 |
| weight per area [g/m²] | 667 | 632 | 600 |

Surprisingly if the heat flux is lowered from 80 kW/m² as used in the maximum configuration of EN367 to a much lower, but in firer fighting relevant, heat flux of 5 kW/m² by putting the flame from a larger distance onto the fabrics composite sample 150, the following results are obtained:

| 5 kW/m² | Example 2 (Envelopes with folded configuration) | Example 1 (Single envelopes) | Reference example |
|---|---|---|---|
| EN367 HT124 mean [s] | 397.3 | 246.3 | 175.5 |
| weight per area [g/m²] | 667 | 632 | 600 |

"EN367-HTI24-mean" refers to "heat transfer index at 80 kW/m²", as defined in DIN EN 367 (1992). This quantity describes the time it takes to obtain an increase of 24 K in temperature at the second side (inner side) of a sample fabric as shown in FIG. 11 when the first side is subject to a heat source of 80 kW/m² with a flame.

Heat Exposure Test Showing Effect of Protection Shield

Figure 14:
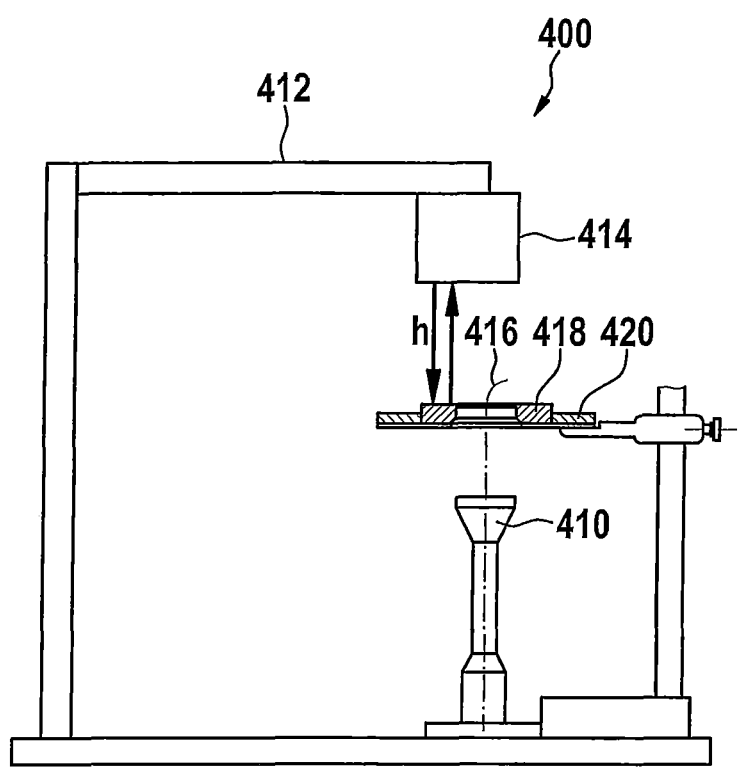
FIG. 14 shows a schematic sketch of an apparatus for carrying out a heat exposure test.

FIG. 14 shows the results of a heat exposure test made on a fabric as in principle shown in FIG. 9g. A layered structure as shown in FIG. 9g was prepared using the methods and materials described below. The fabric included one envelope combined with a heat protection shield 50, as shown in FIG. 4e.

The Envelope was Produced as Follows:

Two envelope layers 12, 14 made from a material according to FIG. 1a or 1b wherein the material is a laminate with a cover layer 8a made of polyethylene-terephtalate (PET) with a thickness of 12 μm, a fluid tight layer 8b made of aluminum with a thickness of 9 μm and a sealing layer 8c made of polyethylene-terephtalate (PET) with a thickness of 23 μm, are put on top of each other, such that their respective sealing layers face each other. For forming a quadrangular envelope 20 a hot bar (sealing width: 2 mm) is brought into contact with the envelope layers 12, 14 such as to bring the sealing layers into contact and to weld the sealing layers together. This procedure is done for three of four sides of the quadrangular envelope 20. Thus an envelope 20 with one side open is formed.

The envelope 20 is put onto a precision scale and the gas generating agent 18 is filled into the envelope, e.g using a syringe needle. The amount of gas generating agent to be filled in is controlled by the scale.

A quantity of around 0.07 g gas generating agent 18 will be filled into the envelope 20, in case the envelope 20 has the following specification: the envelope 20 is formed from two envelope layers 12, 14 made up of PET/Al/PET as described above, outer size of the envelope 20 is 30 mm length and 30 mm width (corresponding to an inner size of the cavity of 26 mm length and 26 mm width), and gas generating agent 18 is selected as Novec® 1230.

After the filling step is finished the open side of the envelope 20 is closed by a fourth 2 mm sealing line. The envelope 20 is then cut precisely along the sealing line.

The configuration of the heat protection shield is as shown in FIG. 4e. The heat protection shield 50 is a laminate made up of three layers 52, 54, 56. The layer 52 is a fabric layer made of non woven polyphenylene sulphide (PPS) with a textile weight of 65 g/m². The layer 52 is sandwiched in between layers 54, 56; both are made of an ePTFE membrane. The thickness of the laminate is 0.5 mm. A piece with the dimensions of 30 mm in length and 30 mm in width has been cut out of the laminate.

Heat protection shield has been attached to one surface of envelope using a silicone adhesive in the centre of the surface area.

The configuration of the laminar structure was:
(a) a first layer (122) made of 55 g/m² spun-laced nonwoven of aramid fiber (available as Vilene Fireblocker from the company Freudenberg, Germany)
(b) a second layer (124), arranged underneath the first layer (122), made of 55 g/m² spun-laced nonwoven of aramid fiber (available as Vilene Fireblocker from the company Freudenberg, Germany)

One Envelope was Put in Between the Two Textile Layers

A fabric composite, according FIG. 9g was produced, comprising
an outer shell in the form of a heat protective layer 136 made of 200 g/m² Nomex Delta T woven available from company Fritsche, Germany;
a laminar structure as described above
a barrier laminate 138 in the form of a Fireblocker N laminate (145 g/m²) available from company W.L. Gore & Associates GmbH, Germany and
a lining layer made of 125 g/m² aramid viscose woven (available as "Nomex Viscose FR blend 50/50 woven from the company Schueler, Switzerland)

Further, a fabric according to a comparative example was prepared which was identical to the fabric described above, except that the envelopes 20 were not provided with any heat protection shield.

The fabric according to the example, as well as the fabric according to the comparative example, were subjected to a source of heat in such a way that the heat flux arriving at the outer surface of the fabric was 20 kW/m².

The Configuration of the Source of Heat was as Follows:

An apparatus as defined in DIN EN 367 (1992) was used, see FIG. 14 for a schematic sketch of the measurement apparatus 400. The thermocouple 416, the calorimeter block 418 and the specimen 420, as described in DIN EN 367 (1992), were placed at a distance from the burner 410 that a heat flux density of 20 kW/m² was produced, instead of the standard heat flux of 80 kW/m². 20 kW/m² corresponds to the heat flux of a severe fire fighter activity in which the envelopes 20 should sustain several activation/deactivation cycles.

Reference signs 412 and 414 refer to a frame 312 and a distance laser device 314 of a laser based distance measuring device as shown in FIG. 11. These parts are present only for the purpose of monitoring thickness changes during the flame test and during activation and deactivation cycles, but not absolutely necessary for carrying out the tests according to DIN EN 367 (1992).

For the measurement of the comparative example a NiCr—Ni wire thermocouple (Thermo ZA 9020-FS from ALHBORN) was connected to a A/D converter Almelo 2590-9V5 having a reading rate of 3 measurements per second) and placed between the first layer 122 of the laminar structure 100 and the heat exposed surface of the envelope 20, see reference symbol T in FIG. 9a.

For the measurement of the fabric composite with an envelope 20 combined with the heat protection shield 50, the thermocouple was placed between the shield 50 and the heat exposed surface of the envelope 20, see reference symbol T in FIG. 9g.

Figure 15:
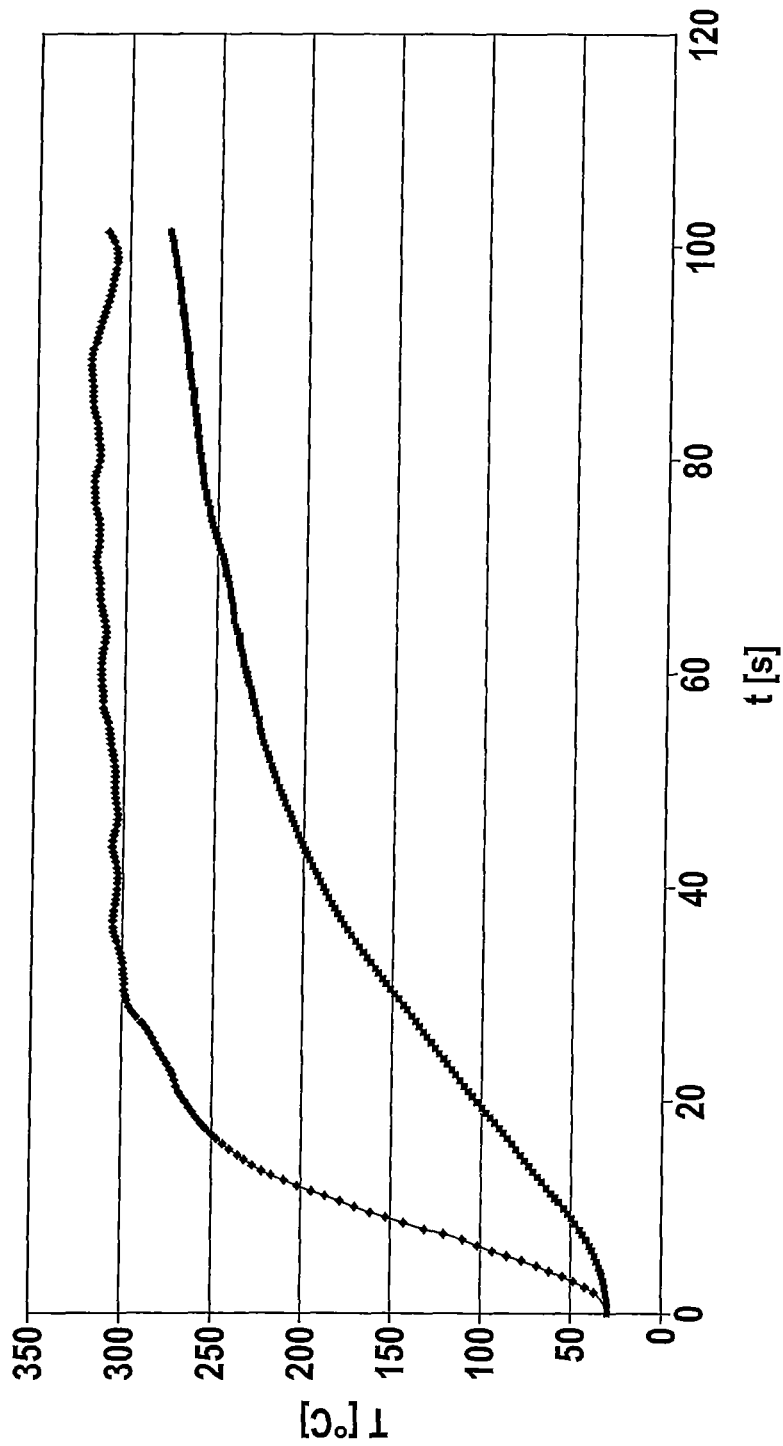
FIG. 15 shows a graph depicting results of heat exposure test carried out with a fabric as shown in FIG. 9g.

FIG. 15 shows a graph with results of the heat exposure test. The abscissa denotes the time of exposure to the source of heat of the test pieces. The ordinate denotes temperature as measured at the heat exposed outer surface of an envelope for the above example (temperature was measured in between the outer surface of the envelope 20 and the heat protection shield 50, as indicated by T in FIG. 9g) and for the comparative example.

Curve 80 in FIG. 14 denotes the temporal profile of temperature at the outer surface on the heat exposed side of the envelope 20 for the comparative example (without heat protection shield 50). Temperature increased relatively fast, i.e. within about 30 s to about 300° C. Such temperature is too high for the envelope 20 to withstand without damage. As a result, the increasing insulation provided by the envelope 20 by activation of the gas generating agent will be lost within a minute.

In contrast, for the fabric according to the example (provided with heat protection shield 50 on the heat exposed side), increase in temperature turned out to much slower, as indicated by curve 82 in FIG. 14. The slower increase in temperature is still sufficient to allow for fast activation of the gas generating agent and adaptive increase in thermal insulation capability of the envelope. It turned out that with the fabric according to the example escape time can be increased by at least 40 s with respect to a conventional product not having an adaptive thermal insulating structure including envelopes as described herein. For the example provided with a heat insulation shield 50, escape time is still longer for about 10 s compared to an embodiment where the envelopes 20 are not provided with a heat insulation shield 50.

Wrinkle Formation Test

FIG. 16 shows in schematic form an apparatus for measuring formation of wrinkles in sheet material 8 used to form the envelope 20. Such test apparatus and the test procedure carried out is a standard procedure used for testing of resistance of sheet materials with respect to wrinkling, known as "Gelboflex-test" (ASTM F 392-93 (2004). A sample 8 with a size of 200 mm by 280 mm was formed into a tube shape and then attached to the tester mandrels.

Samples were flexed at standard atmospheric condition (23° C. and 50% relative humidity). The flexing action consists of a twisting motion combined with a vertical motion, thus, repeatedly twisting and crushing the film. The frequency was at a rate of 45 cycles per minute. In this case, 50 cycles were performed for each sample.

Three sample sheets 8 of a sheet material as shown in FIG. 1c were tested for wrinkle formation (test example). Also, three sample sheets 8 of a sheet material made up from an Al layer and an PET sealing layer were tested (comparative example).

Configuration of the sample sheets was as follows:

Test Example

Reinforcing layer: ePTFE layer with a thickness of 200 µm
Fluid tight layer: Al-layer with a thickness of 9 µm
The fluid tight layer is sandwiched between a layer of polypropylene (PP) with a thickness of 70 µm and a PET sealing layer with a thickness of 12 µm.

Comparative Example

A laminate according to FIG. 1a or 1b, with a fluid tight layer made of Al with a thickness of 9 µm, sandwiched between a layer of polypropylene (PP) with a thickness of 70 µm and a PET sealing layer with a thickness of 12 µm.

The sample sheets according to the test example as well as three sample sheets according to the comparative example were Subject to 50 bending cycles. Afterward, the sample sheets were inspected visually. The result is shown in FIG. 17. FIG. 17 shows drawing of all six sample sheets after having been subject to the Gelboflex test described above. The top row shows the three sample sheets according to the test example, the bottom row shows the three sample sheets according to the comparative example. It is clearly visible that almost no wrinkles are present in the sample sheets according to the test example. In contrast, the sample sheets according to the comparative example show significant formation of wrinkles, some of them being relatively severe and deep.

An oxygen gas transmission test using the manometric method as described in ASTM D 1434-82 has been carried out using the sample sheets 8 before and after being subject to the Gelboflex test. The sample has to be mounted between two sealed chambers whose pressure are different. The gas molecules will pass through the film from the higher pressure side (1 bar pressure) to the lower pressure side (vacuum) under the influence of a pressure difference (gas concentration difference). The detected pressure change of the lower side will provide the transmission rate.

Gas transmission rate is the volume of gas which, under steady conditions, crosses unit area of the sample in unit time under unit pressure difference and at constant temperature. This volume is expressed at standard temperature and pressure.

The rate is usually expressed in cubic centimeters under standard atmospheric pressure per square meter 24 h under a pressure difference of 1 atm ($cm^3/m^2 \cdot d \cdot atm$).

It turned out that the three sample sheets according to the test example showed a practically unchanged oxygen permeation rate before and after being subject to the Gelboflex test. In contrast, with the sample sheets according to the comparative example oxgen permeation rate increased dramatically after being subject to the Gelboflex test. This is a clear indication that the fluid tight Al layer lost its fluid tight characteristics by formation of wrinkles.

The invention claimed is:

1. Envelope for a laminar structure providing adaptive thermal insulation, the envelope enclosing at least one cavity having included therein a gas generating agent having an unactivated configuration and an activated configuration,
the gas generating agent being adapted to change from the unactivated configuration to the activated configuration, such as to increase a gas pressure inside the cavity, in response to an increase in temperature in the cavity, the envelope being configured such that a volume of the envelope increases in response to the increase in gas pressure inside the cavity, wherein the envelope is made of a polymer composite material, the polymer composite material including a fluid tight layer which is covered by a reinforcing layer comprising a polymer material, the reinforcing layer being configured to limit formation of wrinkles in the fluid tight layer when subjecting the envelope to one, or a plurality of, activation/deactivation cycles.

2. Envelope according to claim 1, comprising a porous layer, in particular an expanded PTFE layer, having a thickness between 30 and 400 μm, in particular between 70 and 250 μm.

3. Envelope according to claim 1, wherein the reinforcing layer is bonded to the fluid tight layer by a PU resin or by other thermoplastic material, e.g. FEP or PFA.

4. Envelope according to claim 1, wherein the reinforcing layer is configured to provide for additional thermal protection.

5. Envelope according to claim 1, wherein the reinforcing layer comprises a porous polymer material.

6. Envelope according to claim 5, wherein the porous polymer material has a density of 0.2 to 1 g/cm$^3$.

7. Envelope according to claim 5, wherein the porous polymer material comprises an expanded fluoropolymer material.

8. Envelope according to claim 7, wherein the expanded fluoropolymer material includes expanded PTFE or is expanded PTFE.

9. Envelope according to claim 1, wherein the reinforcing layer has a composite structure including a porous polymer layer (8e) and at least one additional polymer material in contact with the porous polymer layer at least partially penetrating pores formed in the porous polymer layer.

10. Envelope according to claim 9, wherein the additional polymer material penetrates pores of the porous layer up to a penetration depth between 10 and 50 μm.

11. Envelope according to claim 9, wherein the additional polymer material forms an essentially homogeneous polymer layer at least on the side of the porous polymer layer facing towards the fluid tight layer.

12. Envelope according to claim 9, wherein the reinforcing layer is bonded to the fluid tight layer by the additional polymer material.

13. Envelope according to claim 1, wherein the envelope is made of a metal/polymers composite material including a fluid tight layer of metallic material.

14. Envelope according to claim 13, wherein the metallic material is Al or an Al based alloy.

15. Laminar structure providing adaptive thermal insulation, comprising
 a first layer,
 a second layer,
 at least one envelope according to claim 1, the envelope provided in between the first layer and the second layer,
 the first layer, the second layer and the cavity being arranged such that a distance between the first layer and the second layer increases in response to the increase in gas pressure inside the cavity.

16. Fabric with a composite structure, the composite structure comprising a laminar structure providing adaptive thermal insulation or an envelope for a laminar structure providing adaptive thermal insulation according to claim 15.

* * * * *